US010209428B2

(12) United States Patent
Yuki et al.

(10) Patent No.: US 10,209,428 B2
(45) Date of Patent: Feb. 19, 2019

(54) LIGHTING DEVICE AND DISPLAY DEVICE

(71) Applicant: Sharp Kabushiki Kaisha, Sakai, Osaka (JP)

(72) Inventors: Ryuzo Yuki, Sakai (JP); Hisashi Watanabe, Sakai (JP); Takeshi Masuda, Sakai (JP); Mitsuhiro Murata, Sakai (JP); Shinya Kadowaki, Sakai (JP); Takeshi Ishida, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 42 days.

(21) Appl. No.: 15/539,656

(22) PCT Filed: Dec. 18, 2015

(86) PCT No.: PCT/JP2015/085491
§ 371 (c)(1),
(2) Date: Jun. 23, 2017

(87) PCT Pub. No.: WO2016/104363
PCT Pub. Date: Jun. 30, 2016

(65) Prior Publication Data
US 2018/0259701 A1    Sep. 13, 2018

(30) Foreign Application Priority Data
Dec. 26, 2014  (JP) ................. 2014-265560

(51) Int. Cl.
*F21V 8/00* (2006.01)
*G02F 1/1335* (2006.01)
(Continued)

(52) U.S. Cl.
CPC ............. *G02B 6/0068* (2013.01); *F21S 2/00* (2013.01); *F21V 17/00* (2013.01); *F21V 17/10* (2013.01);
(Continued)

(58) Field of Classification Search
CPC .. G02B 6/0021; G02B 6/0025; G02B 6/0055; G02F 1/133308; G02F 1/133512;
(Continued)

(56) References Cited

U.S. PATENT DOCUMENTS 7,637,646 B2 * 12/2009 Byun ................... G02B 6/0016
349/65
8,337,066 B2 * 12/2012 Yeh ...................... G02B 6/0021
362/612
(Continued)

FOREIGN PATENT DOCUMENTS

CN    202256962 U    5/2012
JP    2009199971 A    9/2009
(Continued)

*Primary Examiner* — Sardis F Azongha
(74) *Attorney, Agent, or Firm* — ScienBiziP, P.C.

(57) ABSTRACT

A lighting device includes an annular light source including light sources arranged in a circular pattern, a light guide plate having a round shape in a plan view, and a case holding the annular light source and the light guide plate. The light guide plate is disposed inside the annular light source. The light guide plate includes light entering portions, circumferentially aligned portions, and a light emitting portion. The light entering portions are opposed to the light sources. Each circumferentially aligned portion is between the adjacent light entering portions. A dimension of the circumferentially aligned portion in the radial direction is larger than a dimension of the light entering portion in the radial direction. The circumferentially aligned portions are aligned with the light sources in the circumferential direction and configured to contact the light sources when the light guide plate is rotated in the circumferential direction.

14 Claims, 39 Drawing Sheets

(51) Int. Cl.
  *G02F 1/1333* (2006.01)
  *F21S 2/00* (2016.01)
  *F21V 17/00* (2006.01)
  *F21V 17/10* (2006.01)

(52) U.S. Cl.
  CPC ......... *G02B 6/0021* (2013.01); *G02B 6/0025* (2013.01); *G02B 6/0055* (2013.01); *G02F 1/133308* (2013.01); *G02F 1/133512* (2013.01); *G02F 1/133514* (2013.01); *G02F 1/133603* (2013.01); *G02F 1/133608* (2013.01)

(58) Field of Classification Search
  CPC ......... G02F 1/133514; G02F 1/133603; G02F 1/133608; F21S 2/00; F21V 17/00; F21V 17/10; F21V 7/043
  See application file for complete search history.

(56) References Cited

U.S. PATENT DOCUMENTS

| | | | | |
|---|---|---|---|---|
| 9,194,999 | B2 * | 11/2015 | Horiuchi | G02B 6/0091 |
| 2010/0277664 | A1 * | 11/2010 | Kim | G02B 6/0085 349/58 |
| 2013/0301298 | A1 | 11/2013 | Liu et al. | |
| 2016/0085014 | A1 * | 3/2016 | Katsumata | G02B 6/0021 362/613 |
| 2016/0341862 | A1 * | 11/2016 | Feng | G02B 6/001 |

FOREIGN PATENT DOCUMENTS

| | | |
|---|---|---|
| JP | 2011034692 A | 2/2011 |
| JP | 2013127854 A | 6/2013 |
| TW | 201346394 A | 11/2013 |

* cited by examiner

LIGHTING DEVICE AND DISPLAY DEVICE

TECHNICAL FIELD

The present invention relates to a lighting device and a display device.

BACKGROUND ART

A display device including a liquid crystal panel for displaying images has been known. The liquid crystal panel doses not have a light emitting function and thus the display device of this kind includes a lighting device (a backlight) for illuminating the liquid crystal panel from a back side. Recently, a display device including a round liquid crystal panel as in Patent Document 1 is known.

A conventional display device usually includes a rectangular liquid crystal panel. In the conventional liquid crystal panel, driver circuits such as gate drivers are arranged in a non-display area that is a frame-shaped area outside a display area. In recent years, gate drivers are included in pixels to be dispersed in a display area and thus a non-display area is significantly narrowed. This provides flexibility in designing a shape of the liquid crystal panel and thus the round liquid crystal panel is now available.

As described in Patent Document 1, the round liquid crystal panel is configured to display an image with light emitted by a round lighting device. The round lighting device includes a round light guide plate and LEDs that are arranged at predefined intervals in a circular pattern to surround the light guide plate.

In the round lighting device, the LEDs are opposed to a periphery of the light guide plate. Portions of the periphery opposed to the LEDs are light entering portions through which light from LEDs enter the light guide plate. The light travels through the light guide plate and exits the light guide plate through a plate surface of the light guide plate facing the liquid crystal panel.

A relatively larger amount of light is supplied to areas including the light entering portions of the round light guide plate and therearound and thus brightness tends to be higher in the areas. Light is less likely to be supplied to areas including portions of the periphery which are not opposed to the LEDs and therearound and thus the brightness tends to be lower in the areas. Namely, the round light guide plate includes portions with higher brightness and portions with lower brightness that alternately appear in a circular pattern.

RELATED ART DOCUMENT

Patent Document

Patent Document 1: Japanese Patent Application Publication No. 2009-199971

Problem to be Solved by the Invention

In the round lighting device, the round light guide plate held in a case may be subjected to vibration and rotated in a circumferential direction. The round light guide plate may be displaced resulting in uneven brightness in light emitted by the lighting device.

To correct the unevenness in the brightness of light from the lighting device, a reflection pattern may be formed on a back surface of the light guide plate. The reflection pattern may be a white dot pattern or three-dimensional pattern such as an emboss pattern. Elements of the reflection pattern may be formed with relatively low density in areas of the back surface corresponding to the portions in which the brightness tends to be higher and with relatively high density in areas of the back surface corresponding to the portions in which the brightness tends to be lower. Namely, the back surface of the light guide plate includes the areas in which the elements of the reflection pattern are formed with lower density and the areas in which the elements of the reflection pattern are formed with higher density that are alternately arranged. When using such a light guide plate, it is preferable to arrange the elements of the reflection pattern formed with lower density such that the elements correspond with the LEDs that are arranged in a circular pattern to achieve even brightness in light exiting from the lighting device.

In such a lighting device, if the light guide plate is rotated in the circumferential direction due to vibration, a positional relationship between the reflection pattern and the LED changes. The elements of the reflection pattern formed with higher density may be in front of the LEDs and the elements of the reflection pattern formed with lower density may not to be opposed to the LEDs. As a result, the lighting device may emit light with uneven brightness and thus significant difference in brightness is observed.

DISCLOSURE OF THE PRESENT INVENTION

An object is to provide a lighting device in which rotation of a light guide plate having a substantially round shape in a circumferential direction is restricted.

Means for Solving the Problem

A lighting device according to the present invention includes an annular light source, a light guide plate, and a case. The annular light source includes light sources arranged at intervals in a circular pattern and configured to emit light toward a center of the annular light source. The light guide plate is a plate having a round shape in a plan view and disposed inside the annular light source with a center of the light guide plate aligned with the center of the annular light source. The light guide plate includes light entering portions, circumferentially aligned portions, and a light exiting portion. The light entering portions are portions of a periphery of the plate opposed to the light sources and through which the light enters and annularly arranged at intervals. The circumferentially aligned portions are portions of the periphery of the plate among the light entering portions. The light exiting portion is a front plate surface of the plate through which the light entering through the light entering portions exit. Each of the circumferentially aligned portions is between the light entering portions that are adjacent to each other and has a dimension between the center of the plate and an edge of the each of the circumferentially aligned portions in a radial direction larger than a dimension between the center and an edge of each of the light entering portions in the radial direction. The circumferentially aligned portions are aligned with the light sources when the light guide plate is rotated in the circumferential direction. The case holds the annular light source and the light guide plate with the light sources positioned. The case includes a peripheral wall surrounding the periphery of the light guide plate.

In the lighting device, when the light guide plate having the substantially round shape is rotated in the circumferential direction, the circumferentially aligned portions may contact the light sources. Therefore, the rotation of the light guide plate is restricted.

The circumferentially aligned portions may include parallel contact surfaces substantially parallel to side surfaces of the light sources in the radial direction and aligned with the light sources in the circumferential direction. With the circumferentially aligned portions including such parallel contact surfaces, the circumferentially aligned portions are more likely to be in surface contact with the light sources, that is, more likely contact the light sources. In such a lighting device, the rotation of the light guide plate is further properly restricted.

In the lighting device, the circumferentially aligned portions may include sloped contact surfaces angled to side surfaces of the light sources in the radial direction and aligned with the light sources in the circumferential direction. With the circumferentially aligned portions including such sloped contact surfaces, impact of the circumferentially aligned portions on the light sources can be reduced and damages to the light sources can be reduced.

The light entering portions may include light sources opposed surfaces opposed to the light sources. The circumferentially aligned portions may include continuous contact surfaces continuing from the light source opposed surfaces to be flush with the light source opposed surfaces and being aligned with the light sources in the circumferential direction. With the circumferentially aligned portions including the continuous contact surfaces, impact of the circumferentially aligned portions on the light sources can be reduced and damages to the light sources can be reduced.

In the lighting device, the case may include circumferentially arranged protrusions that protrude from the peripheral wall toward the light guide plate such that the circumferentially arranged protrusions and the light sources are aligned in the circumferential direction. The circumferentially arranged protrusions may be aligned with the circumferentially aligned portions in the circumferential direction and configured to contact the circumferentially aligned portions when the light guide plate is rotated. With the case including the circumferentially arranged protrusions, when the light guide plate is rotated, the circumferentially aligned portions contact the circumferentially arranged protrusions and the rotation of the light guide plate is restricted. The aligned portions are less likely to contact the light sources and thus damages to the light sources can be reduced.

In the lighting device, the case may include radially arranged protrusions that protrude from the peripheral wall toward the light guide plate such that the radially arranged protrusions and the light sources are aligned in the radial direction. The radially arranged protrusions may be aligned with the circumferentially aligned portions in the circumferential direction. The radially arranged protrusions have dimensions in the circumferential direction equal to or larger than dimensions of the light sources in the circumferential direction. The radially arranged protrusions are configured to contact the circumferentially aligned portions when the light guide plate is rotated. With the case including the radially arranged protrusions, when the light guide plate is rotated, the circumferentially aligned portions contact the radially arranged protrusions and thus the rotation of the light guide plate is restricted. Therefore, the aligned portions are less likely to contact the light sources and thus damages to the light sources can be reduced.

The lighting device may further include a supporting member and a light guide plate fixing member. The supporting member may be disposed on a front side or a rear side of the light guide plate. The light guide plate fixing member may include first fixing portions that may be double sided adhesive portions for fixing the circumferentially aligned portions and the supporting member together. One of surfaces of each of the first fixing portions may be affixed to a front surface or a back surface of corresponding one of the circumferentially aligned portions. Another one of the surfaces may be affixed to the supporting member. The light guide plate may be fixed to the supporting member using such a light guide plate fixing member.

In the lighting device, the light guide plate fixing member may include connecting portions each connecting the first fixing portions that are adjacent to each other.

The connecting portions may be second fixing portions that are double sided adhesive portions for fixing the light entering portions and the supporting member together. One of surfaces of each of the connecting portions may be affixed to a front surface or a back surface of corresponding one of the light entering portions. Another one of the surfaces may be affixed to the supporting member. With the light guide plate fixing member including the second fixing portions, the light guide plate can be further properly fixed to the supporting member.

In the lighting device, the light guide plate fixing member may have a closed ring overall shape. With the light guide plate fixing member having the closed ring shape, affixation of the light guide plate fixing member to an object can be easily performed. This is preferable in terms of parts control.

The lighting device may further include optical sheets, a supporting member, and an optical sheet fixing member. The optical sheets may include base portions and extending portions. The base portions may have substantially round shapes and cover the light exiting portion. The extending portions may extend outward from the base portions and cover the circumferentially aligned portions. The optical sheets may be laid on top of each other such that the extending portions do not overlap each other and directly cover the circumferentially aligned portions. The optical sheets may be configured to pass light exiting from the light exiting portion. The supporting member may be disposed on a light emitting side of the optical sheet. The optical sheet fixing member may be a double sided adhesive fixing member for fixing the optical sheets and the supporting member together. One of surfaces of the optical sheet fixing member may be affixed to the supporting member. Another one of the surfaces may be affixed to the extending portions. According to the optical sheets and the optical sheet fixing member, the sheets of the optical sheet can be fixed to the supporting member using the optical sheet fixing member. Therefore, the sheets of the optical sheet are less likely to be displaced from each other and thus a problem such as an interference pattern is less likely to occur.

In the lighting device, the annular light source may include the light sources that are opposed to each other in the radial direction. According to the configuration including the light sources that are opposed to each other in the radial direction, the light emitted by the light sources are less likely to be directly supplied to the circumferentially aligned portions and thus the light is less likely to leak to the outside via the circumferentially aligned portions.

In the lighting device, the circumferentially aligned portions may be configured such that a distance from the peripheral wall is constant for an entire area.

A display device according to the present invention may include the lighting device described above and a display panel.

Advantageous Effect of the Invention

According to the present invention, a lighting device in which the rotation of the light guide plate having the substantially round shape is restricted is provided.

MODE FOR CARRYING OUT THE INVENTION

First Embodiment

A first embodiment will be described with reference to FIGS. 1 to 4. In this section, a liquid crystal display device 10 including a liquid crystal panel 11 as a liquid crystal panel (a display portion) will be described. The vertical direction is defined based on FIGS. 1 to 1 and the upper side and the lower side in those drawings correspond to the front and the rear of the device, respectively.

Figure 1:
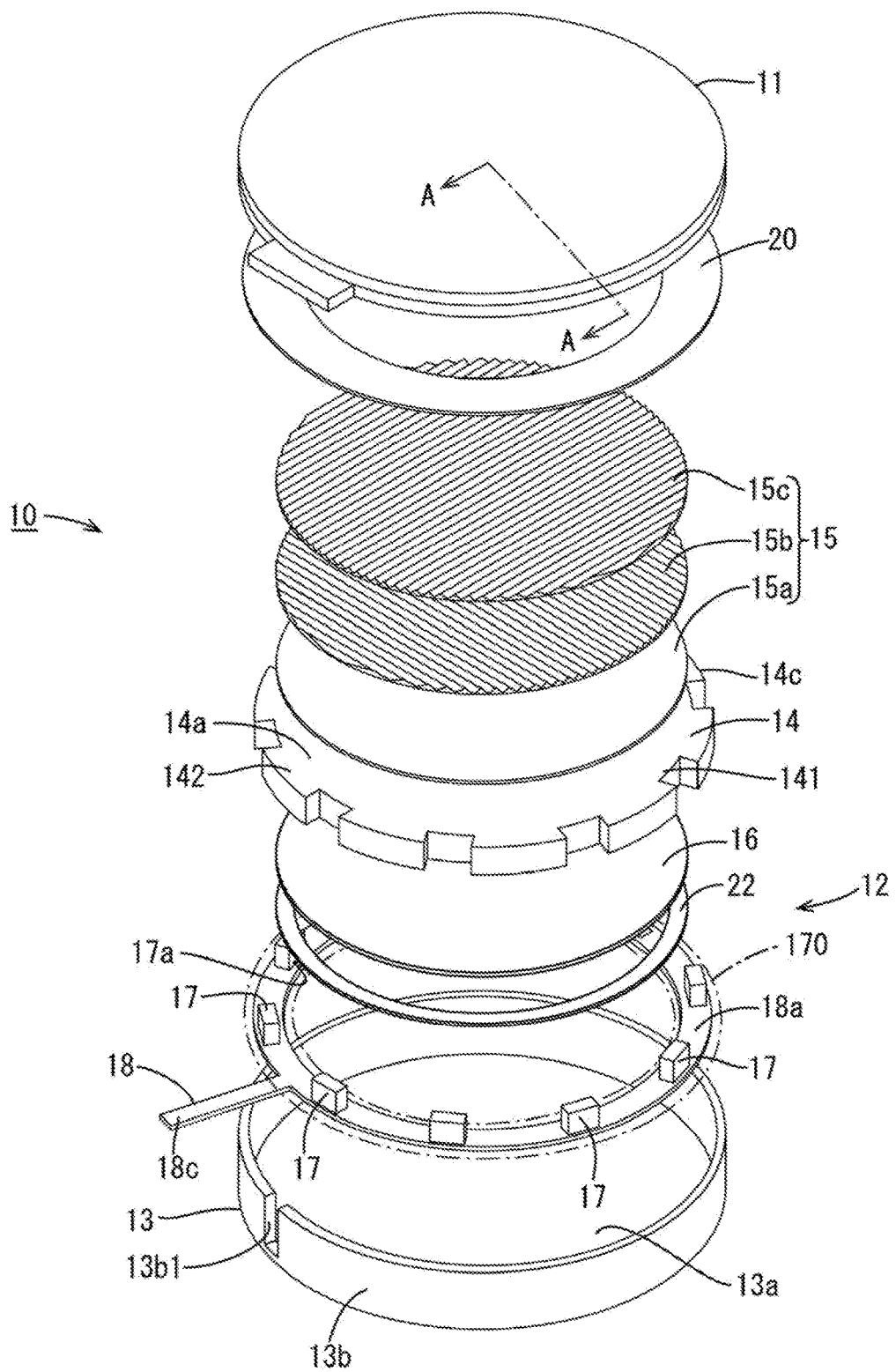
FIG. 1 is an exploded perspective view schematically illustrating a liquid crystal display device according to a first embodiment of the present invention.
Figure 2:
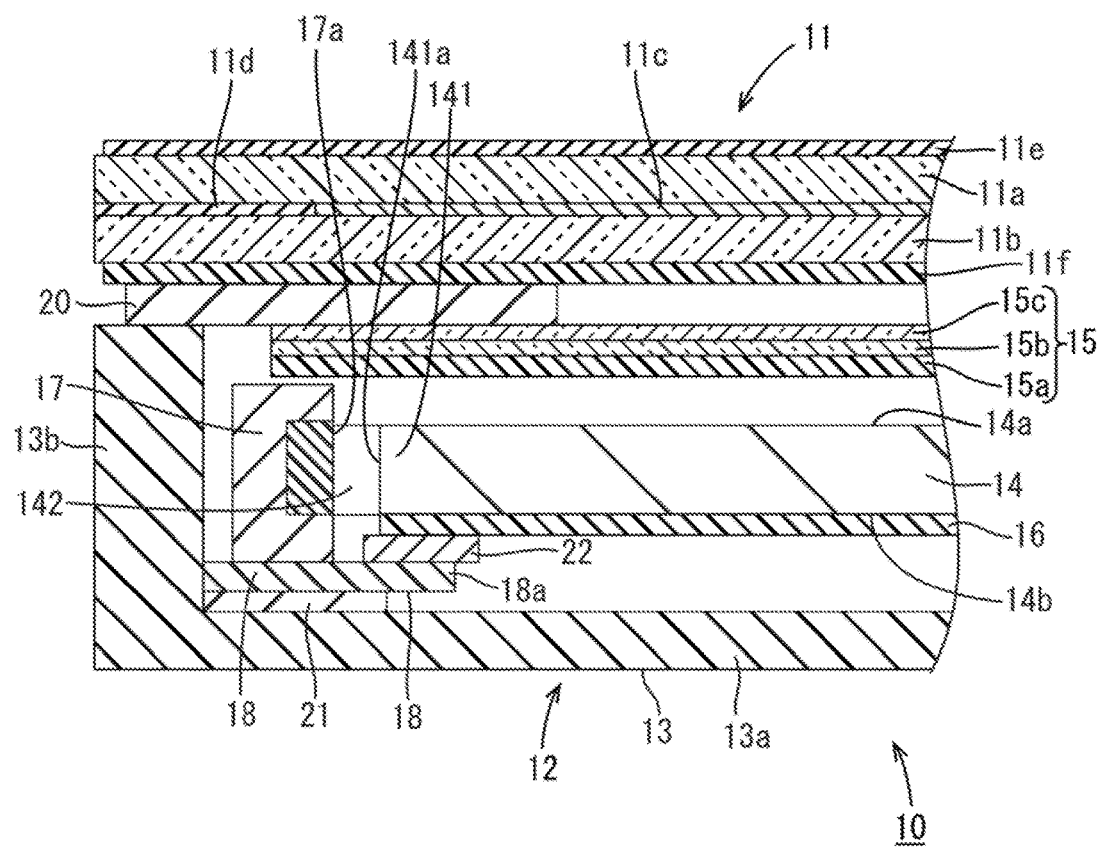
FIG. 2 is a cross-sectional view of the liquid crystal display device along line A-A in FIG. 1.

FIG. 1 is an exploded perspective view schematically illustrating the liquid crystal display device 10 according to a first embodiment of the present invention. FIG. 2 is a cross-sectional view of the liquid crystal display device along line A-A in FIG. 1. As illustrated in FIG. 1, the liquid crystal display device 10 includes at least the liquid crystal panel 11 (a display panel) and a backlight unit 12 (a lighting device). The liquid crystal panel 11 has a round overall shape. The liquid crystal panel 11 is configured to display images. The backlight unit 12 is disposed on a rear of the liquid crystal panel 11 and configured to supply light to the liquid crystal panel 11 for display. Although not illustrated, the liquid crystal display device 10 may include a bezel for holding outer edge portions of the liquid crystal panel between the bezel and the backlight unit 12.

The liquid crystal display device 10 according to this embodiment may be used for but not limited to electronic devices (not illustrated) including mobile phones (including smartphones), laptop personal computers (including tablet personal computers), portable information terminals (including electronic book readers and PDAs), digital photo frames, portable video game players, car navigation systems, and instrument panels. The liquid crystal panel 11 in the liquid crystal display device 10 has a screen size of some inches to ten plus some inches, that is, the liquid crystal panel 11 is categorized into a small-to-medium size panel. The screen size of the liquid crystal panel 11 is not limited to the above-described size.

The liquid crystal panel 11 will be described. As illustrated in FIG. 1, the liquid crystal panel 11 has a round overall shape in a plan view. As illustrated in FIG. 2, the liquid crystal panel 11 mainly includes a pair of boards 11a and 11b and a liquid crystal layer 11c. The boards 11a and 11b have a round shape in a plan view. The liquid crystal layer 11c is between the boards 11a and 11b. The boards 11a and 11b are bonded together with adhesive of a sealing member 11d with a gap corresponding to a thickness of the liquid crystal layer 11c therebetween.

The liquid crystal panel 11 includes a display area (an active area) having a round shape and a non-display area (a non-active area). The display area is an inner area of the liquid crystal panel 11 in which imaged are displayed. The non-display area is an outer area of the liquid crystal panel 11 surrounding the display area. When light supplied from the backlight unit 12 to the liquid crystal panel 11 enters the liquid crystal panel 11 from the back side and exits from the front side, an image is displayed in the display area of the liquid crystal panel 11. Polarizing plates 11e and 11f are attached to outer surfaces of the boards 11a and 11b, respectively. The liquid crystal panel 11 according to this embodiment operates in fringe field switching (FFS) mode.

One of the boards 11a and 11b on the front side is a color filter (hereinafter referred to as CF) board 11a and the other on the rear side (the back side) is an array board 11b. A portion of the periphery of the array board 11b projects outward farther than the CF board 11a. A terminal (not illustrated) is disposed in the portion. The terminal is connected to a terminal of a flexible circuit board (not illustrated) for supplying various signals to the array board 11b.

The array board 11b includes thin film transistors (TFTs) and pixel electrodes connected to the TFTs arranged in a matrix on an inner surface of a support glass substrate (on a liquid crystal layer 11c side). The TFTs are switching components. The array board 11b includes source traces and gate traces routed to define sections each including the TFTs. The gate driver is mounted on the support glass substrate. The array board 11b further includes common electrodes opposed to the pixel electrodes. The pixel electrodes and the common electrodes are formed from a transparent conductive film of indium tin oxide (ITO) or zinc oxide (ZnO). Oxide semiconductors are used for active layers of the TFTs.

The CF board 11a includes R (red), G (green), and B (blue) CFs arranged in a matrix on an inner surface of the support glass substrate (on a liquid crystal layer 11c side). Furthermore, a light blocking layer (black matrix) is formed on the support glass substrate to define sections each including the CFs.

Alignment films (not illustrated) are formed on inner surfaces of the boards 11a and 11b for orientation of liquid crystal molecules in the liquid crystal layer 11c.

The backlight unit 12 will be described. The backlight unit 12 has a round overall shape similar to the liquid crystal panel 11 in a plan view. As illustrated in FIGS. 1 and 2, the backlight unit 12 mainly includes a chassis 13 (a case), a light guide plate 14, optical sheets 15, a reflection sheet 16, light emitting diodes 17 (LEDs), and an LED board 18 (a light source board). The LEDs 17 are light sources. The LEDs 17 are mounted on the LED board 18.

The chassis 13 has a round overall shape similar to the liquid crystal panel 11 in a plan view. The chassis 13 has a shallow box shape with an opening on the front side. The chassis 13 may be a molded from synthetic resin. The chassis 13 holds the LED board 18, the reflection sheet 16, the light guide plate 14, and the optical sheets therein.

The chassis 13 includes a bottom wall 13a and a peripheral wall 13b. The bottom wall 13a has a round shape in a plan view. The peripheral wall 13b has a drum shape that protrudes from a periphery of the bottom wall 13a toward the front side. The bottom wall 13a is a plate-shaped portion having a predefined thickness. On the bottom wall 13a, the reflection sheet 16, the light guide plate 14, and the optical sheets 15 are laid in this sequence. The peripheral wall 13b is a plate-shaped portion having a predefined thickness. The peripheral wall 13b has a drum-like (a ring-like) shape that surrounds the components including the light guide plate 14 on the bottom wall 13a from an outer side.

A panel fixing tape 20 is attached to an end of the peripheral wall 13b on the front side for fixing the liquid crystal panel 11 to the backlight unit 12. The panel fixing tape 20 is a double sided adhesive tape having a light blocking property and an annular shape in a plan view. An adhesive surface of the panel fixing tape 20 on the back side is attached to the end of the peripheral wall 13b and an outer edge of the optical sheet on the front side. An adhesive surface of the panel fixing tape 20 on the front side is attached to an outer edge of the liquid crystal panel 11 on the back side.

The LEDs 17 include LED chips (LED components) and substrates that are fixed to a plate surface of the LED board 18. The LED chips are semiconductor light emitting components. The LED ships are sealed with resin on the substrates. The LEDs 17 emit white light. The LED chips emit single color of light in blue. The resin sealing the LED chips includes phosphors that emit specified color of light (e.g., yellow, green, red) when excited by the blue light emitted by the LED chips. The phosphors are dispersed in the resin. Each LED 17 has a rectangular columnar outer shape.

The LEDs 17 according to this embodiment are side light emitting type LEDs, that is, sided surfaces of the LEDs 17 adjacent to mounting surfaces that are fixed to the LED board 18 are configured as light emitting surfaces 17a. Optical axes of the LEDs 17 are parallel to directions normal to the light emitting surfaces 17a. The "optical axis" corresponds to a travel direction of a light ray with the highest intensity among light rays emitted by the LEDs 17 with predefined light distributions.

Multiple LEDs 17 are prepared. The LEDs 17 are arranged at intervals in a circular pattern. The LEDs 17 arranged in the circular pattern form an "annular light source 170." The light emitting surfaces 17a (light exiting surfaces) of the LEDs 17 includes in the annular light source 170 face the center of the annular light source 170 and the LEDs 17 emits light toward the center through the light emitting surfaces 17a (the light exiting surfaces).

The LED board 18 includes a flexible film (or sheet) having an annular overall shape in a plan view. The LED board 18 is placed in the chassis 13 to be parallel to the plate surface of the bottom wall 13a.

The LED board 18 has an annular shape along a peripheral edge of the light guide plate 14 having a round shape. The LED board 18 includes a base portion 18a on which the LEDs are mounted at intervals in the circumferential direction and a projecting portion 18c that projects outward from the base portion 18a and having a band shape.

The LED board 18 is made of material including an insulating material such as a polyimide resin as a main component. The LED board 18 includes a wire pattern (not illustrated) formed from a copper foil for supplying power to the LEDs 17.

The LED board 18 is fixed to the bottom wall 13a of the chassis 13 with a board fixing tape 21 that is affixed to the back surface of the base portion 18a having the annular shape. The board fixing tape 21 has an annular shape along the shape of the base portion 18a and attached to the bottom wall 13a along the peripheral edge of the bottom wall 13a.

In this embodiment, a peripheral edge of the reflection sheet 16 is placed on an inner peripheral edge of the base portion 18a of the LED board 18 on the front side. A sheet fixing tape 22 is placed between the inner peripheral edge of the LED board 18 and the peripheral edge of the reflection sheet 16. The sheet fixing tape 22 is a double sided adhesive tape having a light blocking property. The reflection sheet 16 is fixed to the base portion 18a of the LED board 18 with the sheet fixing tape 22.

The LEDs 17 are arranged on the base portion 18a such that each LED 17 is opposed to another LED 17 on the opposite side with the center of the base portion 18a at the middle. The light emitting surface 17a of each LED 17 faces the center of the base portion 18a and the center of the light guide plate 14.

The LEDs 17 mounted on the base portion 18a include terminals 171 connected to the wiring pattern. The terminals 171 are at ends of the LEDs 17. The LEDs 17 are electrically connected in series via the wiring pattern.

The projecting portion 18c has an elongated band shape that extends outward from the outer peripheral edge of the base portion 18a. A portion of the wiring pattern is formed on the projecting portion 18c. A terminal, which is not illustrated, is disposed on a distal end of the projecting portion. The terminal is connected to the wiring pattern.

The projecting portion 18c extends out of the backlight unit 12 via a cutout 13b1 in the peripheral wall 13b of the chassis 13. The projecting portion 18c is passed through the cutout 13b1 and directed to the back side of the bottom wall 13a. The terminal at the distal end of the projecting portion 18c is fixed to a power supply connector on an LED driver circuit board, which is not illustrated. The LED driver circuit board is attached to the back side of the bottom wall 13a.

The light guide plate 14 has a round shape similar to the bottom wall 13a of the chassis 13 in a plan view. The light guide plate 14 is heled in the chassis 13 to be surrounded by the peripheral wall 13b. The optical sheets 15 and the liquid crystal panel 11 are placed in this sequence on the front surface of the light guide plate 14.

The light guide plate 14 is disposed with the center thereof aligned with the center of the annular light source 170 including the LEDs 17 arranged in a circular pattern. Ideally, the center of the light guide plate 14 is on the center O of the annular light source 170 in a plan view.

Peripheral ends 14c of the light guide plate 14 include light entering portions 141 and circumferentially aligned portions 142. The light entering portions 141 are opposed to the respective LEDs 17. Light from the LEDs 17 directly enters the light entering portions 141. Each circumferentially aligned portion 142 is not opposed to the corresponding LED 17 in the optical axis direction and is located between the adjacent light entering portions 141. The light entering portions 141 are arranged at intervals in the circumferential direction to form a circular pattern. The circumferentially aligned portions 14 are arranged at intervals in the circumferential direction to form a circular pattern. Namely, the light entering portions 141 and the circumferentially aligned portions 142 are alternately arranged in the periphery 14 of the light guide plate 14.

Although the light from the LEDs 17 is less likely to directly enter the circumferentially aligned portions 142, light other than the direct light from the LEDs 17 may enter the circumferentially aligned portions 142. For example, light rays exiting from the circumferentially aligned portions 142 and reflected off the peripheral wall 13b may enter the light guide plate 14 through the circumferentially aligned portions 142. Namely, the circumferentially aligned portions 142 do not restrict the light rays from entering the light guide plate 14.

The front plate surface of the light guide plate 14 is a light exiting surface 14a through which the light that has entered the light guide plate 14 through the light entering portions 141 exits toward the liquid crystal panel 11 (and the optical sheets 15). The back plate surface (hereinafter referred as the back surface) of the light guide plate 14 facing toward the bottom wall 13a of the chassis 13 is covered with the reflection sheet 16.

After the light rays exiting from the LEDs 17 enter the light guide plate 14 through the light entering portions 141, the light rays travel through the light guide plate 14. The light rays are directed toward the front and exit from the light exiting surface 14a. The light rays are passed through the optical sheets 15 and supplied to the liquid crystal panel 11.

A light reflecting pattern is formed on the back surface 14b of the light guide plate 14 to direct the light rays in the light guide plate 14 toward the front to increase an amount of light exiting from the light exiting surface 14a. The light reflecting pattern includes light reflecting segments. The light reflecting segments may be formed from white light reflecting paint or three-dimensional light reflectors that may be referred to as embossing. The light reflecting pattern includes the light reflecting segments that are fine dots. The higher the density (or the distribution density) of the light reflecting segments in the light reflecting pattern, the higher the light reflecting performance of the light reflecting pattern.

The density of the light reflecting segments is the highest in the circumferentially aligned portions 142 that are not opposed to the LEDs 17 and the lowest in the light entering portions 141. Namely, light reflecting patterns S1 including the light reflecting segments with higher density and light reflecting patterns S2 including the light reflecting segments with lower density are formed on the back surface 14b of the light guide plate 14 such that the light reflecting patterns S1 and the light reflecting patterns S2 are alternately arranged in the circumferential direction. The density of the light reflecting segments tends to increase as a distance from the center of the light guide plate 14 in the radial direction decreases.

With the light reflecting pattern formed on the back surface 14*b* of the light guide plate 14, the evenness (of the brightness evenness) of light exiting from the light exiting surface 14*a* increases.

The light entering portions 141 and the circumferentially aligned portions 142 will be described in detail later. A positioning mechanism of the light guide plate 14 inside the chassis 13 will be described later.

The optical sheet 15 includes multiple sheets that are laminated. The optical sheet 15 is placed over the front surface of the light guide plate 14 to cover the light exiting surface 14*a*. The optical sheet 15 has a function for passing the light exiting from the light guide plate 14 and adding optical effects to the light. The optical sheet 15 includes a diffuser sheet 15*a* and two lens sheets 15*b* and 15*c*. The optical sheet 15 may further include a reflection-type polarizing sheet. The optical sheet 15 has a round shape similar to the light guide plate 14 in a plan view. A size of the optical sheet 15 is set slightly larger than the light guide plate 14.

The reflection sheet 16 has a round shape similar to the light guide plate 14 in a plan view. The reflection sheet 16 is disposed between the bottom wall 13*a* of the chassis 13 and the light guide plate 14. The reflection sheet 16 is a white sheet made of synthetic resin with a surface having high light reflectivity (e.g., a white formed polyethylene terephthalate sheet). The reflection sheet 16 has a size to entirely cover the back surface 14*b* of the light guide plate 14. The light that has exited from the light guide plate 14 through the back surface 14*b* is reflected by the reflection sheet 16, returned to the light guide plate 14, and directed toward the front.

Figure 3:
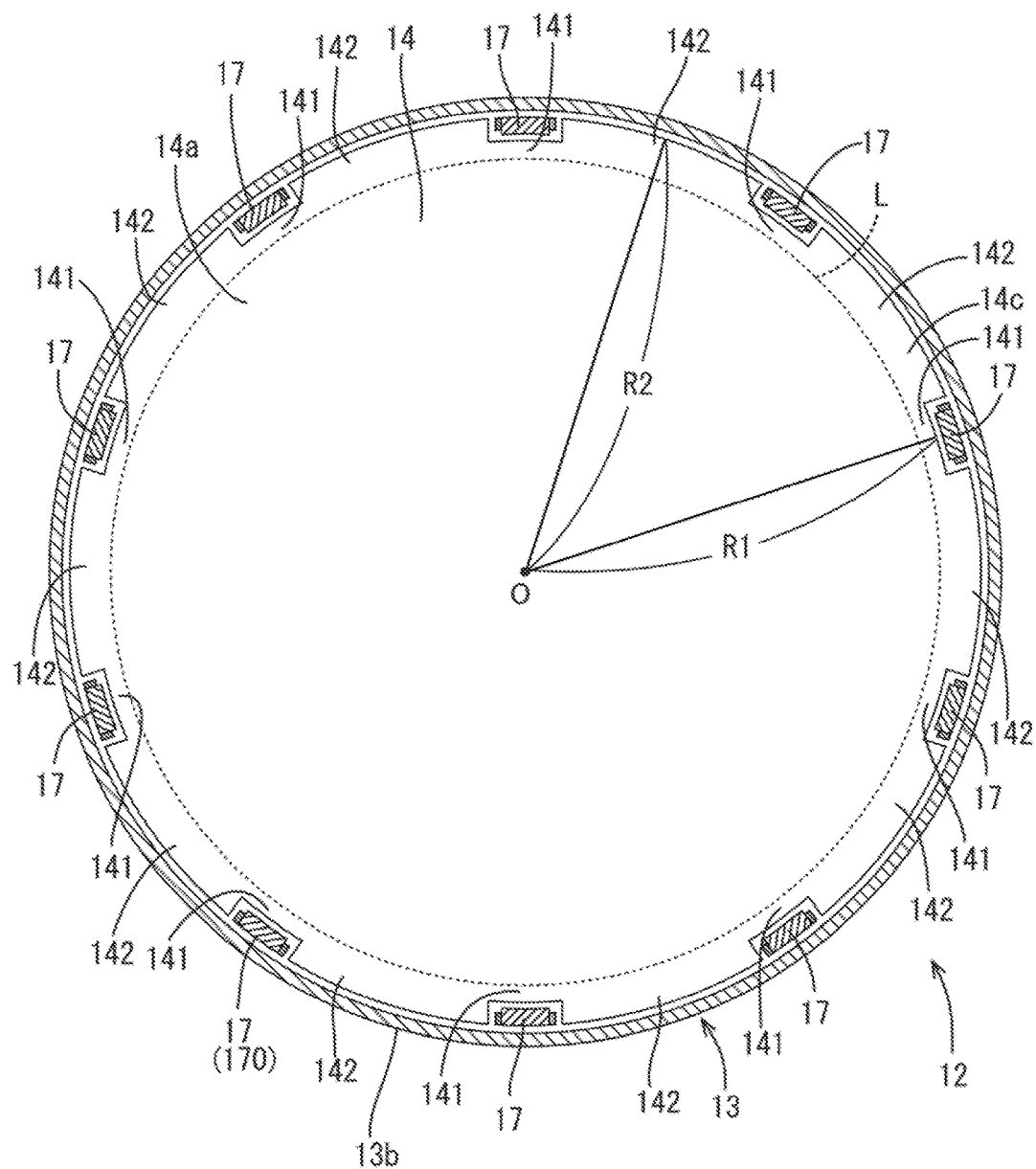
FIG. 3 is a plan view of a backlight unit included in the liquid crystal display device.
Figure 4:
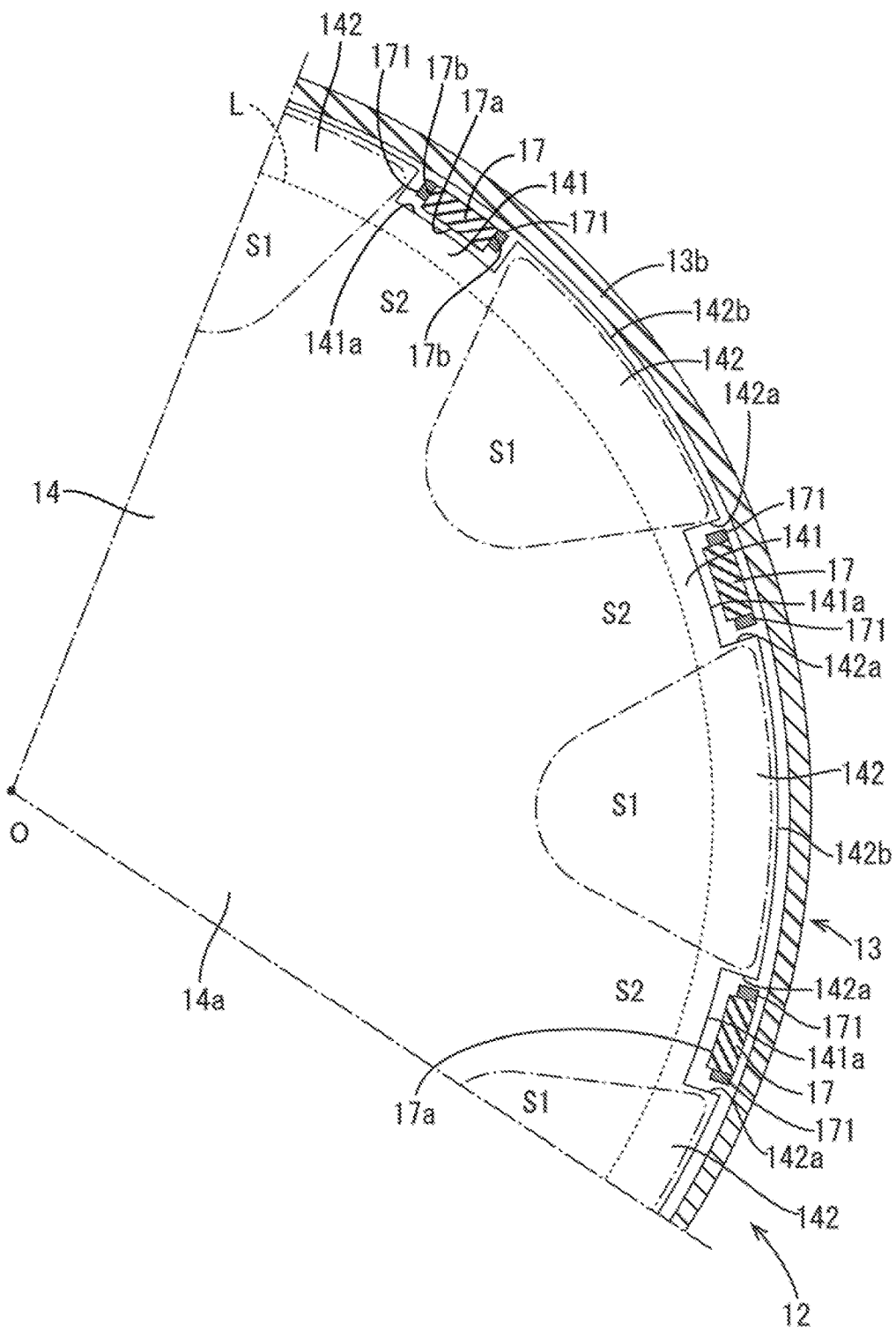
FIG. 4 is a magnified view of LEDs and therearound in FIG. 3.

Next, the light entering portions 141, the circumferentially aligned portions 142, and the positioning mechanism of the light guide plate 14 in the chassis 13 will be described in detail with reference to FIGS. 3 and 4. FIG. 3 is a plan view of the backlight unit 12 included in the liquid crystal display device 10. FIG. 4 is a magnified view of a portion of FIG. 3 including the LEDs 17 and therearound. FIGS. 3 and 4 illustrate the backlight unit 12 without the optical sheet 15 and with the light exiting surface 14*a* of the light guide plate 14 exposed. In FIGS. 3 and 4, reference sign "O" indicates the center of the annular light source 170, the center of the light guide plate 14, and the center of the chassis 13. In FIGS. 3 and 4, the cutout 13*b*1 of the peripheral wall 13*b* of the chassis 13 is omitted. In FIGS. 3 and 4, an area inside circular broken line L corresponds to the display area of the liquid crystal panel 11 and an area outside broken line L corresponds to the non-display area.

As illustrated in FIG. 3, the light entering portions 141 are portions of the periphery 14*c* of the light guide plate 14 opposed to the LEDs 17. The light entering portions 141 are arranged at intervals (equal intervals) in the circumferential direction in the circular pattern. The light entering portions 141 include light source opposed surfaces 141*a* that are flat surfaces opposed to the LEDs 17, respectively. The light source opposed surfaces 141*a* and the light emitting surfaces 17*a* of the respective LEDs 17 are parallel to each other with a small gap (a clearance) therebetween.

The circumferentially aligned portions 142 include portions of the periphery 14*c* of the light guide plate 14, each located between the adjacent light entering portions 141. The circumferentially aligned portions 142 and the light entering portions 141 are connected to each other. The circumferentially aligned portions 142 are arranged at intervals (equal intervals) in the circumferential direction in a circular pattern.

A dimension R2 between the center O of the light guide plate 14 and an edge of each circumferentially aligned portion 142 in the radial direction is larger than a dimension R1 between the center O of the light guide plate 14 and an edge of each light entering portion 141 in the radial direction. Namely, the circumferentially aligned portions 142 project outward farther than the light entering portions 141.

The circumferentially aligned portions 142 are arranged such that the circumferentially aligned portions 142 and the LEDs 17 are aligned in the circumferential direction. The circumferentially aligned portions 142 include parallel contact surfaces 142*a* that are parallel to the side surfaces 17*b* of the reflective LEDs 17. The parallel contact surfaces 142*a* are opposed to the side surfaces 17*b* of the respective LEDs 17 in the circumferential direction. The terminals 171 of the LEDs 17 are disposed on the sides of the LEDs 17. The circumferentially aligned portions 142 include arc peripheral surfaces 142*b* opposed to an inner surface of the peripheral wall 13*b* of the chassis 13. Distance between the peripheral wall 13*b* and the peripheral surfaces 142*b* are constant for an entire periphery of the light guide plate 14.

The light source opposed surface 141*a* of each light entering portion 141 is between the parallel contact surfaces 142*a* of the adjacent circumferentially aligned portions 142 on the sides of the light entering portion 141. Each LED 17 is disposed in a space defined by the light source opposed surface 141*a* and the parallel contact surfaces 142*a*.

The LED board 18 on which the LEDs 17 are mounted is fixed to the bottom wall 13*a* of the chassis 13 with the board fixing tape 21 that is a double sided adhesive tape, as described earlier. Namely, the LEDs 17 (the annular light source 170) mounted on the LED board 18 are positioned inside the chassis 13. The light guide plate 14 is held in a space inside the annular light source 170 that is positioned inside the chassis 13 with the centers thereof. The light guide plate 14 is held in the space inside the annular light source 170 such that the light entering portions 141 are positioned relative to the respective LEDs 17.

When the light guide plate 14 and the annular light source 170 are held in the chassis 13 with such a positional relationship, rotation of the light guide plate 14 inside the chassis 13 is restricted. Specifically, when the light guide plate 14 is rotated in the circumferential direction (either clockwise or counterclockwise) and the parallel contact surfaces 142*a* of the circumferentially aligned portions 142 move toward the side surfaces 17*b* of the LEDs 17, the parallel contact surfaces 142*a* contact the side surfaces 17*b*. Distances between the parallel contact surfaces 142*a* and the side surfaces 17*b* of the LEDs 17 are small. Even if the light guide plate 14 slightly moves in the circumferential direction, the circumferentially aligned portions 142 including the light reflecting patterns S including the reflecting segments with higher density on the back surface are less likely to be placed in front of the LEDs 17 (in the optical axis direction). In FIG. 4, areas S1 defined by chain lines correspond to the light reflecting patterns S1 including the light reflecting segments with higher density on the back surface 14*b* of the light guide plate 14. Areas S2 outside the areas S1 correspond to the light reflecting pattern S2 including the light reflecting segments with lower density on the back surface 14*b* of the light guide plate 14.

In the backlight unit 12 according to this embodiment, the circumferentially aligned portions 142 of the light guide plate 14 are held against the LEDs 17 in the circumferential direction. In the backlight unit 12 according to this embodiment, the rotation of the light guide plate 14 having the round shape in the circumferential direction is restricted and thus the uneven brightness of the exiting light can be reduced.

Next, a backlight unit according to other embodiments of the present invention will be described. In the following description that describes the other embodiments, components similar to those of the first embodiment will be indicated with the same reference signs and will not be described in detail. Components that are not similar to those of the first embodiment but correspond to the components of the first embodiment will be indicated with reference signs with letter added (e.g. "A" will be added to the reference signs in a second embodiment). Backlight units without optical sheets and light exiting surfaces of light guide plates exposed on the front sides will be illustrated for the purpose of illustration. Furthermore, cutouts of peripheral walls of chasses and reflection patterns on back surfaces of the light guide plates of the following embodiments will not be illustrated. Similar to the first embodiment, reference sign "O" indicates the center of an annular light source, the center of the light guide plate, and the center of the chassis in each embodiment.

Second Embodiment

Figure 5:
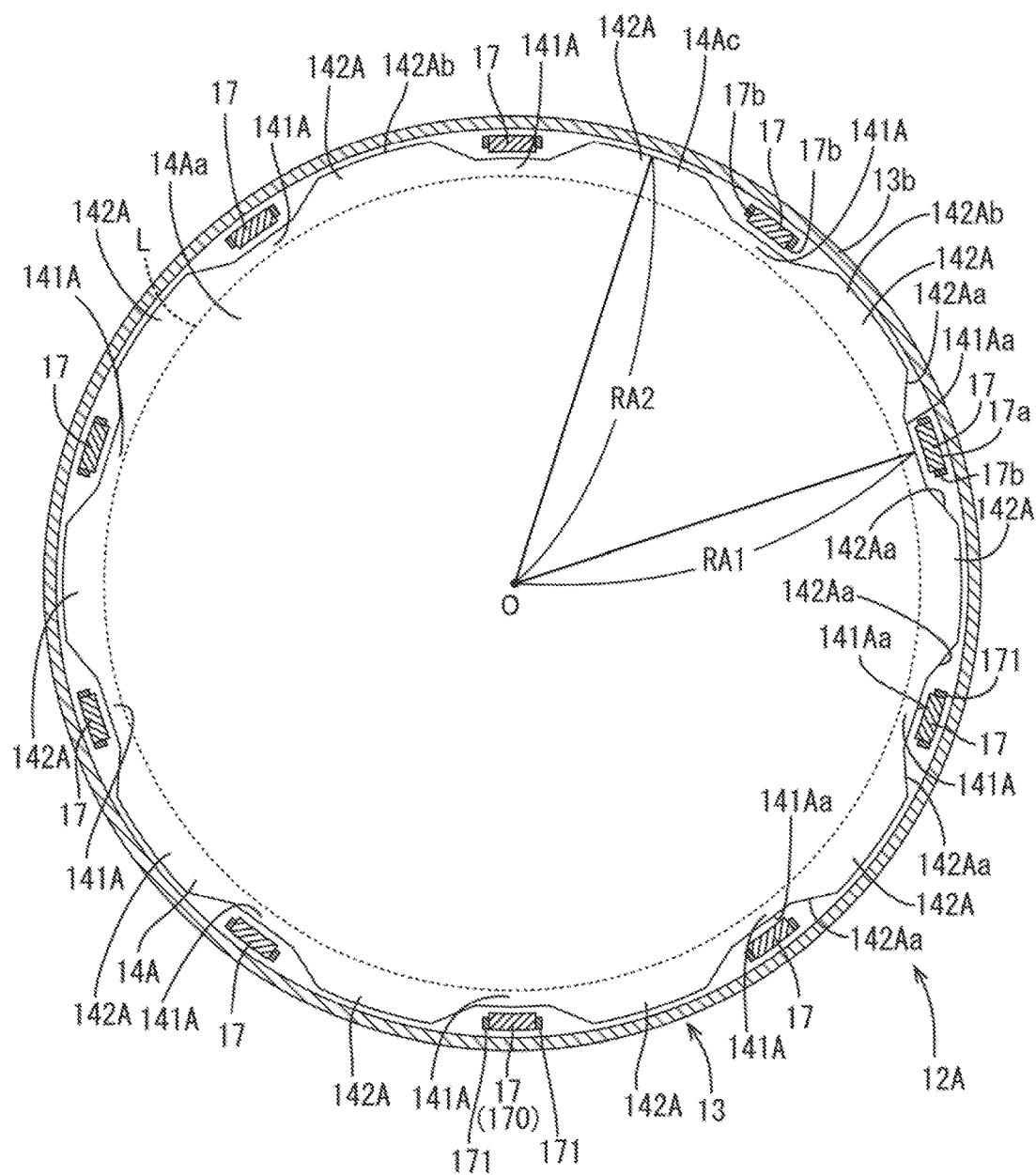
FIG. 5 is a plan view of a backlight unit according to a second embodiment.

FIG. 5 is a plan view of a backlight unit 12A according to the second embodiment. As illustrated in FIG. 5, a light guide plate 14A has a round overall shape in a plan view. A periphery 14c of the light guide plate 14A includes light entering portions 141A arranged at intervals (equal intervals) in the circumferential direction in a circular pattern. The light entering portions 141A include light source opposed surfaces 141Aa parallel to the light emitting surfaces 17a of the LEDs 17 with small gaps (clearances) therebetween.

Similar to the first embodiment, circumferentially aligned portions 142A include portions of the light guide plate 14A arranged between adjacent light entering portions 141A. The circumferentially aligned portions 142A and the LEDs 17 are aligned in the circumferential direction. The circumferentially aligned portions 142A in this embodiment include sloped contact surfaces 142Aa angled to the side surfaces 17b of the respective LEDs 17 with respect to the radial direction. The sloped contact surfaces 142Aa and the LEDs 17 are aligned in the circumferential direction. Each sloped contact surface 142Aa is angled such that a distance from the adjacent LED 17 increases as a distance from the center O increases in the radial direction.

A dimension RA2 between the center O of the light guide plate 14A and an edge of each circumferentially aligned portion 142A is set larger than a dimension RA1 between the center O of the light guide plate 14A and an edge of each light entering portion 141A. The circumferentially aligned portions 142A protrude outward farther than the light entering portions 141A.

Light source opposed surfaces 141Aa of the light entering portions 141A are arranged between the sloped contact surfaces 142Aa of the circumferentially aligned portions 142A on sides of the light entering portions 141A. Each LED 17 is disposed in a space defined by the light source opposed surface 141Aa and two parallel contact surfaces 142Aa. Distances between arc peripheral surfaces 142Ab of the circumferentially aligned portions 142A and the peripheral wall 13b of the chassis 13 are constant for an entire periphery of the light guide plate 14.

In this embodiment, the light guide plate 14A is held in a space inside the annular light source 170 that is positioned inside the chassis 13 with the center of the light guide plate 14A aligned with the center of the annular light source 170. According to the configuration, the rotation of the light guide plate 14A in the circumferential direction is restricted. Namely, when the light guide plate 14A is rotated in the circumferential direction (clockwise or counterclockwise) and the sloped contact surfaces 142Aa of the circumferentially aligned portions 142A move toward the side surfaces 17b of the LEDs 17, the sloped contact surfaces 142Aa of the circumferentially aligned portions 142A contact the side surfaces 17b. According to the configuration, the rotation of the light guide plate 14A is restricted. Therefore, the light guide plate 14A is not rotated father to a position at which the circumferentially aligned portions 142A are in front of the respective LEDs 17 (in the optical axis direction).

Because the circumferentially aligned portions 142A of this embodiment includes the sloped contact surfaces 142Aa, impact of the circumferentially aligned portions 142A on the LEDs 17 can be reduced.

Third Embodiment

Figure 6:
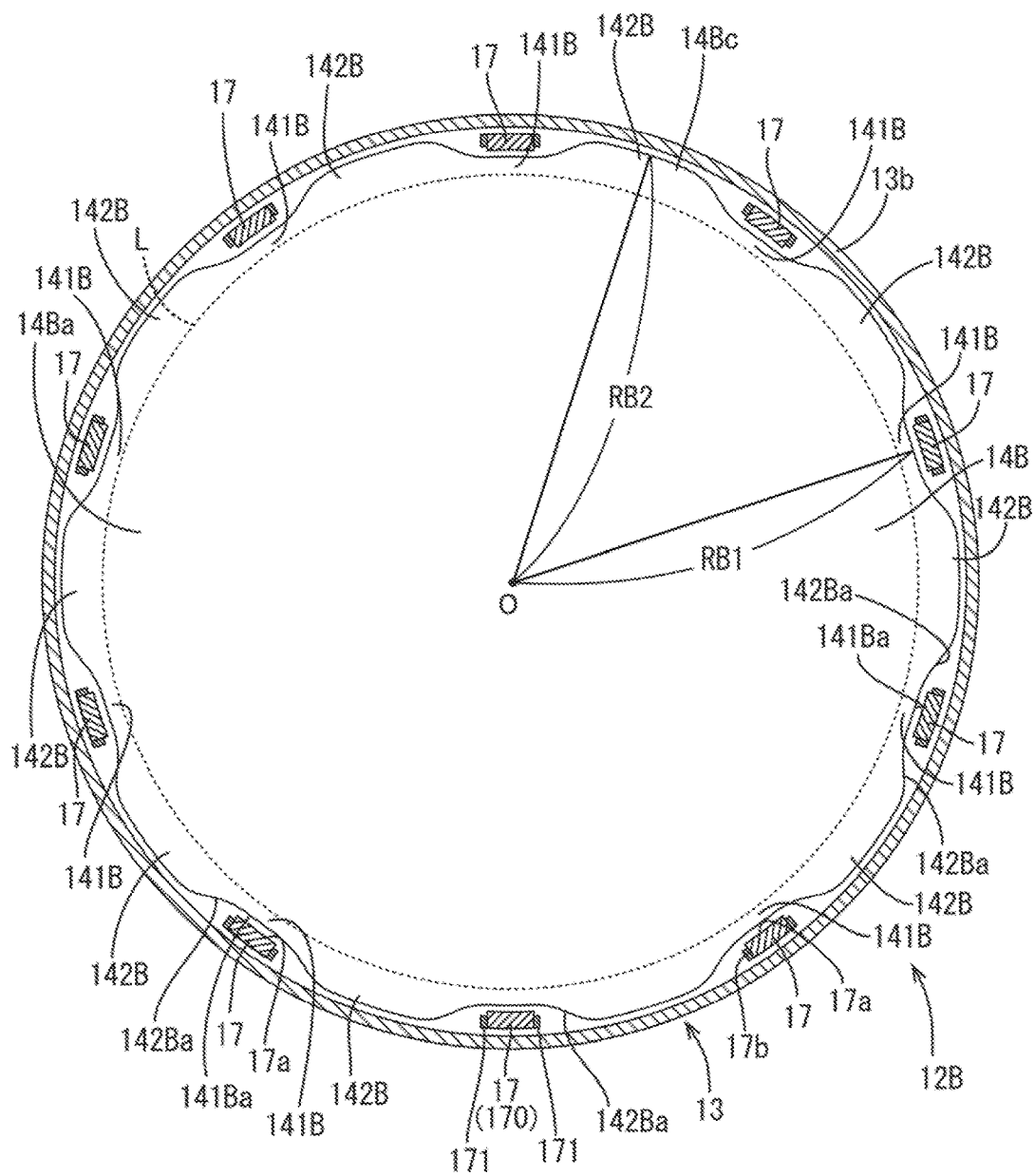
FIG. 6 is a plan view of a backlight unit according to a third embodiment.

A backlight unit 12B according to a third embodiment of the present invention will be described with reference to FIG. 6. FIG. 6 is a plan view of the backlight unit 12B according to the third embodiment. A light guide plate 14B included in the backlight unit 12B according to this embodiment includes round corners as if corners of the light guide plate 14A of the second embodiment are rounded.

In this embodiment, the light guide plate 14B is held in a space inside the annular light source 170 that is positioned inside the chassis 13 with the center of the light guide plate 14B aligned with the center of the annular light source 170. According to the configuration, the rotation of the light guide plate 14B in the circumferential direction is restricted. Namely, when the light guide plate 14B is rotated in the circumferential direction (clockwise or counterclockwise) and sloped contact surfaces 142Ba of circumferentially aligned portions 142B move toward the side surfaces 17b of the LEDs 17, the sloped contact surfaces 142Ba of the circumferentially aligned portions 142B contact the side surfaces 17b. According to the configuration, the rotation of the light guide plate 14B is restricted. Therefore, the light guide plate 14B is not rotated father to a position at which the circumferentially aligned portions 142B are in front of the respective LEDs 17 (in the optical axis direction).

Because the circumferentially aligned portions 142B of this embodiment includes the sloped contact surfaces 142Ba, impact of the circumferentially aligned portions 142B on the LEDs 17 can be reduced. Especially, because light source opposed surfaces 141Ba of the light entering portions 141B and the sloped contact surfaces 142Ba have smooth transitions, the impact of the circumferentially aligned portions 142B on the LEDs 17 can be further reduced.

Fourth Embodiment

Figure 7:
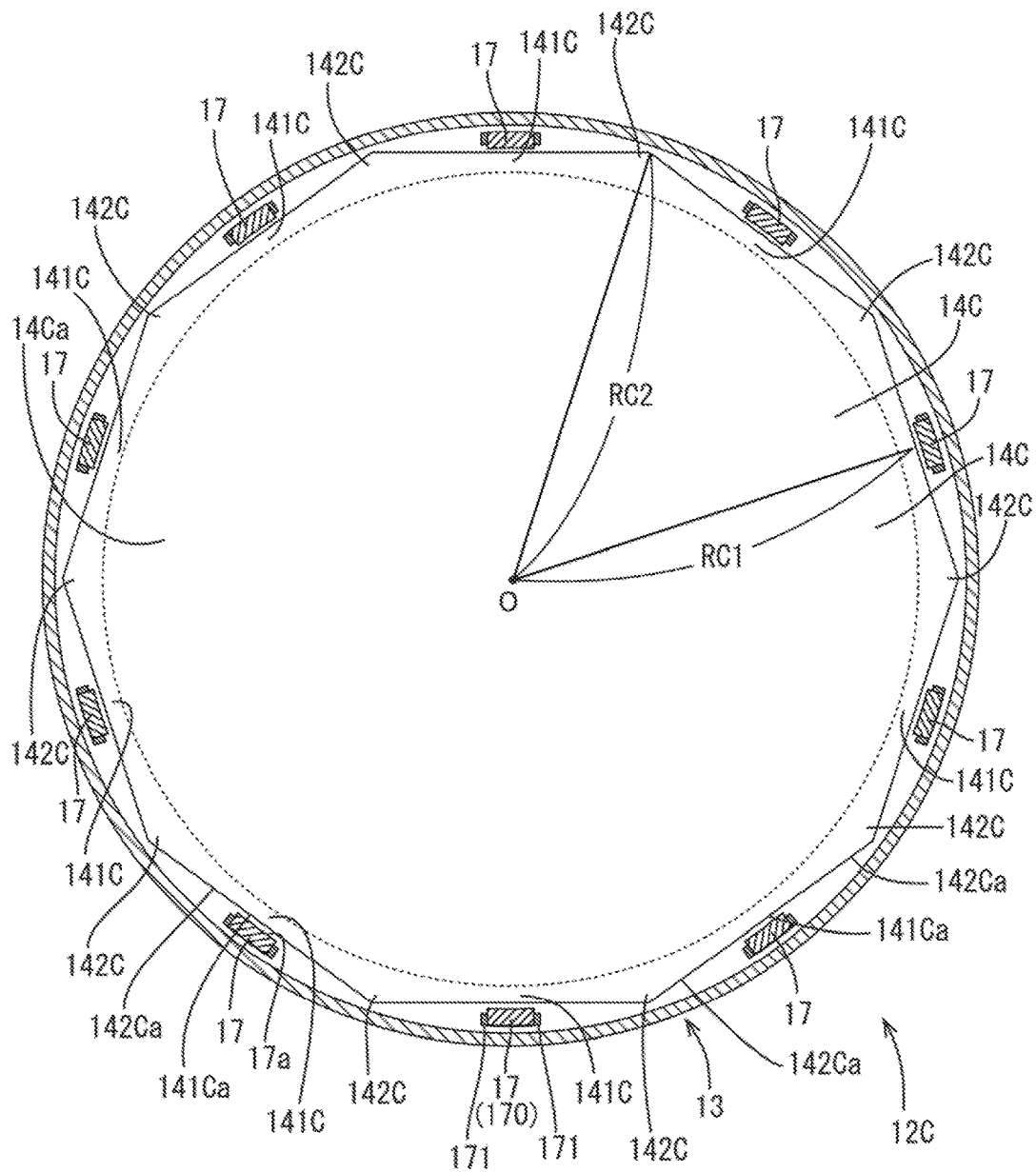
FIG. 7 is a plan view of a backlight unit according to a fourth embodiment.

A backlight unit 12C according to a fourth embodiment of the present invention will be described with reference to FIG. 7. FIG. 7 is a plan view of the backlight unit 12C according to the fourth embodiment. The backlight unit 12C according to this embodiment includes a light guide plate 14C. The light guide plate 14C includes light entering portions 141C including light source opposed surfaces 141Ca and circumferentially aligned portions including continuous contact surfaces 142Ca that continues from the light source opposed surfaces 141Ca to be flush with the light source opposed surfaces 141Ca. The continuous contact surfaces 142Ca and the LEDs 17 are aligned in the circumferential direction.

In this embodiment, the light guide plate 14C is held in a space inside the annular light source 170 that is positioned inside the chassis 13 with the center of the light guide plate 14C aligned with the center of the annular light source 170. According to the configuration, the rotation of the light guide plate 14C in the circumferential direction is restricted. Namely, when the light guide plate 14C is rotated in the circumferential direction (clockwise or counterclockwise) and the continuous contact surfaces 142Ca of circumferentially aligned portions 142C move toward the side surfaces 17b of the LEDs 17, the continuous contact surfaces 142Ba of the circumferentially aligned portions 142C contact the side surfaces 17b. According to the configuration, the rotation of the light guide plate 14C is restricted. Therefore, the light guide plate 14C is not rotated father to a position at which the circumferentially aligned portions 142C are in front of the respective LEDs 17 (in the optical axis direction).

Fifth Embodiment

Figure 8:
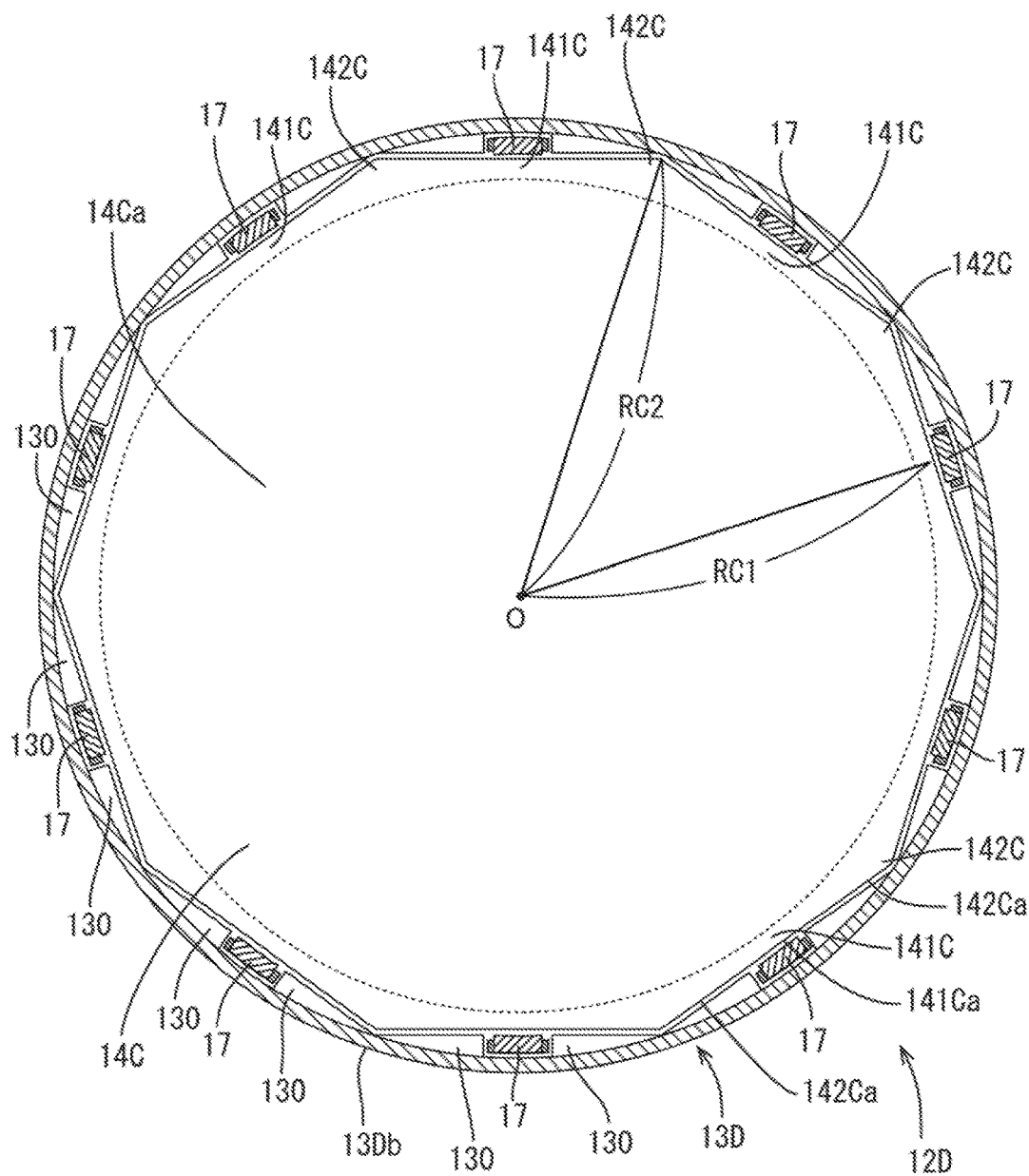
FIG. 8 is a plan view of a backlight unit according to a fifth embodiment.

A backlight unit 12D according to a fifth embodiment of the present invention will be described with reference to FIG. 8. FIG. 8 is a plan view of the backlight unit 12D according to the fifth embodiment. The backlight unit 12D according to this embodiment includes the light guide plate 14C included in the fourth embodiment. However, the backlight unit 12D according to this embodiment includes a chassis 13D having a configuration different from that of the chassis 13 in each of the above embodiment.

The chassis 13D includes a peripheral wall 13Db including circumferentially arranged protrusions 130. The circumferentially arranged protrusions 130 protrude toward the light guide plate 14D to align with the LEDs 17 in the circumferential direction. The circumferentially arranged protrusions 130 and circumferentially aligned portions 142C are aligned in the circumferential direction. The circumferentially arranged protrusions 130 contact the respective circumferentially aligned portions 142C when the light guide plate 14C is rotated.

The circumferentially arranged protrusions 130 are disposed on left and right sides of the respective LEDs 17. The circumferentially arranged protrusions 130 are opposed to continuous contact surfaces 142Ca of the circumferentially aligned portions 142C with gaps therebetween. The circumferentially arranged protrusions 130 are opposed to the LEDs 17 with gaps therebetween in the circumferential direction.

In such a backlight unit 12D, the light guide plate 14C is held in a space inside the annular light source 170 that is positioned inside the chassis 13D with the center thereof aligned with the center of the annular light source 170. According to the configuration, the rotation of the light guide plate 14C in the circumferential direction is restricted by the circumferentially arranged protrusions 130. Namely, when the light guide plate 14C is rotated in the circumferential direction (clockwise or counterclockwise), the circumferentially aligned portions 142C contact the circumferentially arranged protrusions 130. According to the configuration, the rotation of the light guide plate 14C is restricted. Therefore, the light guide plate 14C is not rotated father to a position at which the circumferentially aligned portions 142C are in front of the respective LEDs 17 (in the optical axis direction).

The circumferentially arranged protrusions 130 contact the circumferentially aligned portions 142C before the LEDs 17 contact the circumferentially aligned portions 142C. Therefore, the LEDs 17 are protected from impact.

Sixth Embodiment

Figure 9:
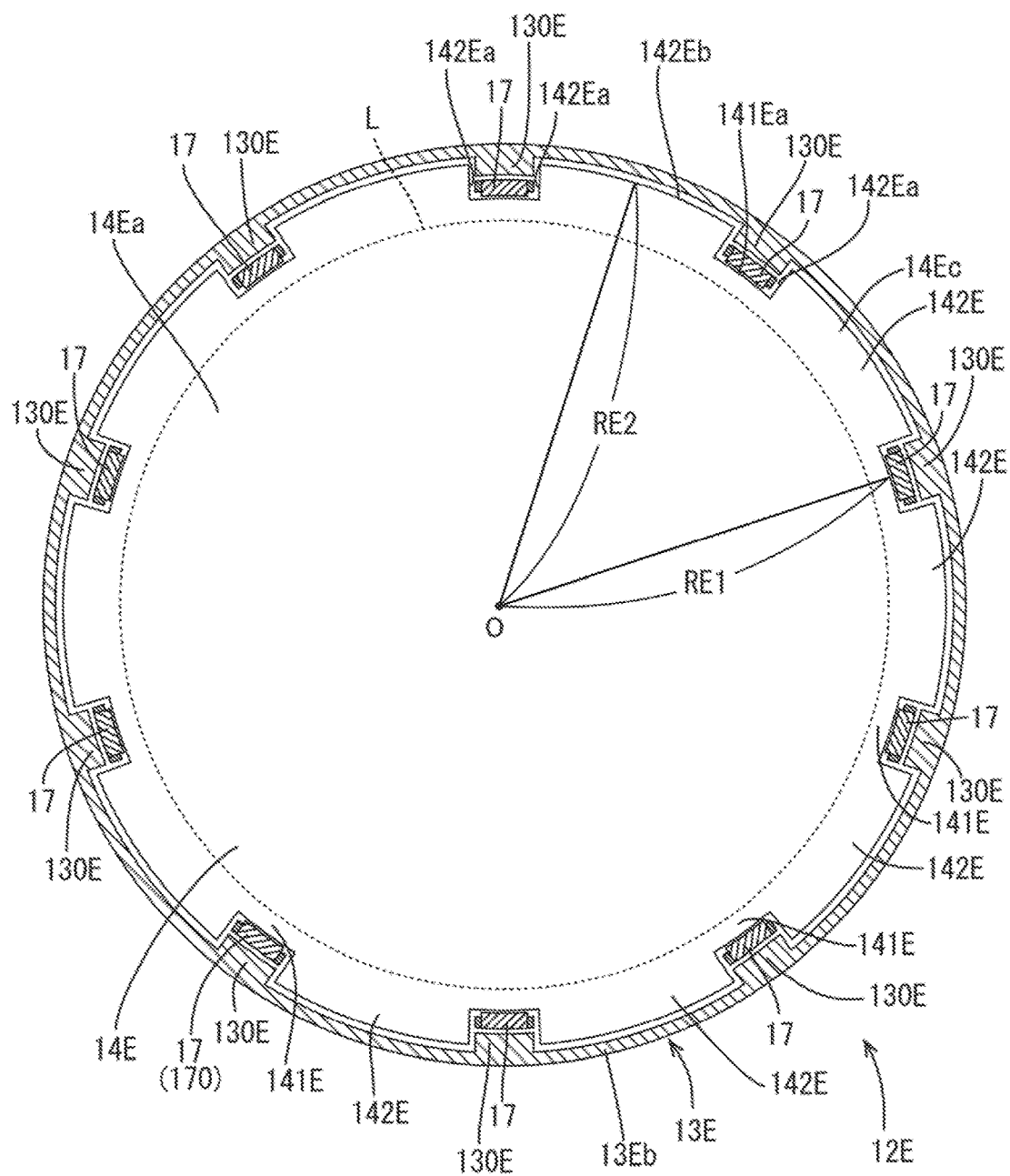
FIG. 9 is a plan view of a backlight unit according to a sixth embodiment.
Figure 10:
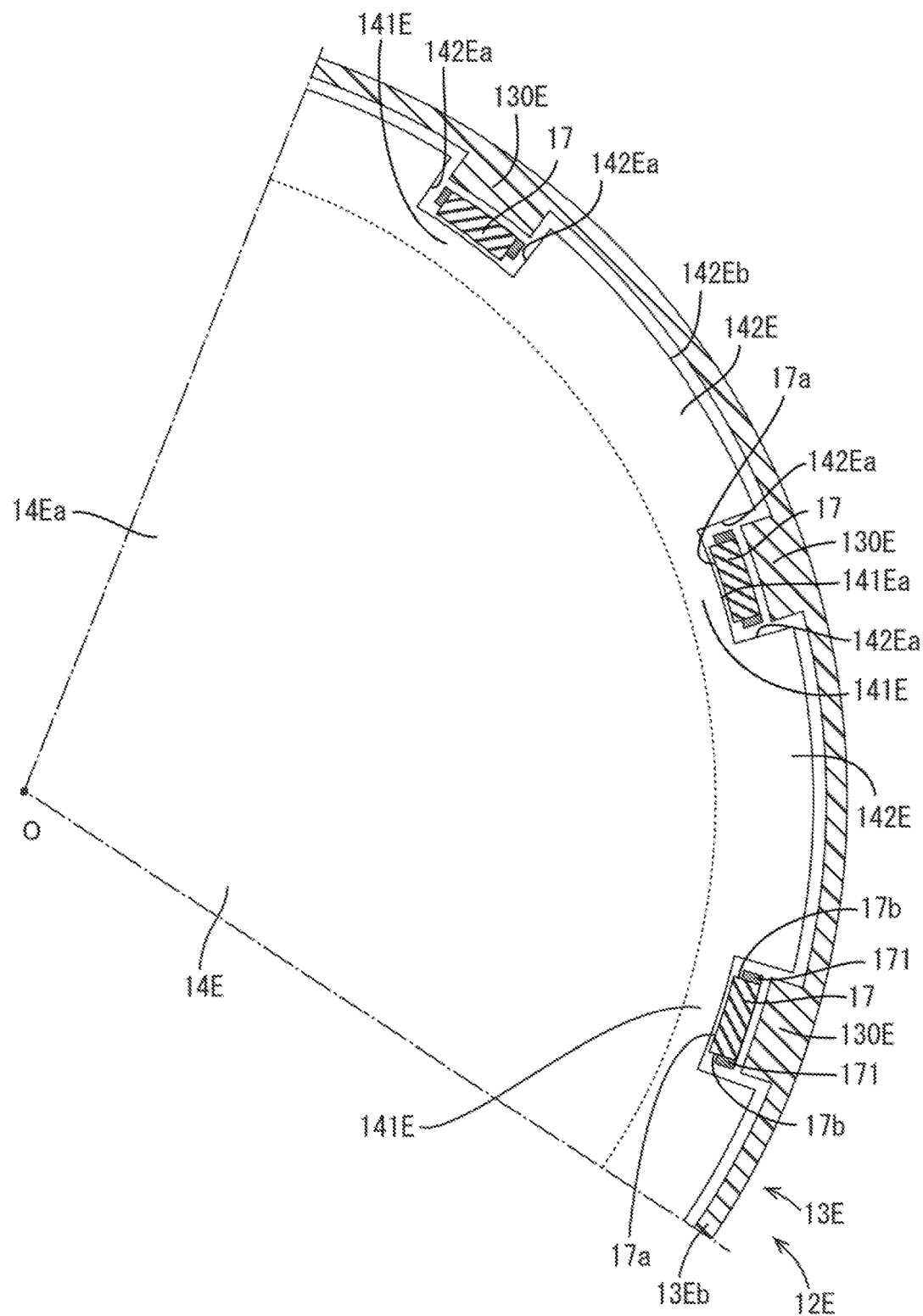
FIG. 10 is a magnified view of LEDs and therearound in FIG. 9.

A backlight unit 12E according to a sixth embodiment of the present invention will be described with reference to FIGS. 9 and 10. FIG. 9 is a plan view of the backlight unit 12E according to the sixth embodiment. FIG. 10 is a magnified view of a portion of FIG. 9 including the LEDs 17 and therearound. The backlight unit 12E according to this embodiment includes a light guide plate 14E and a chassis 13E.

The chassis 13E includes a peripheral wall 13Eb that includes radially arranged protruding portions 130E that protrude toward the light guide plate 14E to be aligned with the LEDs 17 in the radial direction, respectively. The radially arranged protruding portions 130E are aligned with circumferentially aligned portions 142E in the circumferential direction. Each radially arranged protruding portion 130E has a dimension in the circumferential direction larger than a dimension of the LED in the circumferential direction. The radially arranged protruding portions 130E contact the respective circumferentially aligned portions 142E when the light guide plate 14E is rotated.

The light guide plate 14E has a round overall shape in a plan view. The light guide plate 14E includes light entering portions 141E that are annularly arranged at intervals (equal intervals) in the circumferential direction. The light entering portions 141E are located at a periphery of the light guide plate 14E. Light source opposed surfaces 141Ea of the light entering portions 141E are parallel to the light emitting surfaces 17a of the LEDs 17 with small gaps (clearances) therebetween, respectively.

Each circumferentially aligned portion 142E is arranged between the adjacent light entering portions 141E. The circumferentially aligned portions 142E are aligned with the LEDs 17 in the circumferential direction. Furthermore, the circumferentially aligned portions 142E and aligned with the radially arranged protruding portions 130E in the circumferential direction. The circumferentially aligned portions 142E include contact surfaces 142Ea, respectively. The contact surfaces 142Ea are flat surfaces parallel to side surfaces of the respective LEDs 17 and the respective radially arranged protruding portions 130E.

A dimension RE2 between the center O of the light guide plate 14E and an edge of each circumferentially aligned portion 142E is larger than a dimension RE1 between the center O of the light guide plate 14E and an edge of each light entering portion 141E. The circumferentially aligned portions 142E protrude outward farther than the light entering portions 141A.

The light source opposed surface 141Ea of each light entering portion 141E is between the contact surfaces 142Ea of the adjacent circumferentially aligned portions 142A. Each LED 17 is in a space defined by the light source opposed surface 141Aa and two contact surfaces 142Ea. The corresponding radially arranged protruding portion 130E that protrudes inward from a peripheral wall 13Eb of the chassis 13E is arranged in the space on an outer side with respect to the radial direction. Curved outer end surfaces 142Eb of the circumferentially aligned portions 142E are a predefined distance away from an inner surface of the peripheral wall 13Eb of the chassis 13E for an entire periphery of the light guide plate 14E.

In this embodiment, the light guide plate 14E is held in an inner space of the annular light source 170 that is positioned inside the chassis 13E with the center of the light guide plate 14E aligned with the center of the annular light source 170. According to the configuration, rotation of the light guide plate 14E in the circumferential direction is restricted by the radially arranged protruding portions 130E. When the light guide plate 14E is rotated in the circumferential direction (clockwise or counterclockwise), the circumferentially aligned portions 142E contact the radially arranged protruding portions 130E and thus the rotation of the light guide plate 14E is restricted. Therefore, the light guide plate 14E is less likely to rotate to a position at which the circumferentially aligned portions 142E are positioned in front of the LEDs 17 (in the optical axis direction).

The radially arranged protruding portions 130E contact the circumferentially aligned portions 142E before the LEDs 17 contact the circumferentially aligned portions 142E. According to the configuration, the LEDs 17 are protected from impact. Especially, when the dimension of each radially arranged protruding portion 130E in the circumferential direction is larger than the dimension of each LED 17 in the circumferential direction, the radially arranged protruding portions 130E are further more likely to contact the circumferentially aligned portions 142E before the LEDs 17 contact the circumferentially aligned portions 142E. Therefore, the protection of the LEDs 17 is further reliable.

Seventh Embodiment

Figure 11:
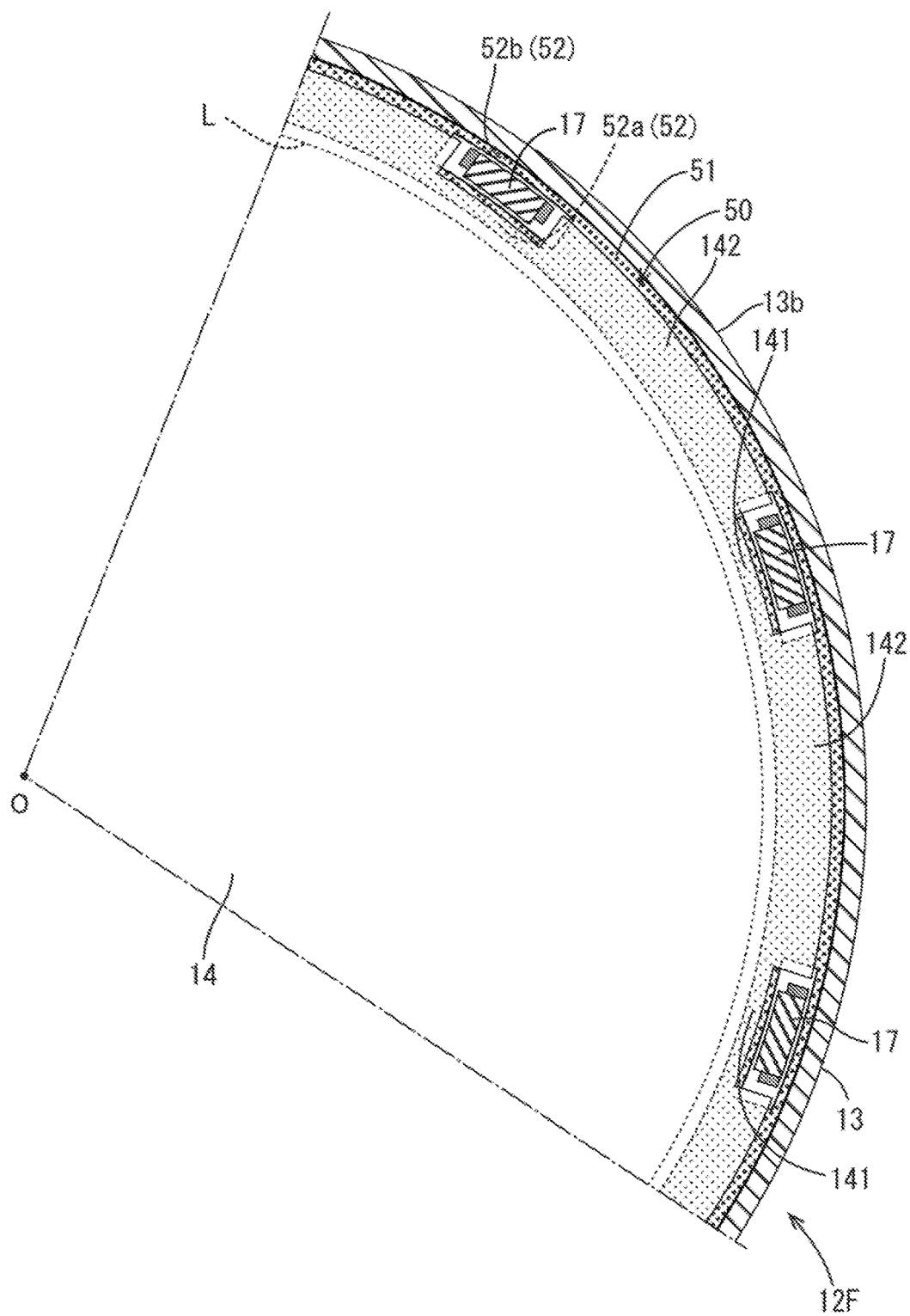
FIG. 11 is a magnified view of a portion of a backlight unit according to a seventh embodiment including LEDs and therearound.
Figure 12:
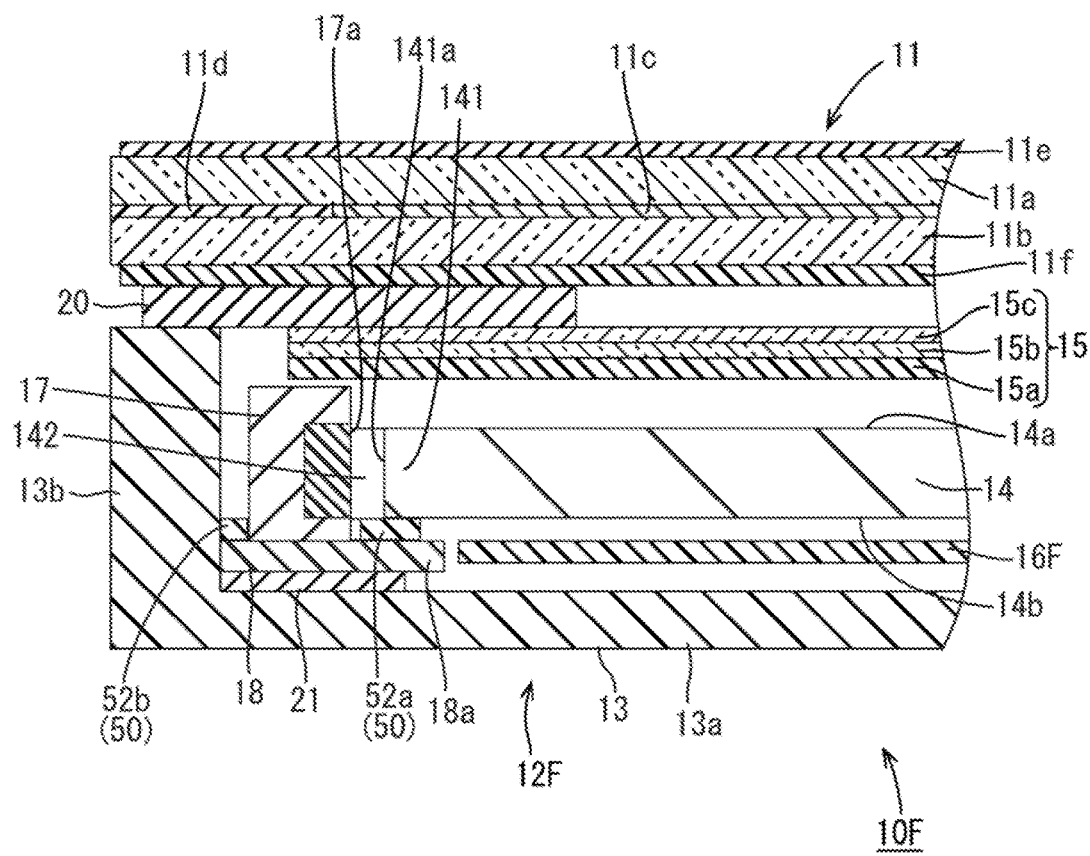
FIG. 12 is a magnified view of a portion of a liquid crystal display device according to the seventh embodiment including LEDs and therearound.

A liquid crystal display device 10F and a backlight unit 12F according to a seventh embodiment of the present invention will be described with reference to FIGS. 11 and 12. FIG. 11 is a magnified view of the backlight unit 12E according to the seventh embodiment including the LEDs 17 and therearound. FIG. 12 is a cross-sectional view of a portion of the liquid crystal display device 10F according to the seventh embodiment including the LEDs 17 and therearound.

The backlight unit 12F according to this embodiment includes the chassis 13 and the light guide plate 14 included in the first embodiment. In the backlight unit 12F, the light guide plate 14 is fixed to the LED board 18 (an example of a supporting member on the back side of the light guide plate 14) with a light guide plate fixing member 50 that is a double sided adhesive fixing member having a light blocking property. The LED board 18 is fixed to the bottom wall 13a of the chassis 13 with the board fixing tape 21. Because the light guide plate 14 is fixed to the LED board 18 that is fixed to the bottom wall 13a, the light guide plate 14 is fixed to the bottom wall 13a of the chassis 13.

The light guide plate fixing member 50 has an annular overall shape (a closed ring shape) in a plan view. The light guide plate fixing member 50 is disposed in the chassis 13 with the center thereof aligned with the center of the light guide plate 14. The light guide plate fixing member 50 may be a black double sided adhesive tape having a predefined thickness. The light guide plate fixing member 50 includes a front adhesive surface and a back adhesive surface that can adhere to objects, respectively.

In this embodiment, the front adhesive surface of the light guide plate fixing member 50 is affixed to the back surface of the light guide plate 14 and the back adhesive surface thereof is affixed to the front surface of the base portion 18a of the LED board 18 having the annular shape. The light guide plate fixing member 50 is disposed in an area corresponding to the non-display area of the liquid crystal panel 11.

The light guide plate fixing member 50 includes a first fixing portions 51 and a second fixing portions 52. The first fixing portions 51 are affixed to the circumferentially aligned portions 142 of the light guide plate 14. The second fixing portions 52 are affixed to the light entering portions 142 of the light guide plate 14.

The light guide plate fixing member 50 includes the first fixing portions 51 that are assigned to circumferentially aligned portions 142, respectively. The first fixing portions 51 are arranged in a circular pattern. One of surfaces (a front adhesive surface) of each first fixing portion 51 is affixed to the rear surface of the corresponding circumferentially aligned portion 142. The other one of the surfaces (a back adhesive surface) of each first fixing portion 51 is affixed to the LED board 18 that is a supporting member. According to the configuration, the circumferentially aligned portions 142 and the LED board 18 are fixed together.

The second fixing portions 52 function as connecting portions for connecting adjacent first fixing portions 51 to one another. One of surfaces (a front adhesive surface) of each second fixing portion 52 is affixed to the back surface of the light entering portion 141. The other one of the surfaces (a back adhesive surface) of each second fixing portion 52 is affixed to the LED board 18 that is the supporting member. According to the configuration, the light entering portions 141 and the LED board 18 are fixed together.

The second fixing portions 52 include inner second fixing portions 52a and outer second fixing portions 52b. The inner second fixing portions 52a are located inner than the LEDs 17. The outer second fixing portions 52b are located outer than the LEDs 17. In this embodiment, the inner second fixing portions 52a of the second fixing portions 52 fix the light guide plate 14 and the LED board 18 together.

In the backlight unit 12F according to this embodiment, the light guide plate 14 is positioned relative to the chassis 13 with the light guide plate fixing member 50 in addition to the LEDs 17 and the circumferentially aligned portions 142 that are held together as described above. Therefore, the rotation of the light guide plate 14 is further less likely to occur in the backlight unit 12F according to this embodiment.

The light guide plate fixing member 50 has a function for filling gaps between the light guide plate 14 and the LED board 18 while blocking light. According to the configuration, light rays emitted by the LEDs 17 are less likely to directly enter the gaps between the light guide plate 14 and the LED board 18. Therefore, the light rays emitted by the LEDs 17 enter the light guide plate 14 with high efficiency.

Because the light guide plate fixing member 50 has the closed ring shape, the affixation of the light guide plate fixing member 50 to an object can be efficiently performed.

In this embodiment, a reflection sheet 16E disposed on the back surface 14b of the light guide plate 14 is configured such that a periphery of the light guide plate 14 do not touch the LED board 18. The reflection sheet 16E is sandwiched between the light guide plate 14 and the bottom wall 13a and held in the chassis 13.

Eighth Embodiment

Figure 13:
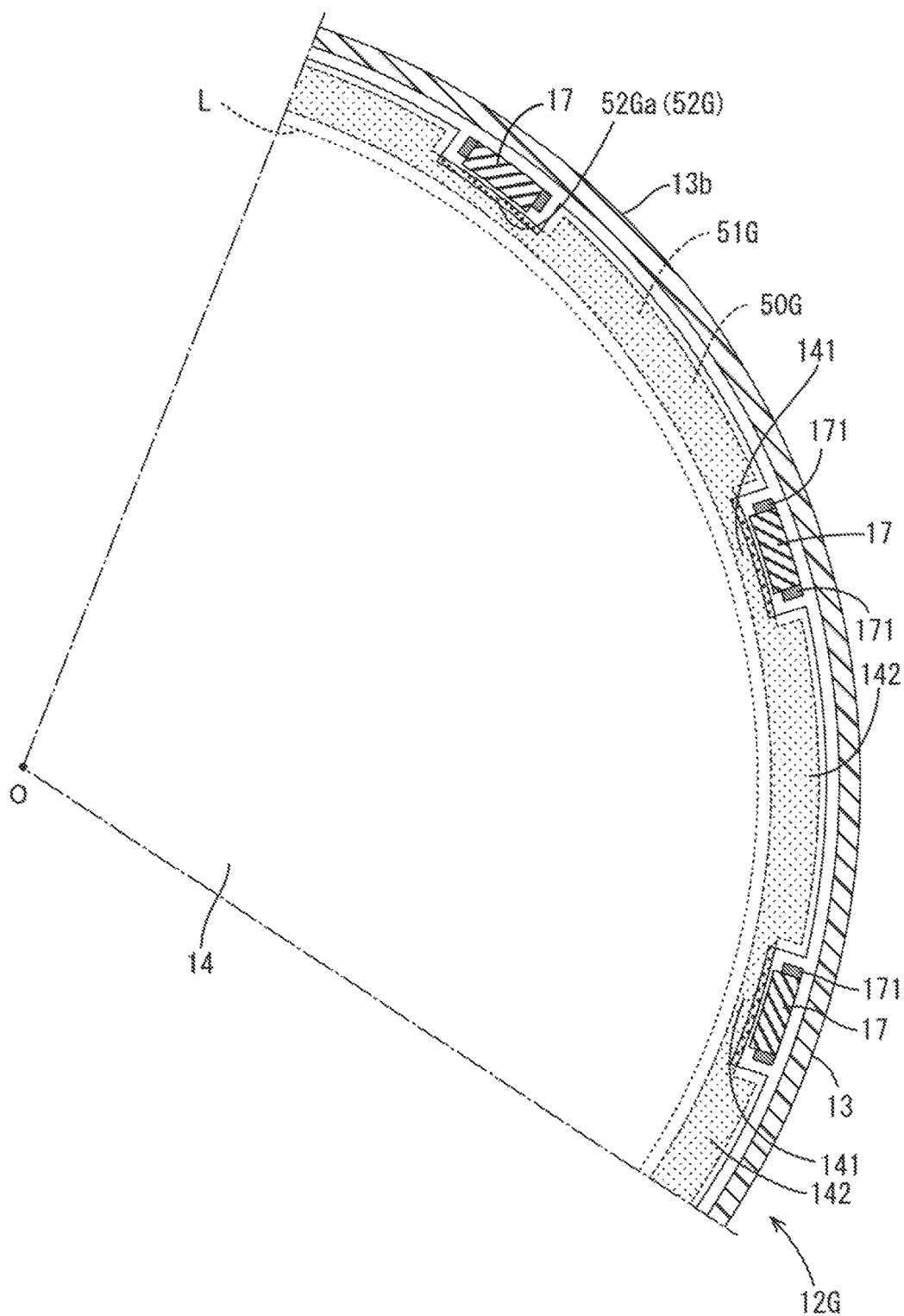
FIG. 13 is a magnified view of a portion of a backlight unit according to an eighth embodiment including LEDs and therearound.
Figure 14:
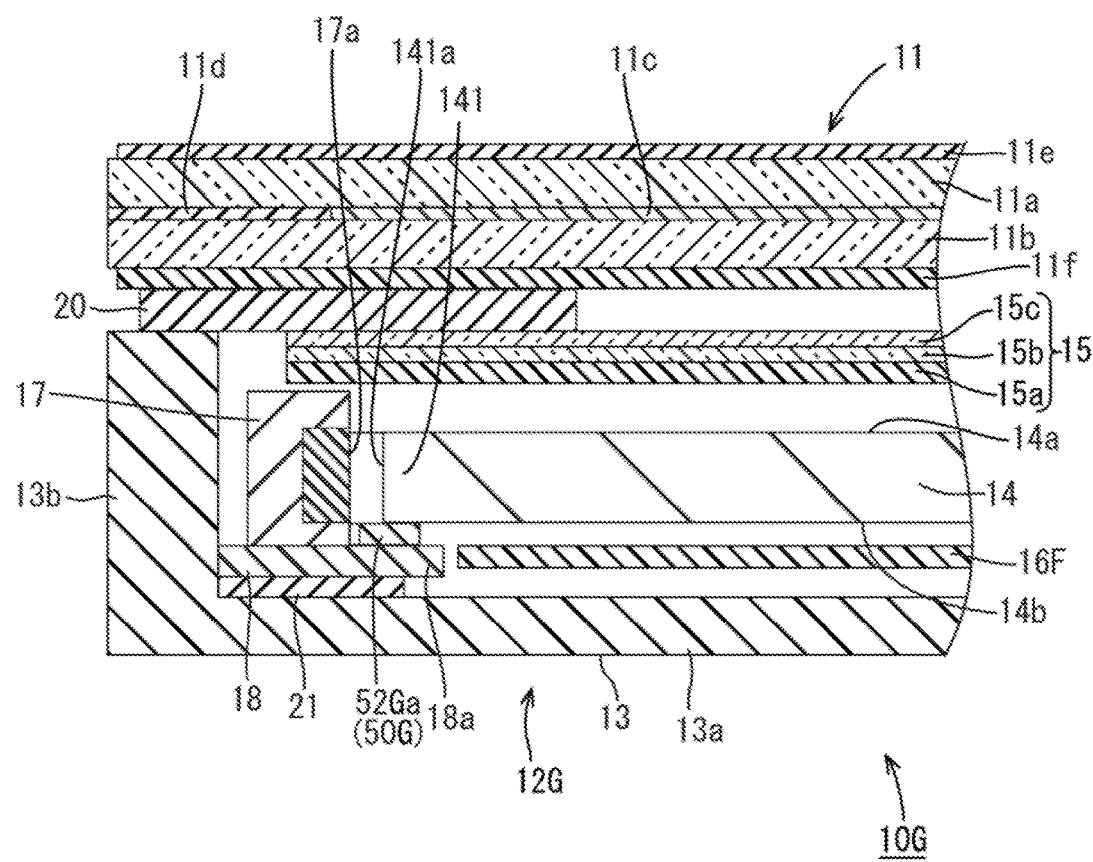
FIG. 14 is a magnified view of a portion of a liquid crystal display device according to the eighth embodiment including LEDs and therearound.

A liquid crystal display device 10G and a backlight unit 12G according to an eighth embodiment of the present invention will be described with reference to FIGS. 13 and 14. FIG. 13 is a magnified view illustrating the LEDs 17 and therearound in the backlight unit 12G according to the eighth embodiment. FIG. 14 is a cross-sectional view of a portion of the liquid crystal display device 10G according to the eighth embodiment including the LEDs 17 and therearound.

The backlight unit 12G according to this embodiment includes the chassis 13 and the light guide plate 14 included in the first embodiment. In the backlight unit 12G, the light guide plate 14 is fixed to the LED board 18 that is fixed to the chassis 13. The light guide plate 14 is fixed to the LED board 18 with a light guide plate fixing member 50G similar to that of the seventh embodiment.

The light guide plate fixing member 50G has an annular shape (a closed ring shape) in a plan view. The light guide plate fixing member 50G is disposed in the chassis 13 with the center of the light guide plate fixing member 50G aligned with the center of the light guide plate 14. The light guide plate fixing member 50G includes first fixing portions 51G and second fixing portions 52G. The first fixing portions 51G are affixed to the circumferentially aligned portions 142 of the light guide plate. The second fixing portions 52G are affixed to the light entering portions 142.

The first fixing portions 51G of the light guide plate fixing member 50G are configured not extend outward farther than the circumferentially aligned portions 142 of the light guide plate 14. The second fixing portions 52G include only inner second fixing portions 52Ga located inner than the LEDs 17 in the radial direction.

In the backlight unit 12G according to this embodiment, the light guide plate 14 is positioned relative to the chassis 13 with the light guide plate fixing member 50G in addition to the LEDs 17 and the circumferentially aligned portions 142 that are held together as described above. Therefore, the rotation of the light guide plate 14 is further less likely to occur in the backlight unit 12G according to this embodiment.

The light guide plate fixing member 50G (the inner second fixing portions 52Ga) fills gaps between the light guide plate 14 and the LED board 18. According to the configuration, light rays emitted by the LEDs 17 are less likely to directly enter the gaps between the light guide plate 14 and the LED board 18. Therefore, the light rays emitted by the LEDs 17 enter the light guide plate 14 with high efficiency. Furthermore, the light guide plate fixing member 50G has the closed ring shape and thus affixation of the light guide plate fixing member 50G to an object can be performed with efficiency.

Ninth Embodiment

Figure 15:
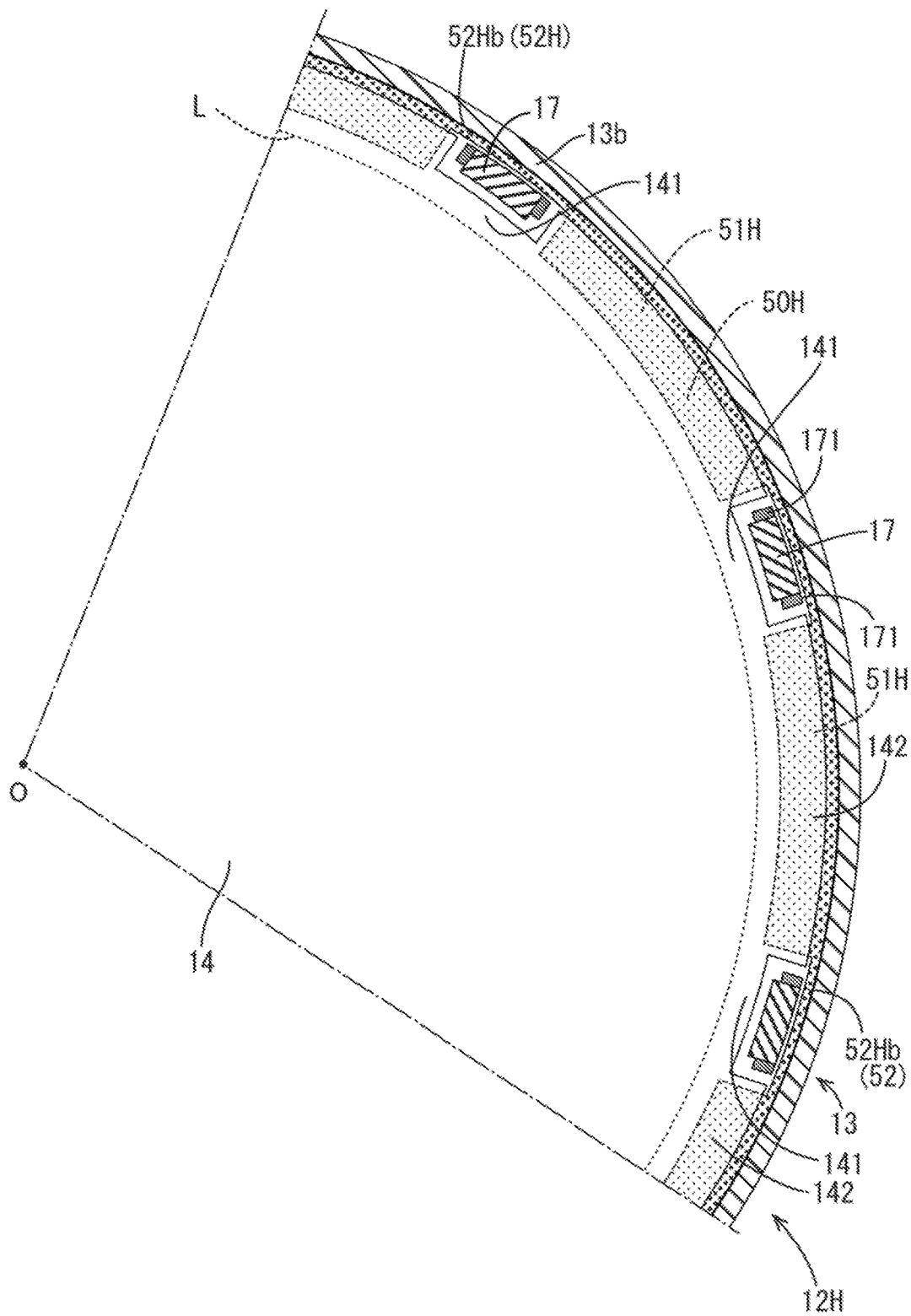
FIG. 15 is a magnified view of a portion of a backlight unit according to a ninth embodiment including LEDs and therearound.
Figure 16:
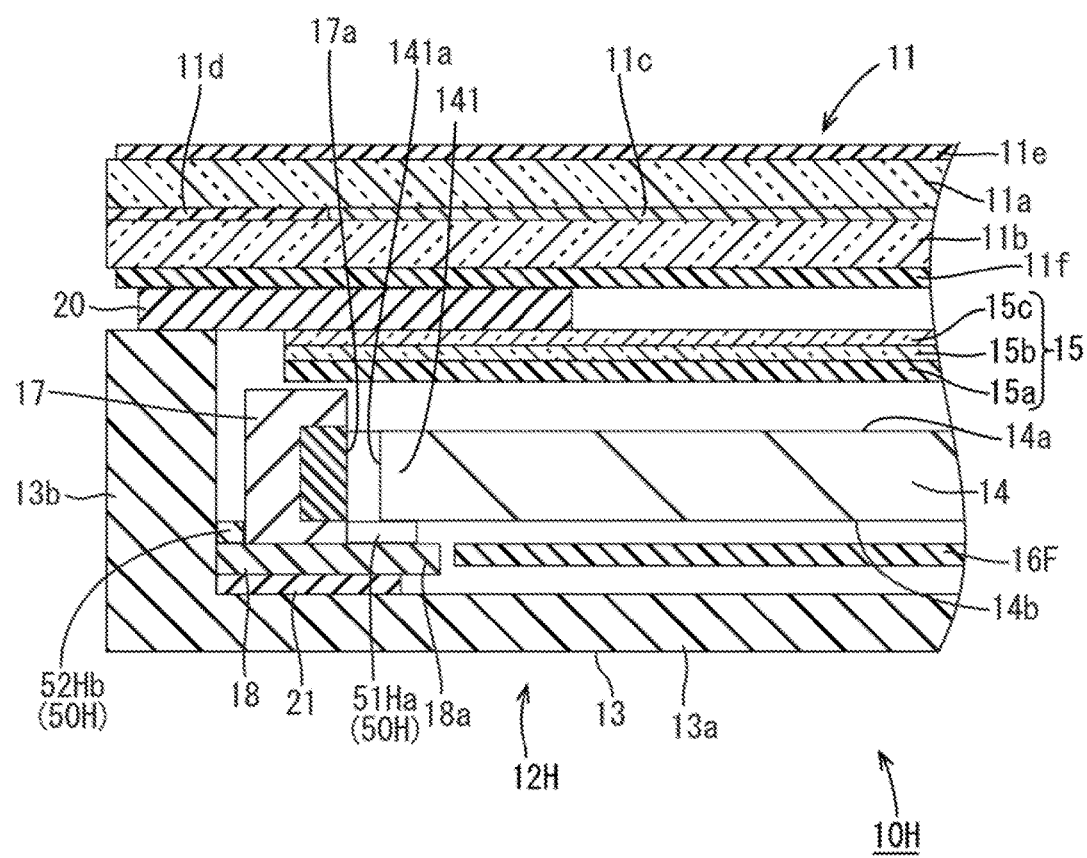
FIG. 16 is a magnified view of a portion of a liquid crystal display device according to the ninth embodiment including LEDs and therearound.

A liquid crystal display device 10H and a backlight unit 12H according to a ninth embodiment of the present invention will be described with reference to FIGS. 15 and 16. FIG. 15 is a magnified view of a portion of the backlight unit 12H according to the ninth embodiment including the LEDs 17 and therearound. FIG. 16 is a cross-sectional view of a portion of the liquid crystal display device 10H according to the ninth embodiment.

The backlight unit 12H according to this embodiment includes the chassis 13 and the light guide plate 14 included in the first embodiment. In the backlight unit 12H according to this embodiment, the light guide plate 14 is fixed to the LED board 18 that is fixed to the chassis 13. The light guide plate 14 is fixed to the LED board 18 with a light guide plate fixing member 50H similar to that of the seventh embodiment.

The light guide plate fixing member 50H has an annular overall shape (a closed ring shape) in a plan view. The light guide plate fixing member 50H is disposed inside the chassis 13 with the center thereof aligned with the center of the light guide plate 14. The light guide plate fixing member 50H includes first fixing portions 51H and second fixing portions 52H. The first fixing portions 51H are affixed to the circumferentially aligned portions 142 of the light guide plate 14. The second fixing portions 52H are affixed to the light entering portions 142.

The first fixing portions 51H of the light guide plate fixing member 50H according to this embodiment extend outward farther than the light guide plate 14 in a plan view. The second fixing portions 52H include only outer second fixing portions 52Ha located outer than the LEDs 17 in the radial direction.

In the backlight unit 12H according to this embodiment, the light guide plate 14 is positioned relative to the chassis 13 with the light guide plate fixing member 50H in addition to the LEDs 17 and the circumferentially aligned portions 142 that are held together as described above. Therefore, the rotation of the light guide plate 14 is further less likely to occur in the backlight unit 12H according to this embodiment.

Furthermore, the light guide plate fixing member 50H has the closed ring shape and thus affixation of the light guide plate fixing member 50H to an object can be performed with efficiency.

Tenth Embodiment

Figure 17:
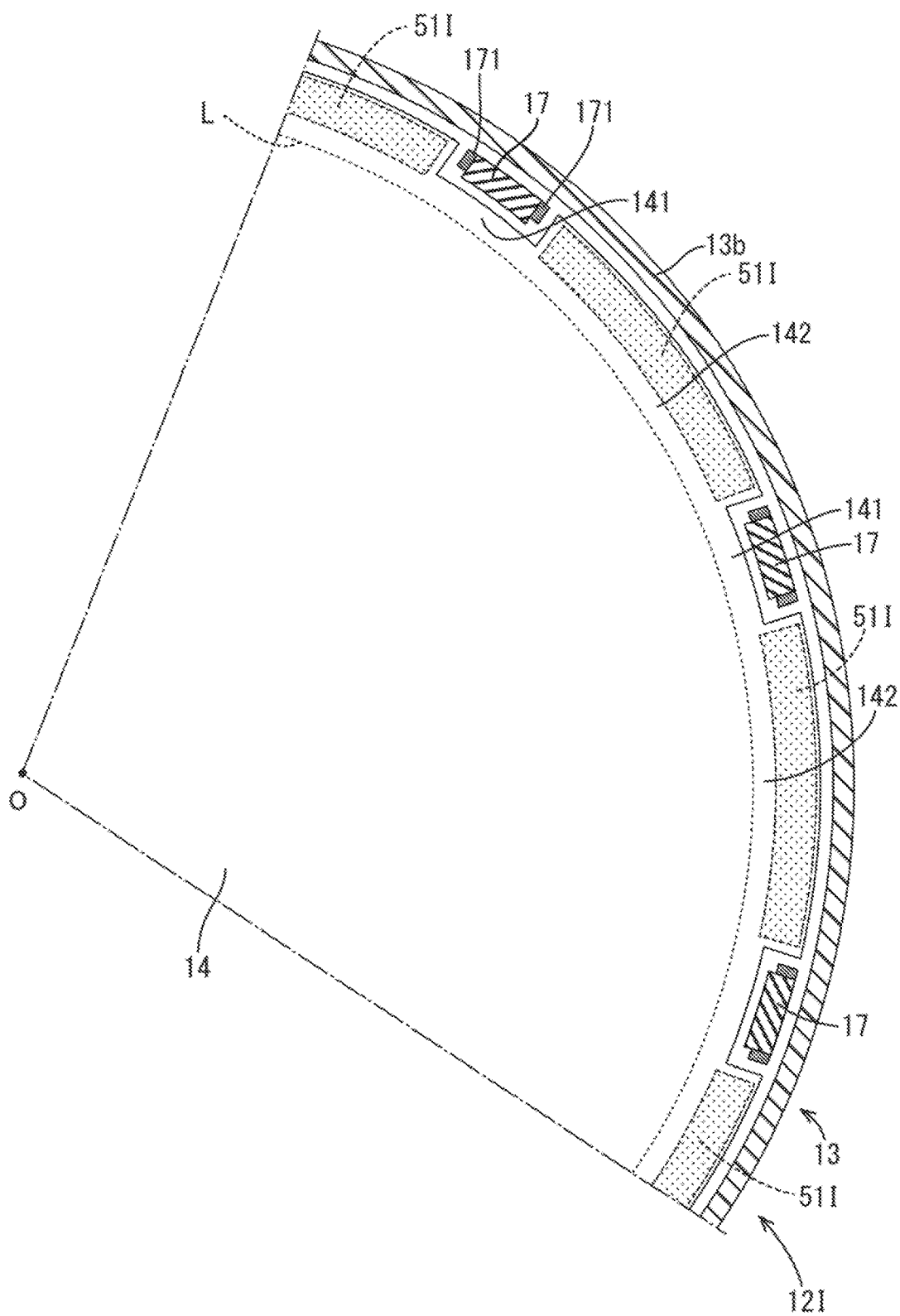
FIG. 17 is a magnified view of a portion of a backlight unit according to a tenth embodiment including LEDs and therearound.
Figure 18:
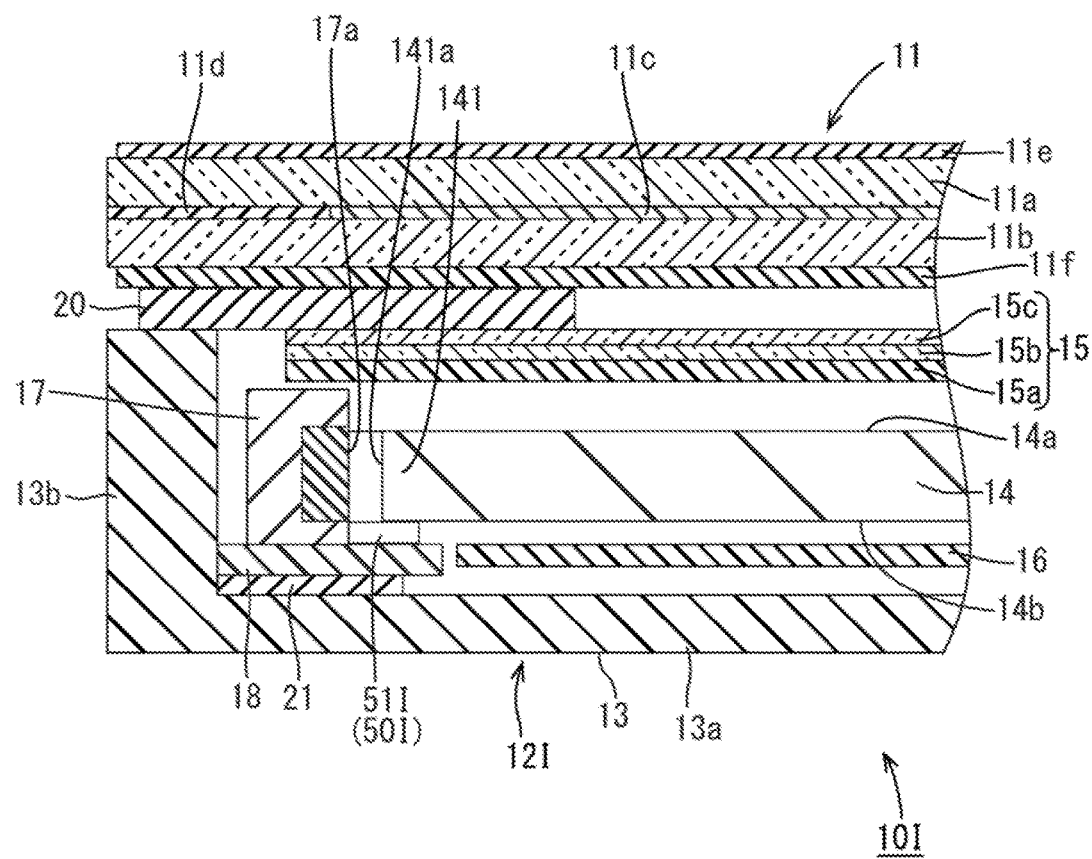
FIG. 18 is a magnified view of a portion of a liquid crystal display device according to the tenth embodiment including LEDs and therearound.

A liquid crystal display device 10I and a backlight unit 12I according to a tenth embodiment of the present invention will be described with reference to FIGS. 17 and 18. FIG. 17 is a magnified view of a portion of the backlight unit 12I according to the tenth embodiment including the LEDs 17 and therearound. FIG. 18 is a cross-sectional view of the liquid crystal display device 10I according to the tenth embodiment 10.

The backlight unit 12I according to this embodiment includes the chassis 13 and the light guide plate 14 included in the first embodiment. In the backlight unit 12I according to this embodiment, the light guide plate 14 is fixed to the LED board 18 that is fixed to the chassis 13. The light guide plate 14 is fixed to the LED board 18 with a light guide plate fixing member 50I similar to that of the seventh embodiment.

The light guide plate fixing member 50I include only first fixing portions 51 affixed to the circumferentially aligned portions 142 of the light guide plate 14. The light guide plate fixing member 50I includes the first fixing portions 51 that are arranged at intervals in a circular pattern. The light guide plate fixing member 50I is disposed in the chassis 13 with the center thereof aligned with the center of the light guide plate 14.

First fixing portions 51I of the light guide plate fixing member 50I according to this embodiment are within the light guide plate 14 in a plan view.

In the backlight unit 12I according to this embodiment, the light guide plate 14 is positioned relative to the chassis 13 with the light guide plate fixing member 50I in addition to the LEDs 17 and the circumferentially aligned portions 142 that are held together as described above. Therefore, the rotation of the light guide plate 14 is further less likely to occur in the backlight unit 12I according to this embodiment. It is preferable that the light guide plate fixing member 50I includes at least the first fixing portions 51.

Eleventh Embodiment

Figure 19:
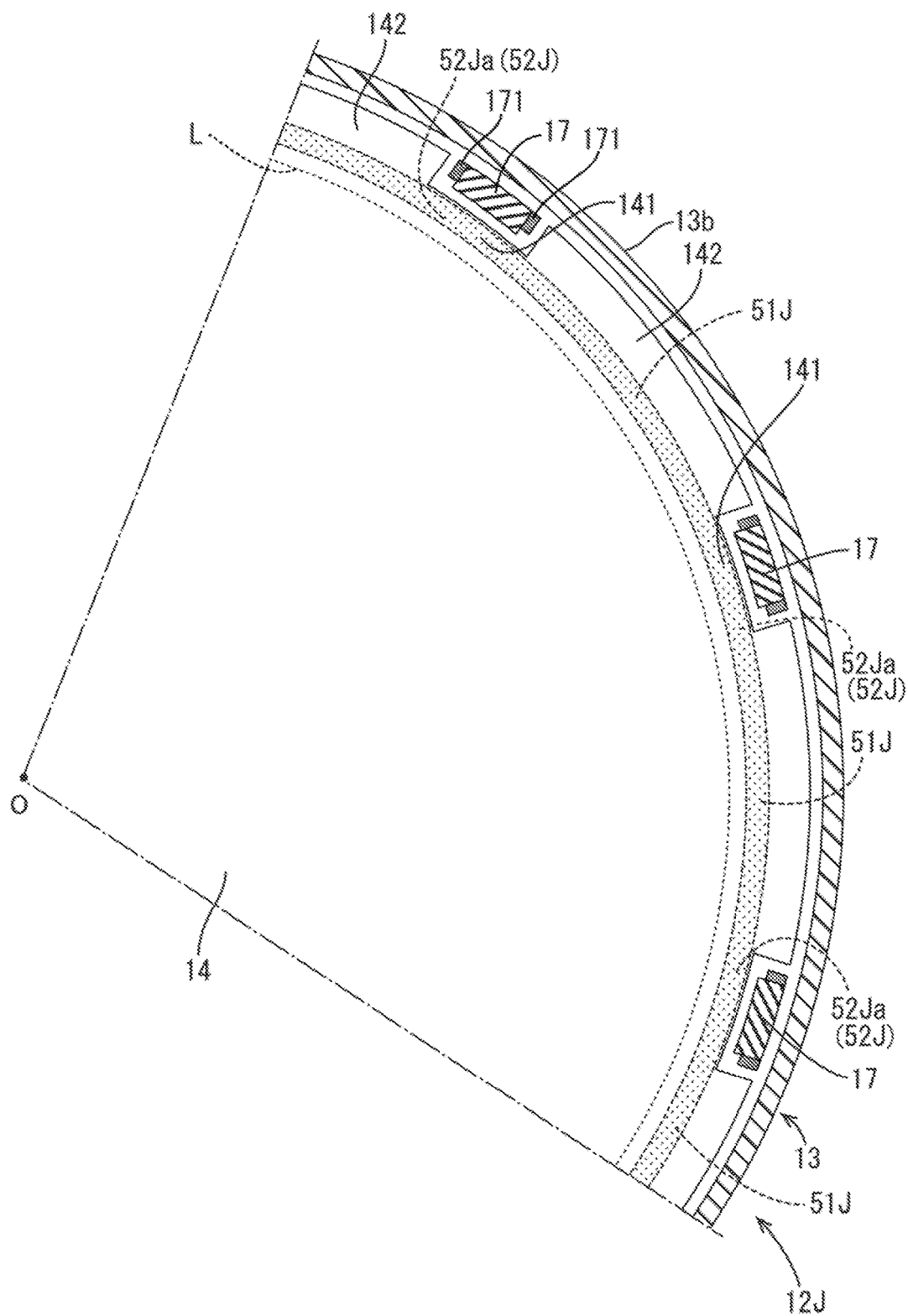
FIG. 19 is a magnified view of a portion of a backlight unit according to an eleventh embodiment including LEDs and therearound.
Figure 20:
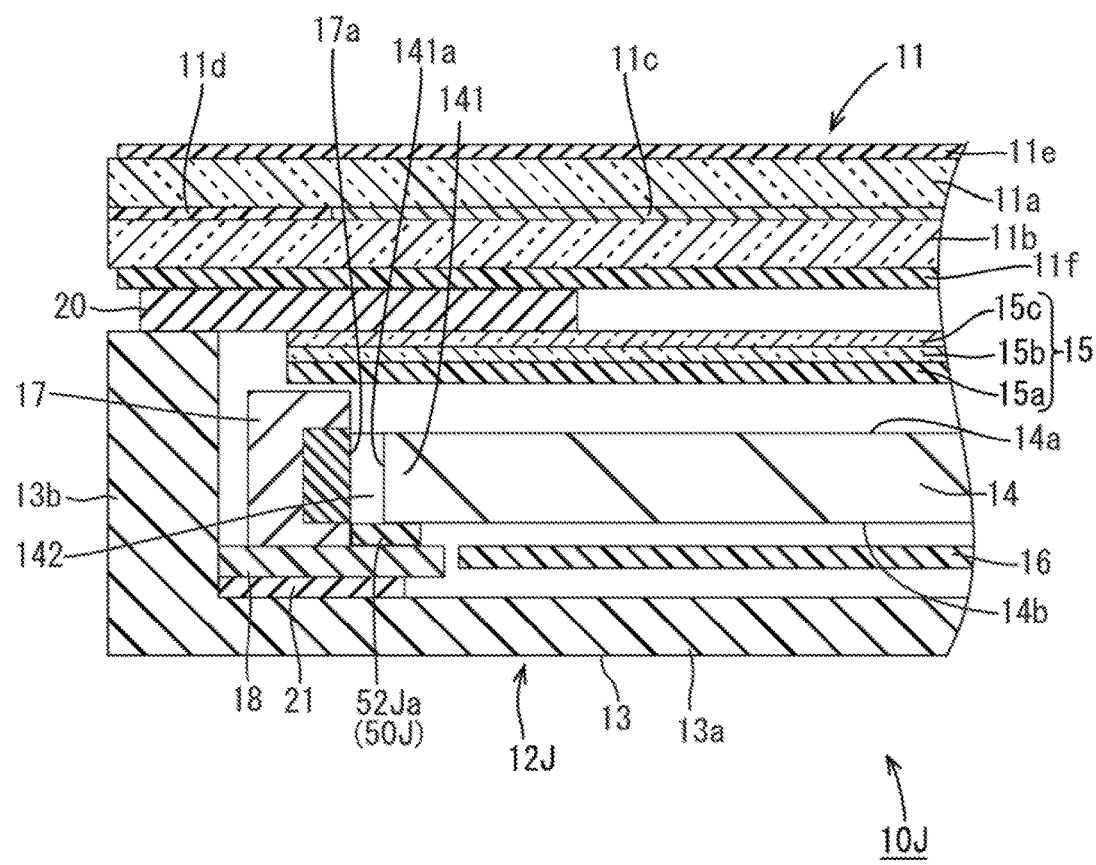
FIG. 20 is a magnified view of a portion of a liquid crystal display device according to the eleventh embodiment including LEDs and therearound.

A liquid crystal display device 10J and a backlight unit 12J according to an eleventh embodiment of the present invention will be described with reference to FIGS. 19 and 20. FIG. 19 is a magnified view of a portion of the backlight unit 12J according to the eleventh embodiment including the LEDs 17 and therearound. FIG. 20 is a cross-sectional view of a portion of the liquid crystal display device 10J according to the eleventh embodiment including the LEDs 17 and therearound.

The backlight unit 12J according to this embodiment includes the chassis 13 and the light guide plate 14 included in the first embodiment. In the backlight unit 12J according to this embodiment, the light guide plate 14 is fixed to the LED board 18 that is fixed to the chassis 13. The light guide plate 14 is fixed to the LED board 18 with a light guide plate fixing member 50J similar to that of the seventh embodiment.

The light guide plate fixing member 50J has an annular (a closed ring) overall shape. The light guide plate fixing member 50J is disposed in the chassis 13 with the center thereof aligned with the center of the light guide plate 14. The light guide plate fixing member 50J includes first fixing portions 51J and second fixing portions 52J. The first fixing portions 51J are affixed to the circumferentially aligned portions 142 of the light guide plate 14. The second fixing portions 52J are affixed to the light entering portions 142. Widths of the first fixing portions 51J and the second fixing portions 52J of the light guide plate fixing member 50J according to this embodiment are set equal.

The first fixing portions 51J of the light guide plate fixing member 50J according to this embodiment are configured not to extend outward farther than the circumferentially aligned portions 142 of the light guide plate 14 in a plan view. The second fixing portions 52J include only inner second fixing portions 52Ja located inner than the LEDs 17 in the radial direction.

In the backlight unit 12J according to this embodiment, the light guide plate 14 is positioned relative to the chassis 13 with the light guide plate fixing member 50J in addition to the LEDs 17 and the circumferentially aligned portions 142 that are held together as described above. Therefore, the rotation of the light guide plate 14 is further less likely to occur in the backlight unit 12J according to this embodiment.

The light guide plate fixing member 50J (the inner second fixing portions 52Ja) fills gaps between the light guide plate 14 and the LED board 18. According to the configuration, light rays emitted by the LEDs 17 are less likely to directly enter the gaps between the light guide plate 14 and the LED board 18. Therefore, the light rays emitted by the LEDs 17 enter the light guide plate 14 with high efficiency. Furthermore, the light guide plate fixing member 50J has the closed ring shape and the widths of the first fixing portions 51J and the second fixing portions 52J are set equal. Therefore, it is not necessary to distinguish the first fixing portions 51J and the second fixing portions 52J from each other and thus affixation of the light guide plate fixing member 50J to an object can be performed with efficiency.

Twelfth Embodiment

Figure 21:
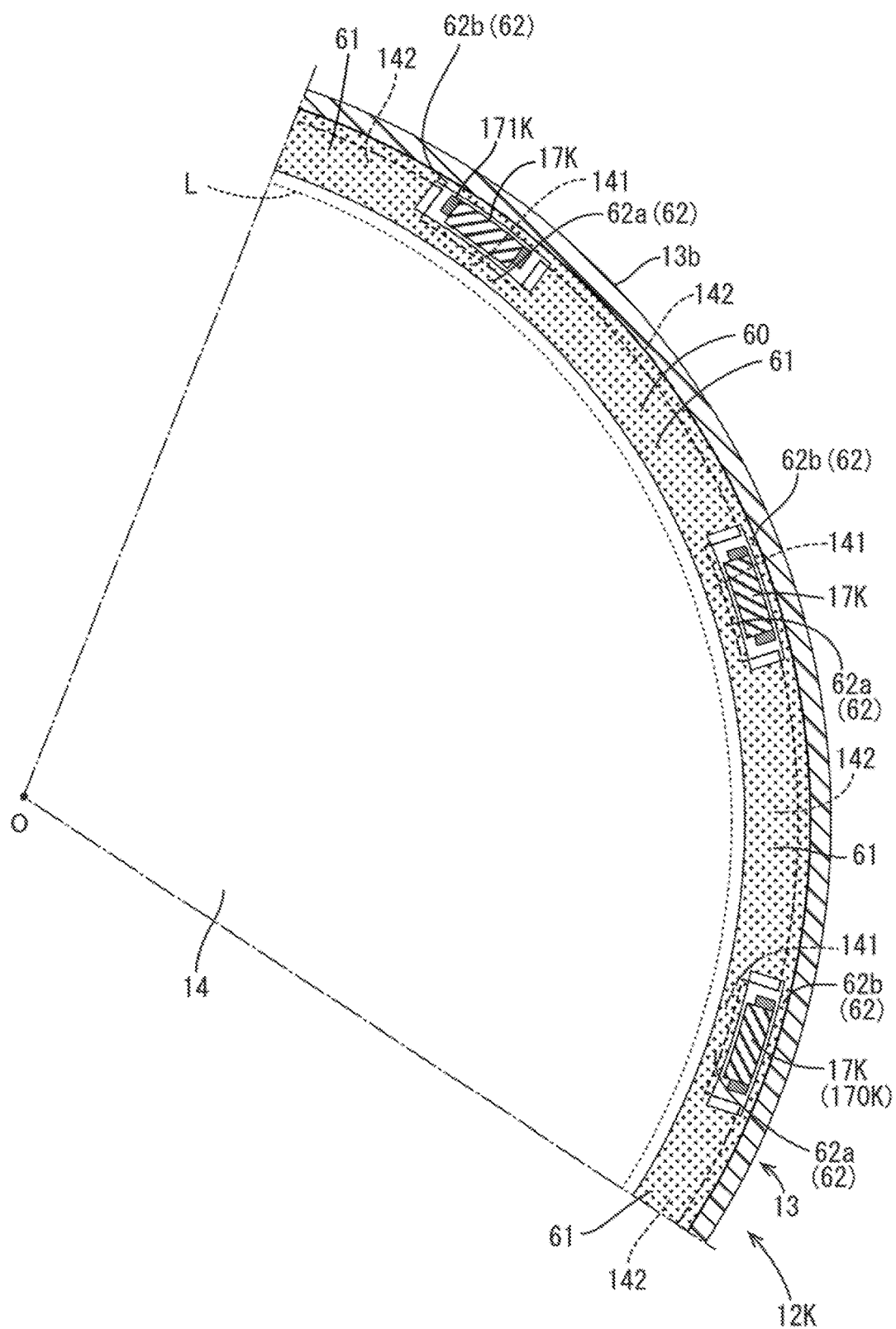
FIG. 21 is a magnified view of a portion of a backlight unit according to a twelfth embodiment including LEDs and therearound.
Figure 22:
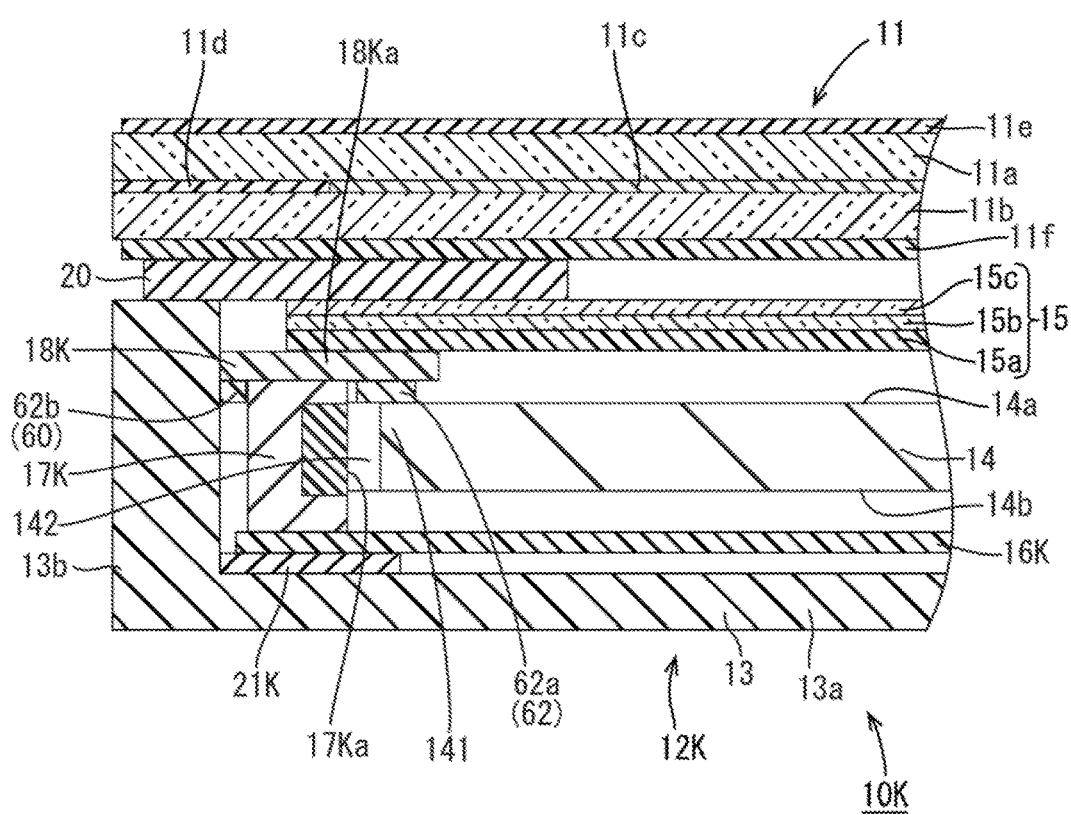
FIG. 22 is a magnified view of a portion of a liquid crystal display device according to the twelfth embodiment including LEDs and therearound.

A liquid crystal display device 10K and a backlight unit 12K according to a twelfth embodiment of the present invention will be described with reference to FIGS. 21 and 22. FIG. 21 is a magnified view of a portion of the backlight unit 12K according to the twelfth embodiment including LEDs 17 and therearound. FIG. 22 is a cross-sectional view of a portion of the liquid crystal display device 10K according to the twelfth embodiment including the LEDs 17K and therearound.

The backlight unit 12K according to this embodiment includes the chassis 13 and the light guide plate 14 included in the first embodiment. The backlight unit 12K according to this embodiment includes an LED board 18K on which the LEDs 17K are mounted and disposed on a front side of the light guide plate 14. The LEDs 17K are mounted on a back surface of the LED board 18K. The LEDs 17K are arranged in a circular pattern (to form an annular light source 170K) and mounted on the LED board 18K, similarly to the first embodiment.

In the backlight unit 12K, a reflection sheet 16K is fixed to the bottom wall 13a of the chassis 13 with a reflection sheet fixing tape 21K that is similar to the board fixing tape 21 described earlier.

The back surface of the LED board 18K is fixed to the front surface of the light guide plate 14 with a light guide plate fixing member 60. Namely, the light guide plate 14 is considered to be fixed to the LED board 18K with the light guide plate fixing member 60. The LED board 18K is considered to be a supporting member disposed on the front side of the light guide plate 14.

The light guide plate fixing member 60 is made of the same kind of material as the light guide plate fixing member 50 described earlier. For example, the light guide plate fixing member 60 is a black double sided adhesive tape having a predefined thickness. Namely, the light plate fixing member 60 includes a front adhesive surface and a back adhesive surface that can adhere to object to objects, respectively.

The light guide plate fixing member 60 has an annular (a closed ring) overall shape in a plan view. The light guide plate fixing member 60 is disposed in the chassis 13 with the center thereof aligned with the center of the light guide plate 14 and fixed to the front surface of the light guide plate 14.

In this embodiment, the back adhesive surface of the light guide plate fixing member 60 is affixed to the front surface of the light guide plate 14 and the front adhesive surface is affixed to the front surface of a base portion 18Ka of the LED board 18K having an annular shape. The light guide plate fixing member 60 is disposed in an area corresponding to the non-display area of the liquid crystal panel 11.

The light guide plate fixing member 60 includes first fixing portions 61 and second fixing portions 62. The first fixing portions 61 are affixed to the front surfaces of the circumferentially aligned portions 142 of the light guide plate 14. The second fixing portions 62 are affixed to the front surfaces of the light entering portions 142.

The light guide plate fixing member 60 includes the first fixing portions 61 that are assigned to the circumferentially aligned portions 142, respectively. The first fixing portions 61 are annularly arranged. One of surfaces (the back adhesive surface) of each first fixing portion 61 is affixed to the front surface of the corresponding circumferentially aligned portion 142. The other one of the surfaces (the front adhesive surface) of each first fixing portion 61 is fixed to the LED board 18K that is the supporting member. According to the configuration, the circumferentially aligned portions 142 and the LED board 18K are fixed together.

The second fixing portions 62 function as connecting portions for connecting the adjacent first fixing portions 61 to each other. One of surfaces (the back adhesive surface) of each second fixing portion 62 is affixed to the front surface of the corresponding light entering portion 141. The other one of surfaces (the front adhesive surface) of each second fixing portion 62 is affixed to the LED board 18K that is the supporting member. According to the configuration, the light entering portions 141 and the LED board 18K are fixed together.

The second fixing portions 62 include inner second fixing portions 62a and outer second fixing portions 62b. The inner second fixing portions 62a are located inner than the LED 17K in the radial direction and the outer second fixing portions 62b are located outer than the LED 17K in the radial direction. In this embodiment, the inner second fixing portions 62a of the second fixing portions 62 fix the light guide plate 14 and the LED board 18K together.

In the backlight unit 12K according to this embodiment, the light guide plate 14 is positioned relative to the LED board 18K with the light guide plate fixing member 60 in addition to the LEDs 17K and the circumferentially aligned portions 142 that are held together in the circumferential direction. If the LED board 18K is fixed to the optical sheet 15 that is adjacent to the LED board 18K on the front side with a fixing member, which is not illustrated, the LED board 18K is positioned relative to the chassis 13. Therefore, the rotation of the light guide plate 14 is further less likely to occur in the backlight unit 12K according to this embodiment.

The light guide plate fixing member 60 has a light blocking property and a function for filling gaps between the light guide plate 14 and the LED board K18. Light rays emitted by the LEDs 17K are less likely to directly enter the gaps between the light guide plate 14 and the LED board 18K. Therefore, the light rays emitted by the LEDs 17K are less likely to directly travel toward the optical sheet 15 and thus uneven brightness is less likely to occur.

Because the light guide plate fixing member 60 has the closed annular shape, the affixation of the light guide plate fixing member 60 to an object can be efficiently performed.

Thirteenth Embodiment

Figure 23:
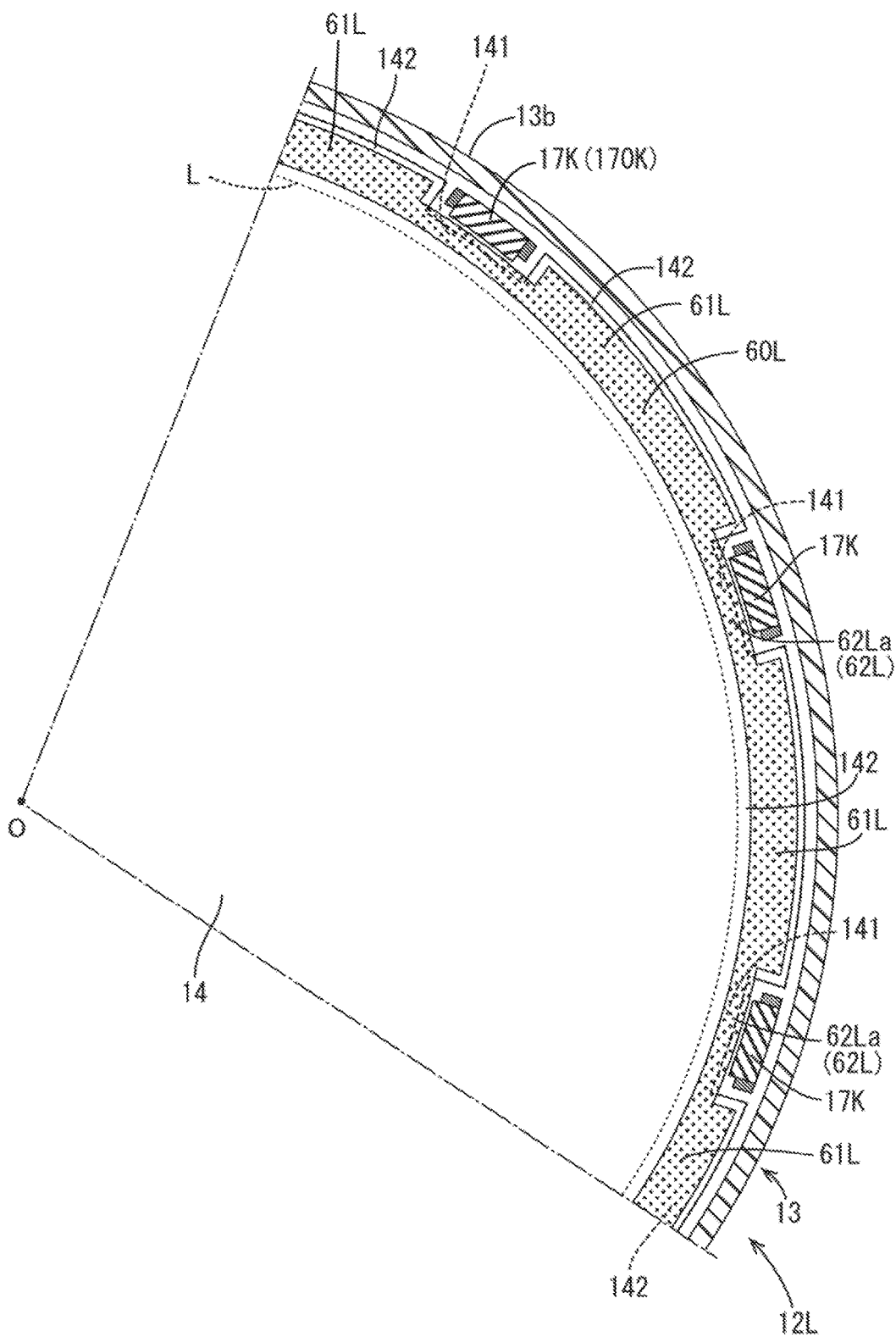
FIG. 23 is a magnified view of a portion of a backlight unit according to a thirteenth embodiment including LEDs and therearound.
Figure 24:
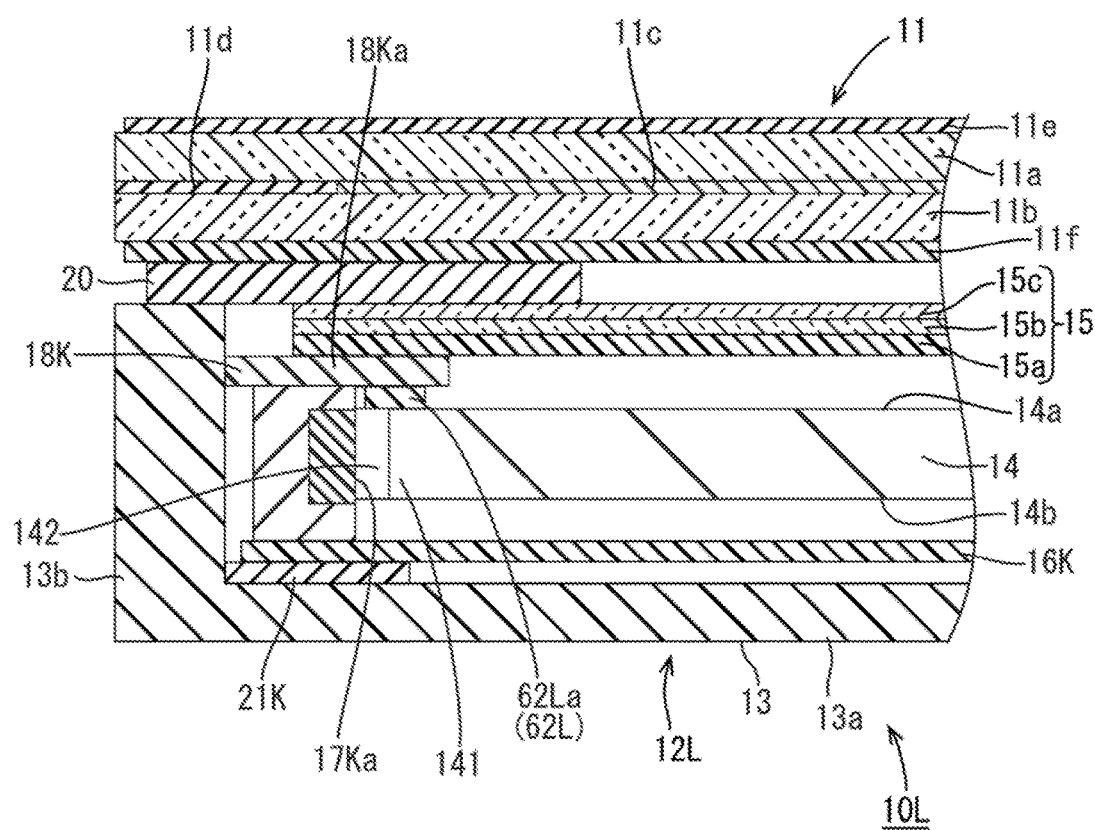
FIG. 24 is a magnified view of a portion of a liquid crystal display device according to the thirteenth embodiment including LEDs and therearound.

A liquid crystal display device 10L and a backlight unit 12L according to a twelfth embodiment of the present invention will be described with reference to FIGS. 23 and 24. FIG. 23 is a magnified view of a portion of the backlight unit 12L according to the thirteenth embodiment including the LEDs 17K and therearound. FIG. 24 is a cross-sectional view of a portion of the liquid crystal display device 10L according to the thirteenth embodiment including the LEDs 17K and therearound.

The backlight unit 12L includes the chassis 13 and the light guide plate 14 included in the first embodiment. Similar to the twelfth embodiment described above, the backlight unit 12L includes the LED board 18K disposed on the front side of the light guide plate 14. The light guide plate 14 is fixed to the LED board 18K with a light guide plate fixing member 60L.

The light guide plate fixing member 60L is made of the same kind of material as the light guide plate fixing member 60. The light guide plate fixing member 60L has an annular (a closed ring) overall shape in a plan view.

The light guide plate fixing member 60L includes first fixing portions 61L and second fixing portions 62L. The first fixing portions 61L are affixed to the front surfaces of the circumferentially aligned portions 142 of the light guide plate 14. The second fixing portions 62L are affixed to the front surfaces of the light entering portions 142.

The first fixing portions 61L are configured not to extend outward farther than the circumferentially aligned portions 142 of the light guide plate 14 in a plan view. The second fixing portions 62L functions as connecting portions for connecting the adjacent first fixing portions 61L to one another. The second fixing portions 62L include only inner second fixing portions 62La located inner that the LEDs 17K in the radial direction.

In the backlight unit 12L according to this embodiment, the light guide plate 14 is positioned relative to the LED board 18K with the light guide plate fixing member 60L in addition to the LEDs 17K and the circumferentially aligned portions 142 that are held together in the circumferential direction. If the LED board 18K is fixed to the optical sheet 15 that is adjacent to the LED board 18K on the front side with a fixing member, which is not illustrated, the LED board 18K is positioned relative to the chassis 13. Therefore, the rotation of the light guide plate 14 is further less likely to occur in the backlight unit 12L according to this embodiment.

The light guide plate fixing member 60L has a light blocking property and a function for filling gaps between the light guide plate 14 and the LED board K18. Light rays emitted by the LEDs 17K are less likely to directly enter the gaps between the light guide plate 14 and the LED board 18K. Therefore, the light rays emitted by the LEDs 17K are less likely to directly travel toward the optical sheet 15 and thus uneven brightness is less likely to occur.

Because the light guide plate fixing member 60L has the closed annular shape, the affixation of the light guide plate fixing member 60L to an object can be efficiently performed.

Fourteenth Embodiment

Figure 25:
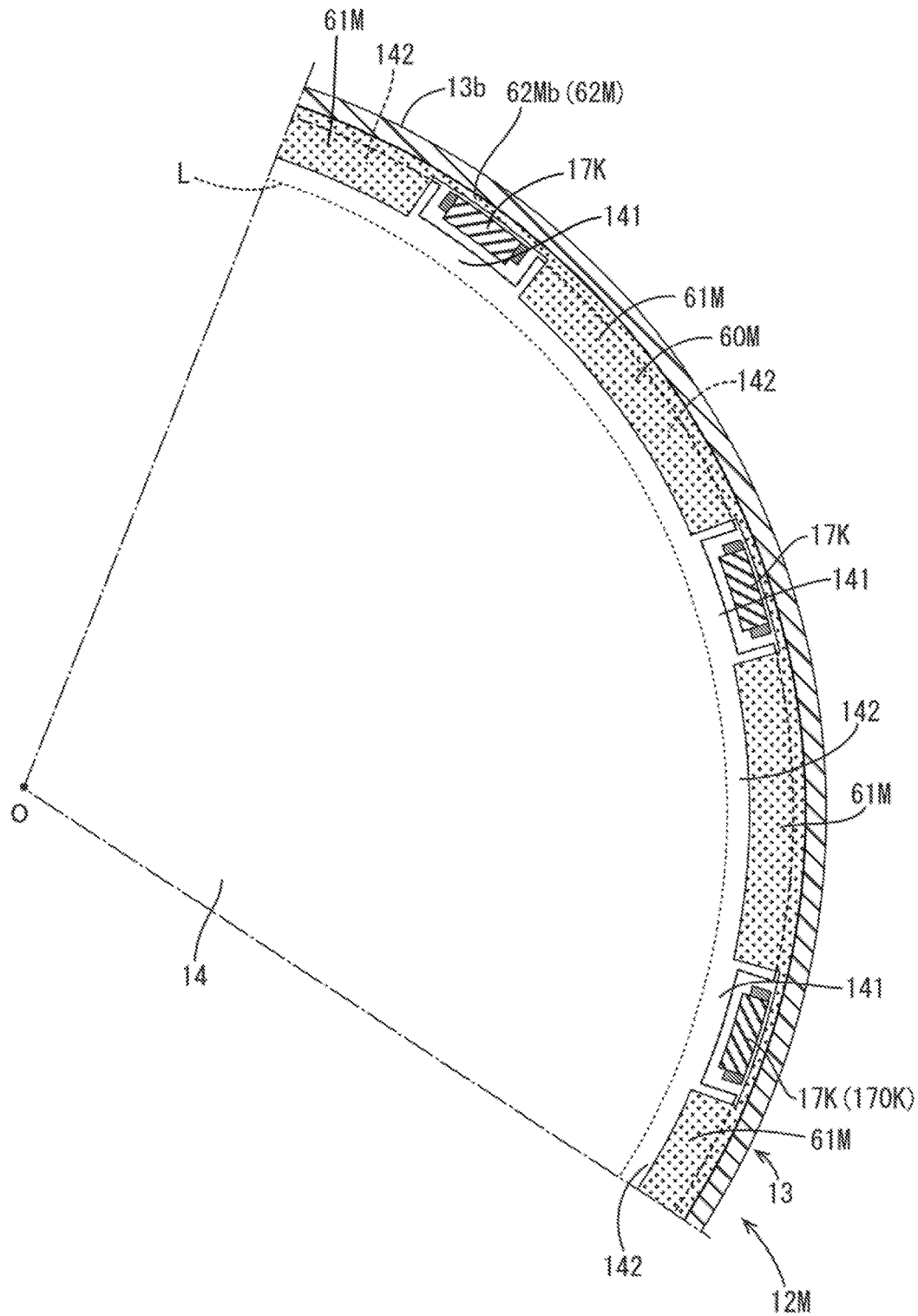
FIG. 25 is a magnified view of a portion of a backlight unit according to a fourteenth embodiment including LEDs and therearound.
Figure 26:
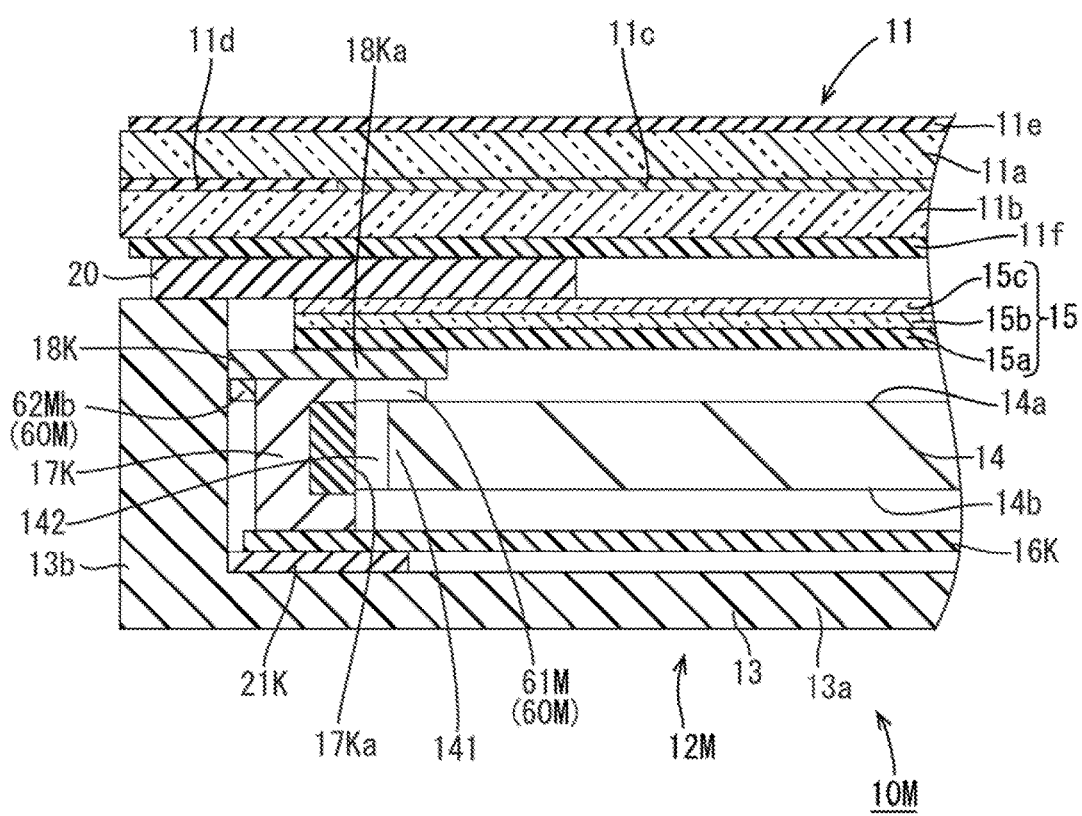
FIG. 26 is a magnified view of a portion of a liquid crystal display device according to the fourteenth embodiment including LEDs and therearound.

A liquid crystal display device 10M and a backlight unit 12M according to a fourteenth embodiment of the present invention will be described with reference to FIGS. 25 and 26. FIG. 25 is a magnified view of a portion of the backlight unit 12M according to the fourteenth embodiment including the LEDs 17K and therearound. FIG. 26 is a cross-sectional view of a portion of the liquid crystal display device 10M according to the fourteenth embodiment including the LEDs 17K and therearound.

The backlight unit 12M includes the chassis 13 and the light guide plate 14 included in the first embodiment. Similar to the twelfth embodiment described above, the backlight unit 12M includes the LED board 18K disposed on the front side of the light guide plate 14. The light guide plate 14 is fixed to the LED board 18K with a light guide plate fixing member 60M.

The light guide plate fixing member 60M is made of the same kind of material as the light guide plate fixing member 60. The light guide plate fixing member 60M has an annular (a closed ring) overall shape in a plan view.

The light guide plate fixing member 60M includes first fixing portions 61M and second fixing portions 62M. The first fixing portions 61M are affixed to the front surfaces of the circumferentially aligned portions 142 of the light guide plate 14. The second fixing portions 62N are affixed to the front surfaces of the light entering portions 142.

The first fixing portions 61M are configured to extend outward farther than the circumferentially aligned portions 142 of the light guide plate 14 in a plan view. The second fixing portions 62M functions as connecting portions for connecting the adjacent first fixing portions 61M to one another. The second fixing portions 62M include only outer second fixing portions 62Mb located outer that the LEDs 17K in the radial direction.

In the backlight unit 12M according to this embodiment, the light guide plate 14 is positioned relative to the LED board 18K with the light guide plate fixing member 60M in addition to the LEDs 17K and the circumferentially aligned portions 142 that are held together in the circumferential direction. If the LED board 18K is fixed to the optical sheet 15 that is adjacent to the LED board 18K on the front side with a fixing member, which is not illustrated, the LED board 18K is positioned relative to the chassis 13. Therefore, the rotation of the light guide plate 14 is further less likely to occur in the backlight unit 12M according to this embodiment.

Because the light guide plate fixing member 60M has the closed annular shape, the affixation of the light guide plate fixing member 60M to an object can be efficiently performed.

Fifteenth Embodiment

Figure 27:
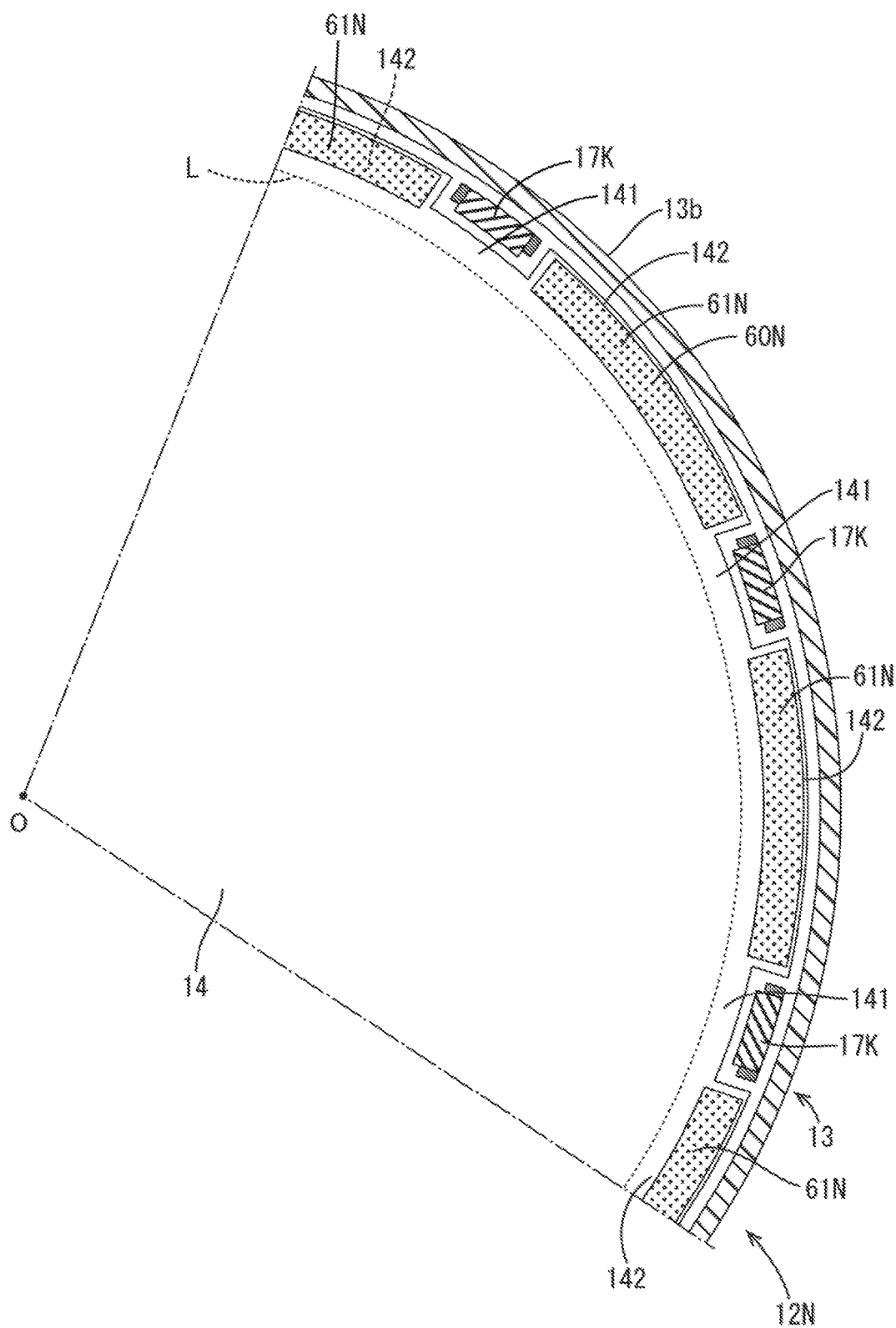
FIG. 27 is a magnified view of a portion of a backlight unit according to a fifteenth embodiment including LEDs and therearound.
Figure 28:
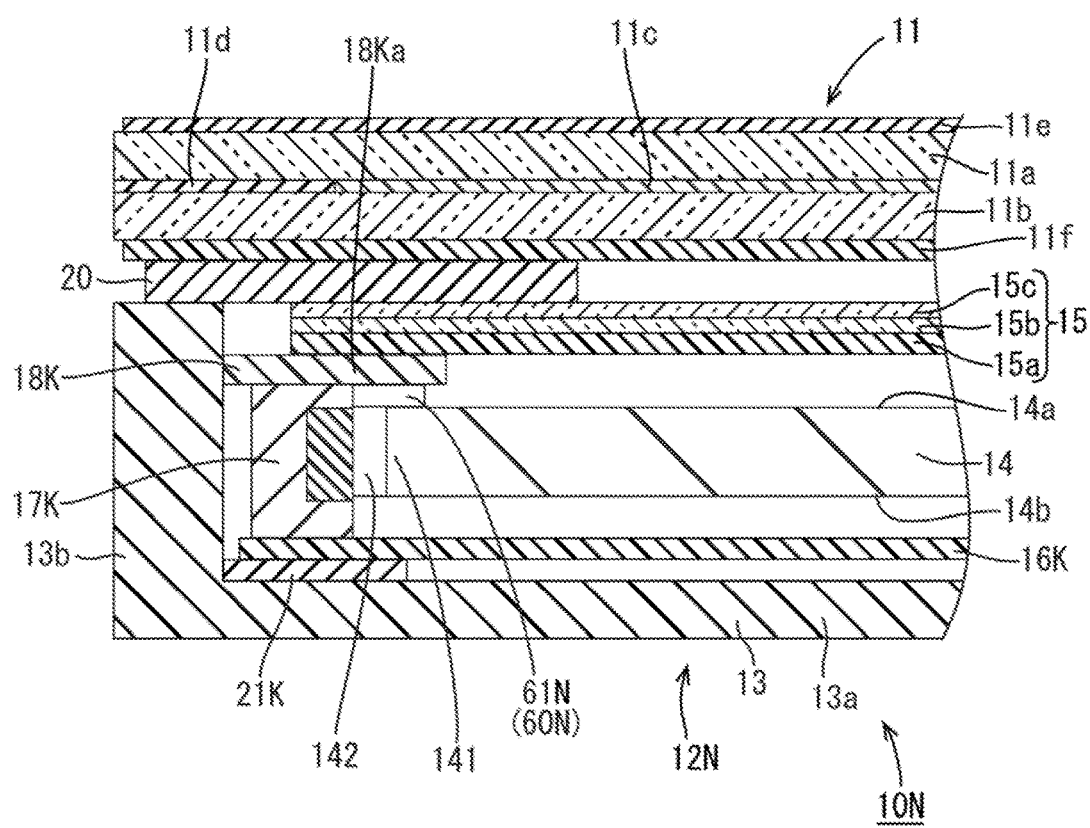
FIG. 28 is a magnified view of a portion of a liquid crystal display device according to the fifteenth embodiment including LEDs and therearound.

A liquid crystal display device 10N and a backlight unit 12N according to a fourteenth embodiment of the present invention will be described with reference to FIGS. 27 and 28. FIG. 27 is a magnified view of a portion of the backlight unit 12N according to the fifteenth embodiment including the LEDs 17K and therearound. FIG. 28 is a cross-sectional view of a portion of the liquid crystal display device 10N including the LEDs 17K and therearound.

The backlight unit 12N according to this embodiment includes the chassis 13 and the light guide plate 14 included in the first embodiment. Similar to the twelfth embodiment described above, the backlight unit 12N includes the LED board 18K disposed on the front side of the light guide plate 14. The light guide plate 14 is fixed to the LED board 18K with a light guide plate fixing member 60N.

The light guide plate fixing member 60N is made of the same kind of material as the light guide plate fixing member 60. The light guide plate fixing member 60N includes only first fixing portions 61N. The first fixing portions 61N are arranged at intervals in a circular pattern. The first fixing portions 61N are configured not to extend outward farther than the circumferentially aligned portions 142 of the light guide plate 14 in a plan view.

In the backlight unit 12N according to this embodiment, the light guide plate 14 is positioned relative to the LED board 18K with the light guide plate fixing member 60N in addition to the LEDs 17K and the circumferentially aligned portions 142 that are held together in the circumferential direction. If the LED board 18K is fixed to the optical sheet 15 that is adjacent to the LED board 18K on the front side with a fixing member, which is not illustrated, the LED board 18K is positioned relative to the chassis 13. Therefore, the rotation of the light guide plate 14 is further less likely to occur in the backlight unit 12N according to this embodiment.

Because the light guide plate fixing member 60N has the closed annular shape, the affixation of the light guide plate fixing member 60N to an object can be efficiently performed.

Sixteenth Embodiment

Figure 29:
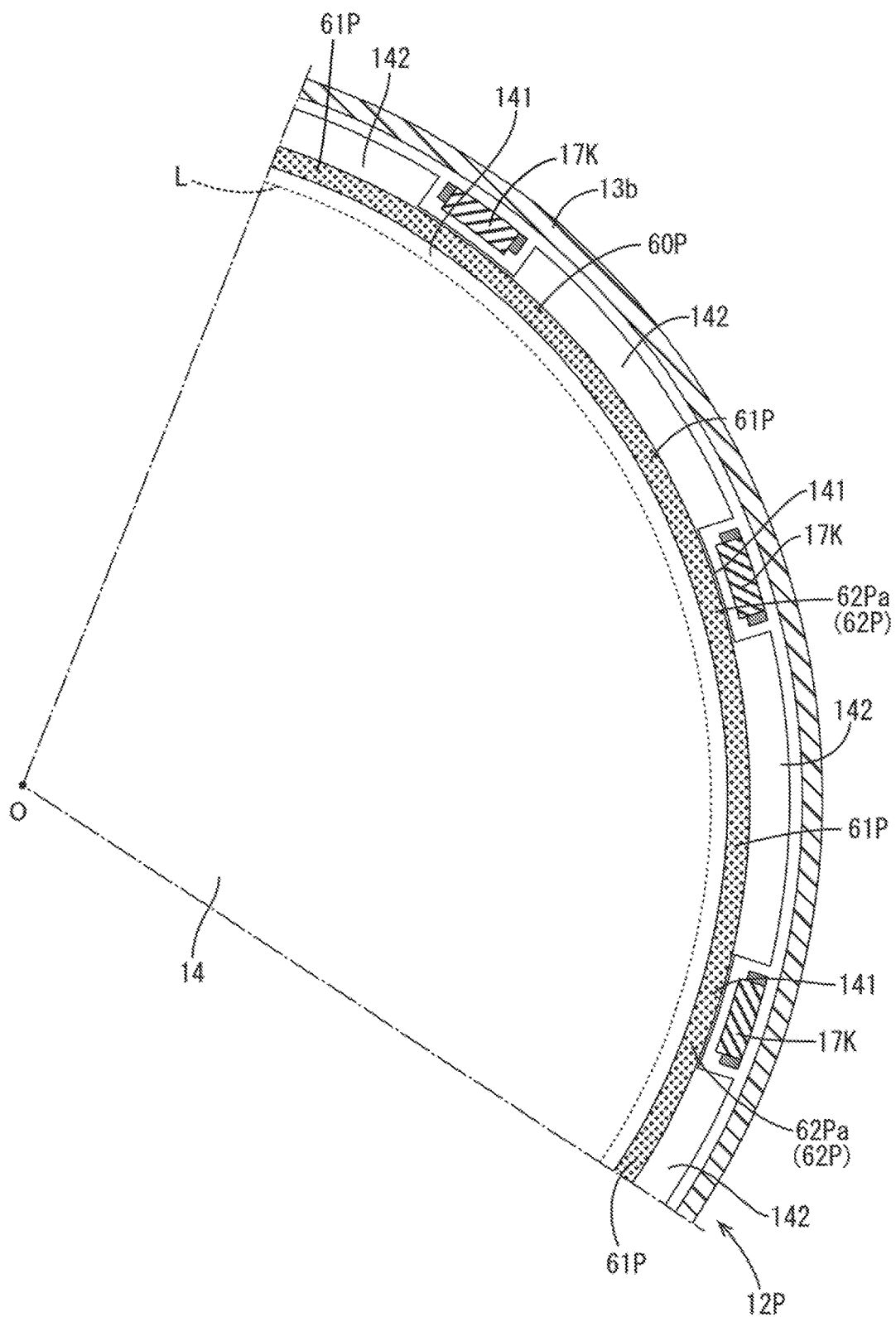
FIG. 29 is a magnified view of a portion of a backlight unit according to a sixteenth embodiment including LEDs and therearound.
Figure 30:
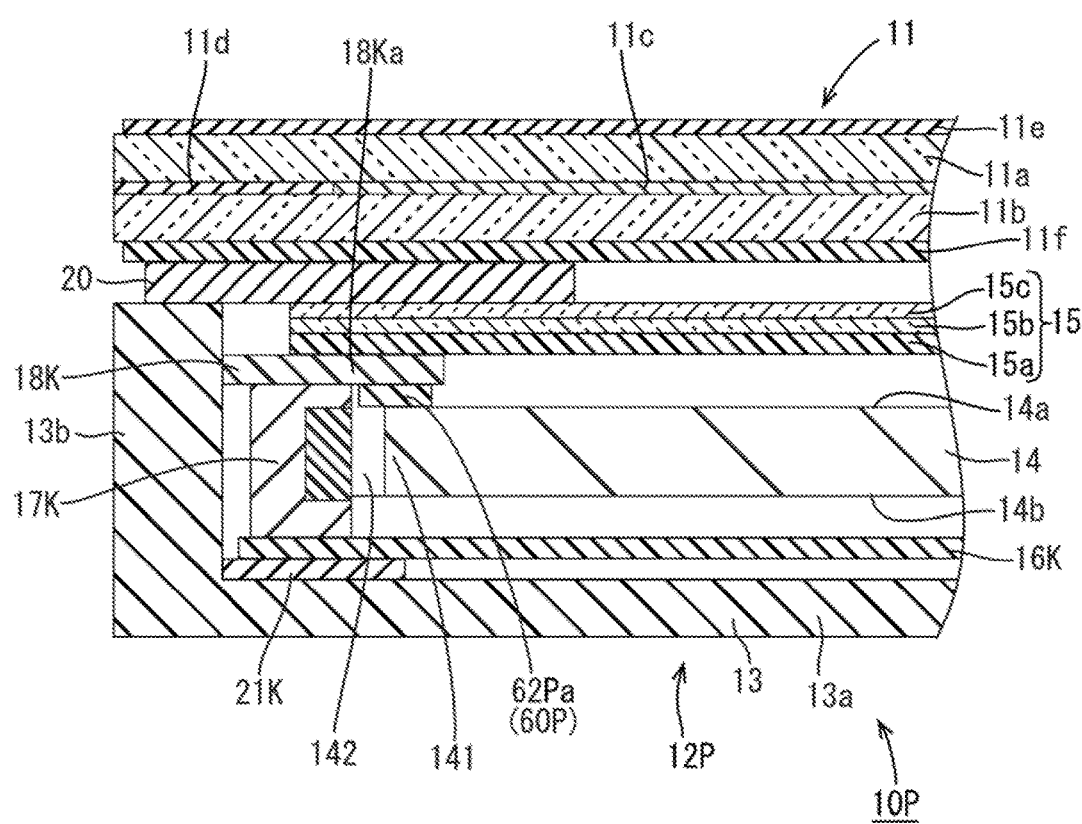
FIG. 30 is a magnified view of a portion of a liquid crystal display device according to the sixteenth embodiment including LEDs and therearound.

A liquid crystal display device 10P and a backlight unit 12P according to a sixteenth embodiment of the present invention will be described with reference to FIGS. 29 and 30. FIG. 29 is a magnified view of a portion of the backlight unit 12P according to the sixteenth embodiment including the LEDs 17K and therearound. FIG. 30 is a cross-sectional view of the liquid crystal display device 10P according to the sixteenth embodiment including the LEDs 17K and therearound.

The backlight unit 12P according to this embodiment includes the chassis 13 and the light guide plate 14 included in the first embodiment. Similar to the twelfth embodiment described above, the backlight unit 12P includes the LED board 18K disposed on the front side of the light guide plate 14. The light guide plate 14 is fixed to the LED board 18K with a light guide plate fixing member 60P.

The light guide plate fixing member 60P is made of the same kind of material as the light guide plate fixing member 60. The light guide plate fixing member 60P has an annular (a closed ring) overall shape in a plan view.

The light guide plate fixing member 60P includes first fixing portions 61P and second fixing portions 62P. The first fixing portions 61P are affixed to the front surfaces of the circumferentially aligned portions 142 of the light guide plate 14. The second fixing portions 62P are affixed to the front surfaces of the light entering portions 142. Widths of the first fixing portions 61P and the second fixing portions 62P of the light guide plate fixing member 60P are set equal.

The second fixing portions 62P function as connecting portions for connecting the adjacent first fixing portions 61P to one another. The second fixing portions 62P include only inner second fixing portions located inner than the LEDs 17K in the radial direction.

In the backlight unit 12P according to this embodiment, the light guide plate 14 is positioned relative to the LED board 18K with the light guide plate fixing member 60P in addition to the LEDs 17K and the circumferentially aligned portions 142 that are held together in the circumferential direction. If the LED board 18K is fixed to the optical sheet 15 that is adjacent to the LED board 18K on the front side with a fixing member, which is not illustrated, the LED board 18K is positioned relative to the chassis 13. Therefore, the rotation of the light guide plate 14 is further less likely to occur in the backlight unit 12P according to this embodiment.

The light guide plate fixing member 60P (the inner second fixing portions 62Pa) has a light blocking property and a function for filling gaps between the light guide plate 14 and the LED board K18. Light rays emitted by the LEDs 17K are less likely to directly enter the gaps between the light guide plate 14 and the LED board 18K. Therefore, the light rays emitted by the LEDs 17K are less likely to directly travel toward the optical sheet 15 and thus uneven brightness is less likely to occur.

The light guide plate fixing member 60P has the closed ring shape and the widths of the first fixing portions 61P and the second fixing portions 62P are set equal. Therefore, it is not necessary to distinguish the first fixing portions 61P and the second fixing portions 62P from each other and thus the affixation of the light guide plate fixing member 60P to an object can be efficiently performed.

Seventeenth Embodiment

Figure 31:
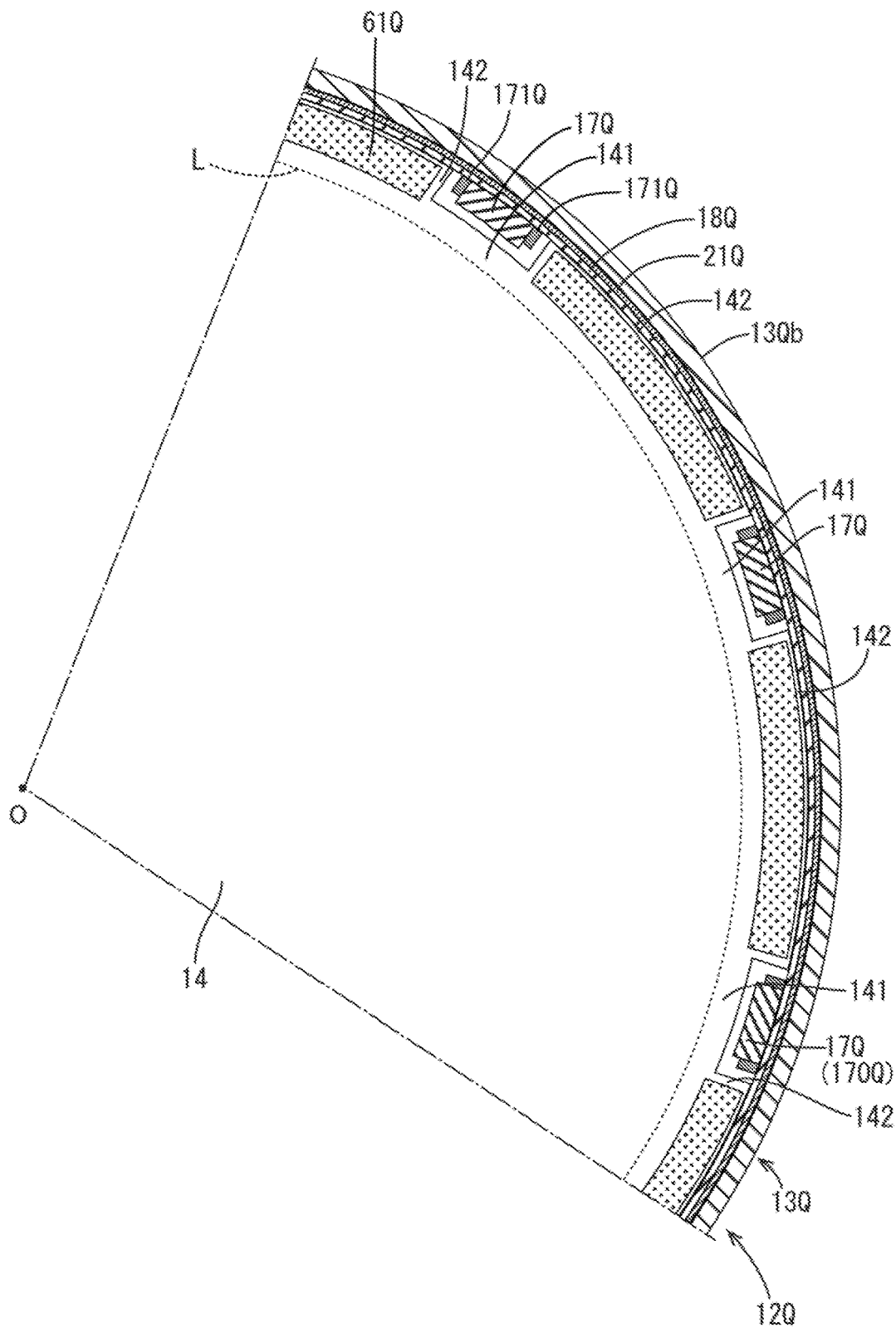
FIG. 31 is a magnified view of a portion of a backlight unit according to a seventeenth embodiment including LEDs and therearound.
Figure 32:
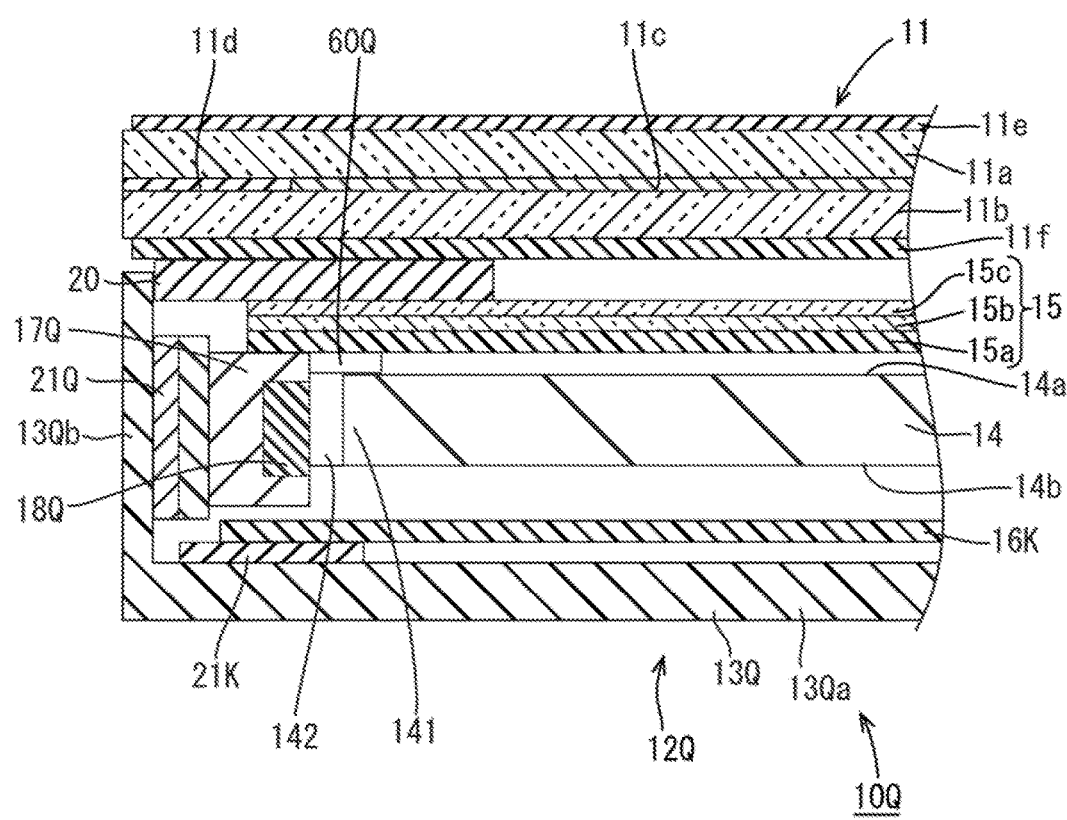
FIG. 32 is a magnified view of a portion of a liquid crystal display device according to the seventeenth embodiment including LEDs and therearound.

A liquid crystal display device 10Q and a backlight unit 12Q according to a seventeenth embodiment of the present invention will be described with reference to FIGS. 31 and 32. FIG. 31 is a magnified view of a portion of the backlight unit 12Q according to the seventeenth embodiment including LEDs 17Q and therearound. FIG. 32 is a cross-sectional view of a portion of the liquid crystal display device 10Q according to the seventeenth embodiment including the LEDs 17Q and therearound.

The backlight unit 12Q according to this embodiment includes the light guide plate 14 included in the first embodiment. A chassis 13Q includes a peripheral wall 13Qb having a thickness smaller than that of the first embodiment and a bottom wall 13Qa larger than that of the first embodiment. A basic configuration of the chassis 13Q other than the above is the same as that of the first embodiment.

In the backlight unit 12Q according to this embodiment, an LED board 18Q on which the LEDs 17Q are mounted is fixed to the peripheral wall 13Qb of the chassis 13Q with a board fixing tape 21Q that is similar to the board fixing tape 21 that is described earlier. The LEDs 18Q are top surface emitting-type LEDs mounted on the LED board 18Q and opposed to the light entering portions 141 of the light guide plate 14. Similarly to the first embodiment, multiple LEDs 17Q mounted on the LED board 18Q are arranged at intervals in a circular pattern to form an annular light source 170Q. The reflection sheet 16K is fixed to the bottom wall 13Qb of the chassis 13Q with the fixing tape 21K.

In such a backlight unit 12Q, the light guide plate 14 is fixed to the optical sheet 15 (an example of a supporting member disposed on the front side of the light guide plate 14) with a light guide plate fixing member 60Q.

The light guide plate fixing member 60Q is made of the same kind of material as the light guide plate fixing member 60. The light guide plate fixing member 60Q includes only first fixing portions 61Q that are arranged in a circular pattern in a plan view.

In the backlight unit 12Q according to this embodiment, the light guide plate 14 is positioned relative to the optical sheet 15 with the light guide plate fixing member 60Q in addition to the LEDs 17K and the circumferentially aligned portions 142 that are held together in the circumferential direction. Therefore, the rotation of the light guide plate 14 is further less likely to occur in the backlight unit 12Q according to this embodiment.

Eighteenth Embodiment

Figure 33:
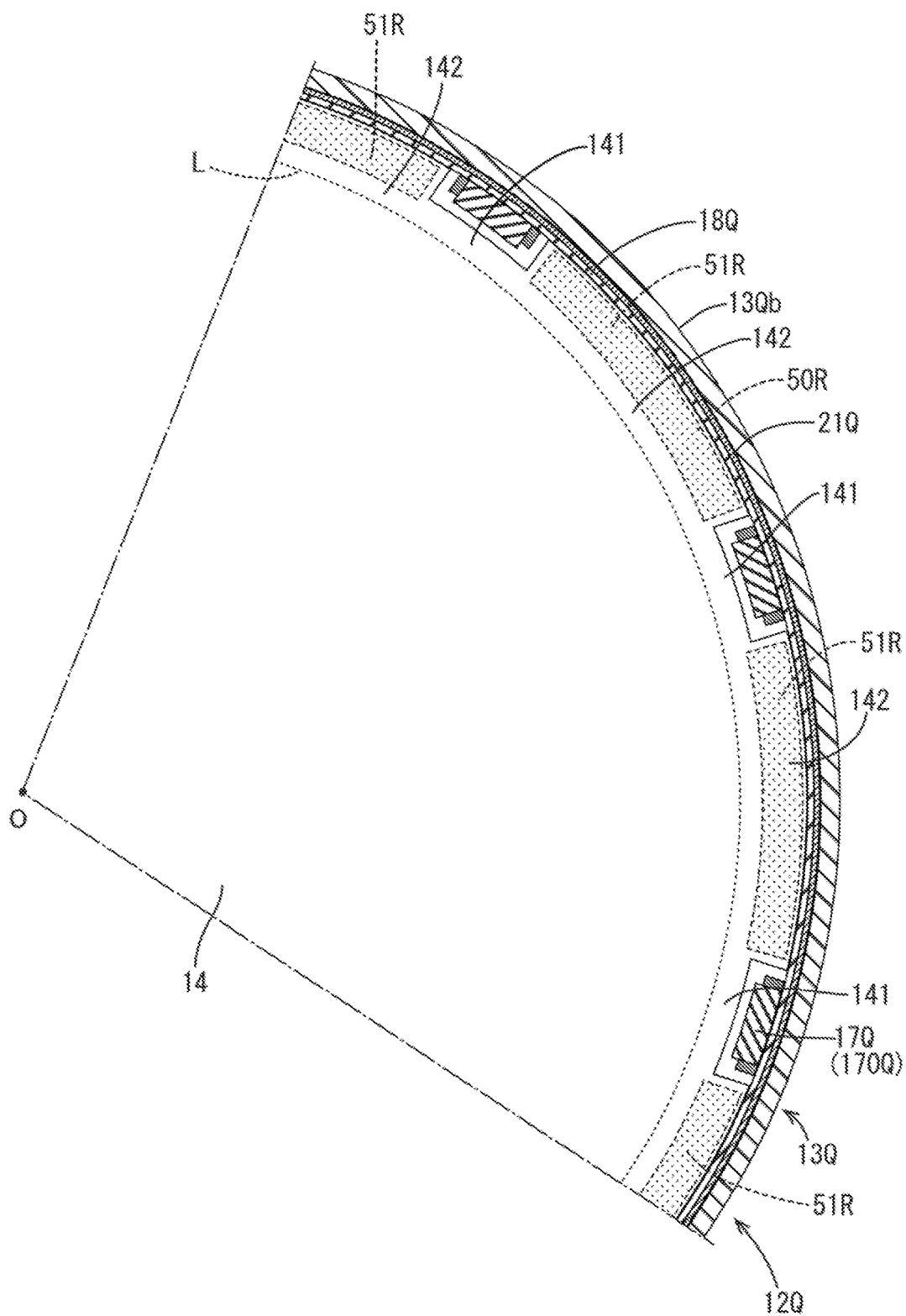
FIG. 33 is a magnified view of a portion of a backlight unit according to an eighteenth embodiment including LEDs and therearound.
Figure 34:
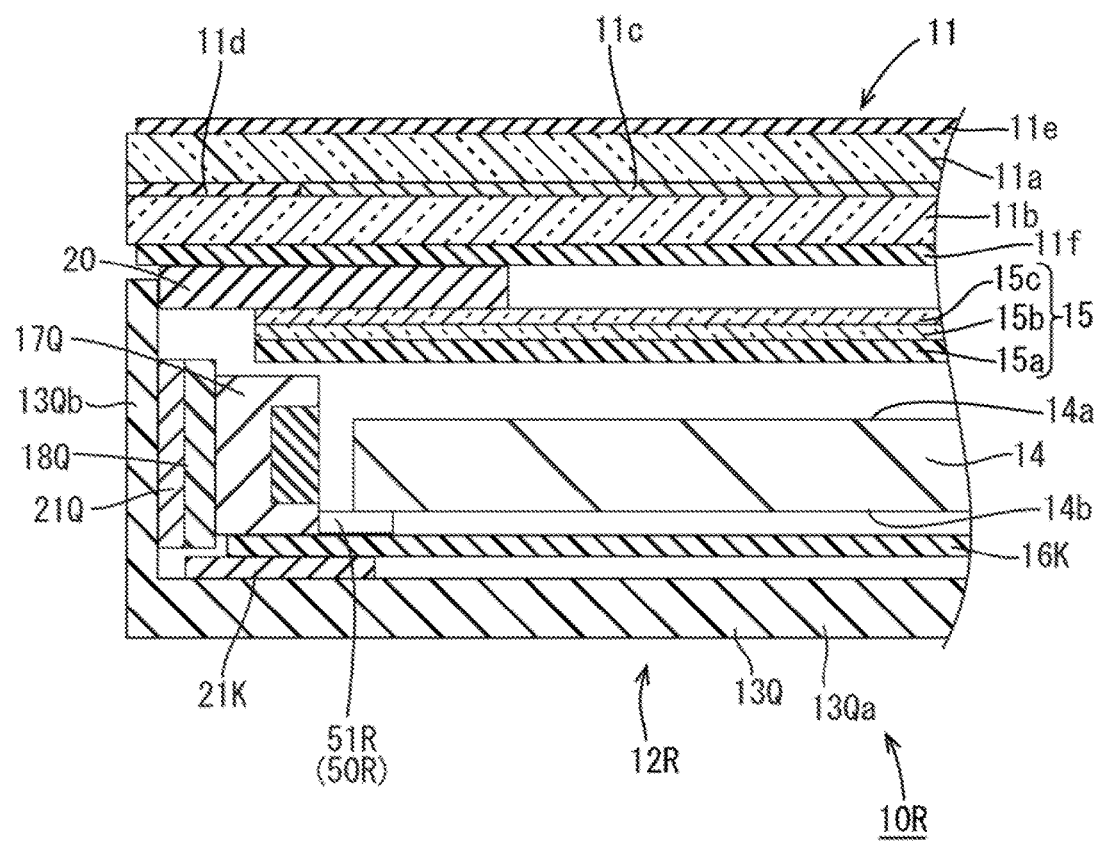
FIG. 34 is a magnified view of a portion of a liquid crystal display device according to the eighteenth embodiment including LEDs and therearound.

A liquid crystal display device 10R and a backlight unit 12R according to an eighteenth embodiment of the present invention will be described with reference to FIGS. 33 and 34. FIG. 33 is a magnified view of a portion of the backlight unit 12R according to the eighteenth embodiment including the LEDs 17Q and therearound. FIG. 34 is a cross-sectional view of a portion of the liquid crystal display device 10R according to the eighteenth embodiment including the LEDs 17Q and therearound.

The backlight unit 12R according to this embodiment includes the light guide plate 14 included in the first embodiment. Furthermore, the backlight unit 12R includes the chassis 13Q, the LED board 18Q, and the LEDS 17Q (the annular light source 170Q) included in the seventeenth embodiment described above. The reflection sheet 16K is fixed to the bottom wall 13Qb of the chassis 13Q with the fixing tape 21K.

In such a backlight unit 12R, the light guide plate 14 is fixed to the reflection sheet 16K (an example of a supporting member disposed on the back side of the light guide plate 14) with a light guide plate fixing member 50R. The reflection sheet 16K is fixed to the chassis 13Q as described above, the light guide plate 14 is considered to be fixed to the chassis 13Q via the reflection sheet 16K with the light guide plate fixing member 50R.

The light guide plate fixing member 50R is made of the same kind of material as the light guide plate fixing member 50 described earlier. The light guide plate fixing member 50R includes only first fixing portions 51R that are arranged in a circular pattern.

In the backlight unit 12R according to this embodiment, the light guide plate 14 is positioned relative to the reflection sheet 16K with the light guide plate fixing member 50R in addition to the LEDs 17Q and the circumferentially aligned portions 142 that are held together in the circumferential direction. Therefore, the rotation of the light guide plate 14 is further less likely to occur in the backlight unit 12R according to this embodiment.

Nineteenth Embodiment

Figure 35:
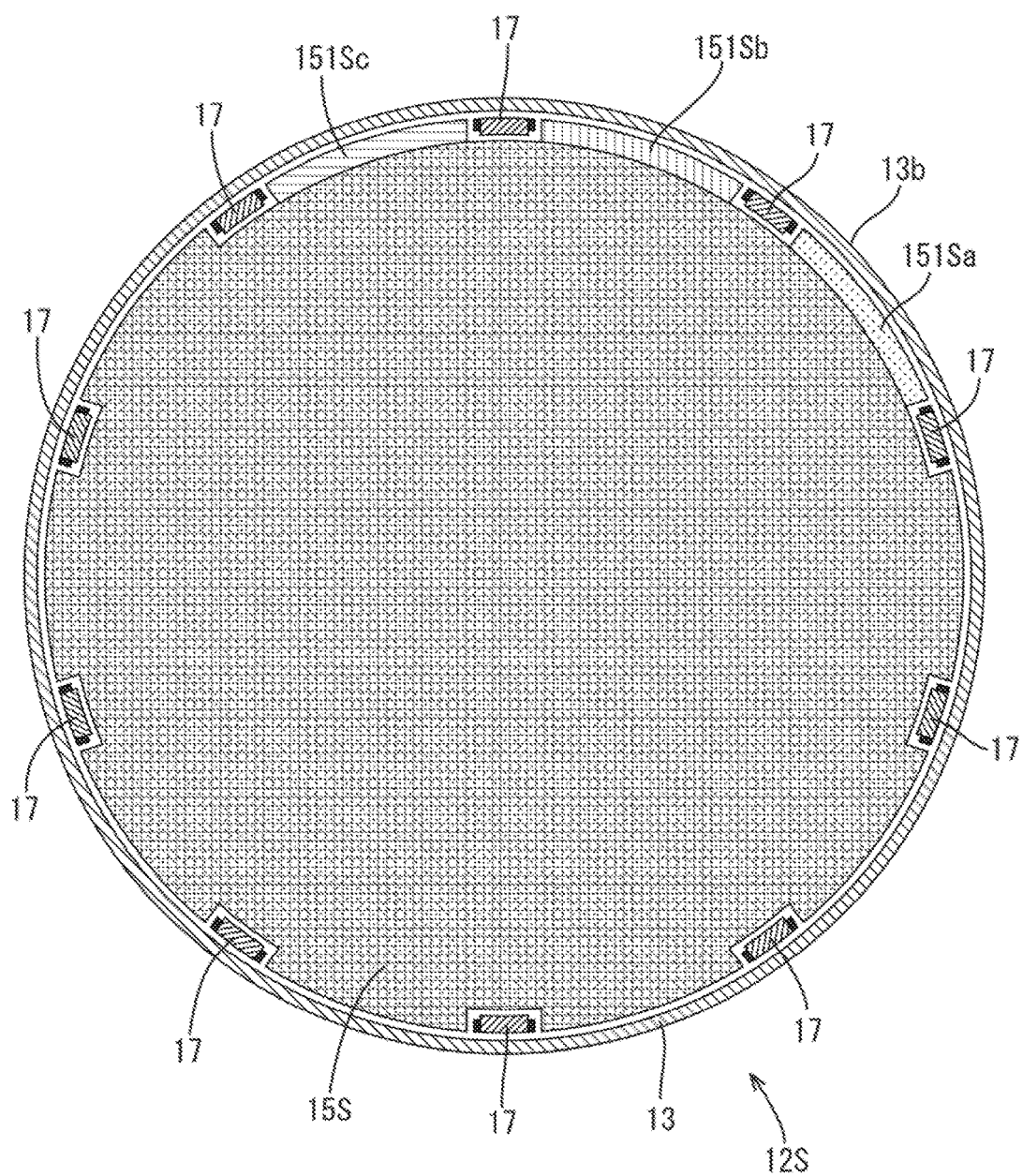
FIG. 35 is a plan view of a backlight unit according to a nineteenth embodiment.
Figure 36:
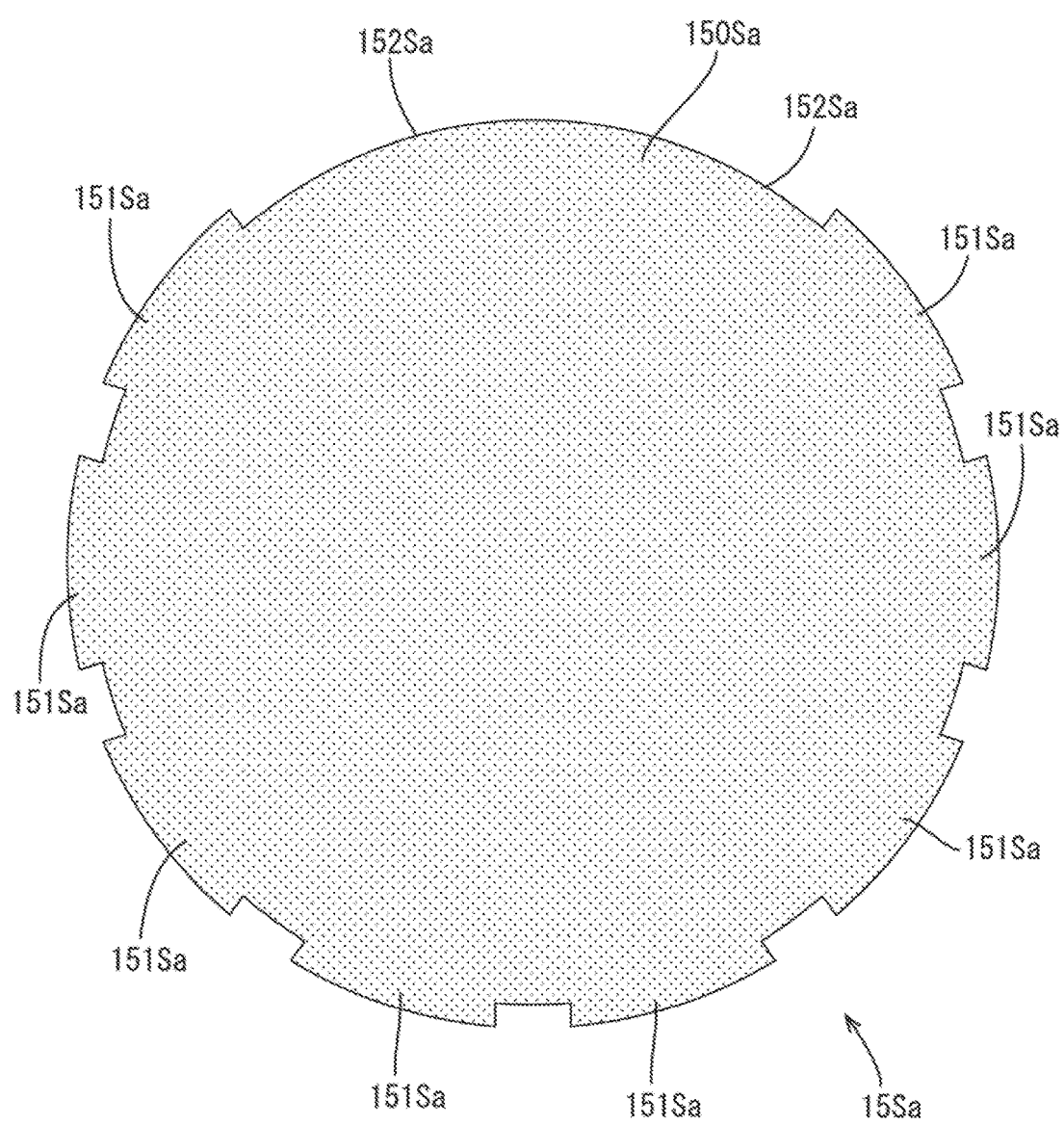
FIG. 36 is a plan view of a diffuser sheet.
Figure 37:
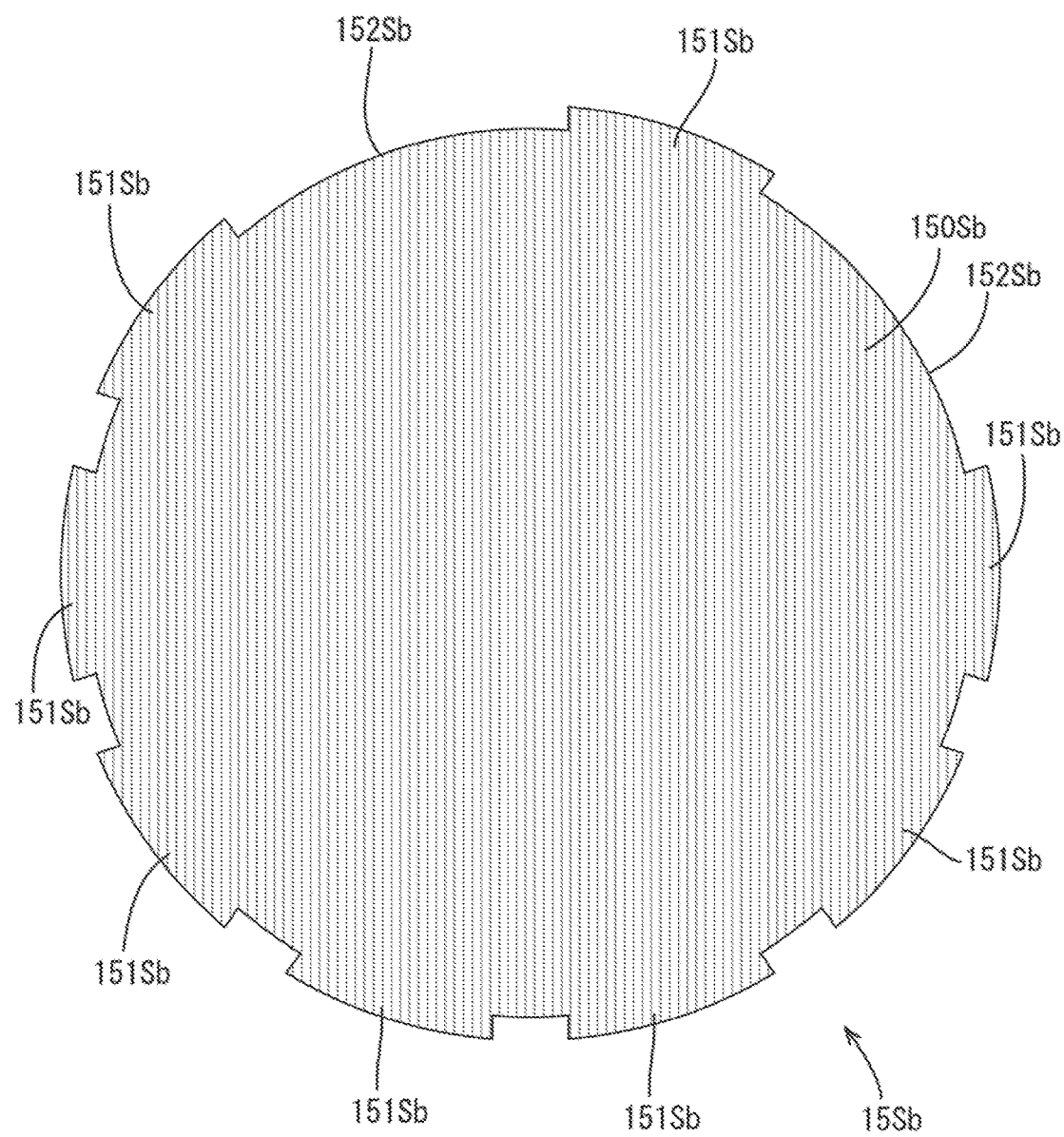
FIG. 37 is a plan view of a first prism sheet.
Figure 38:
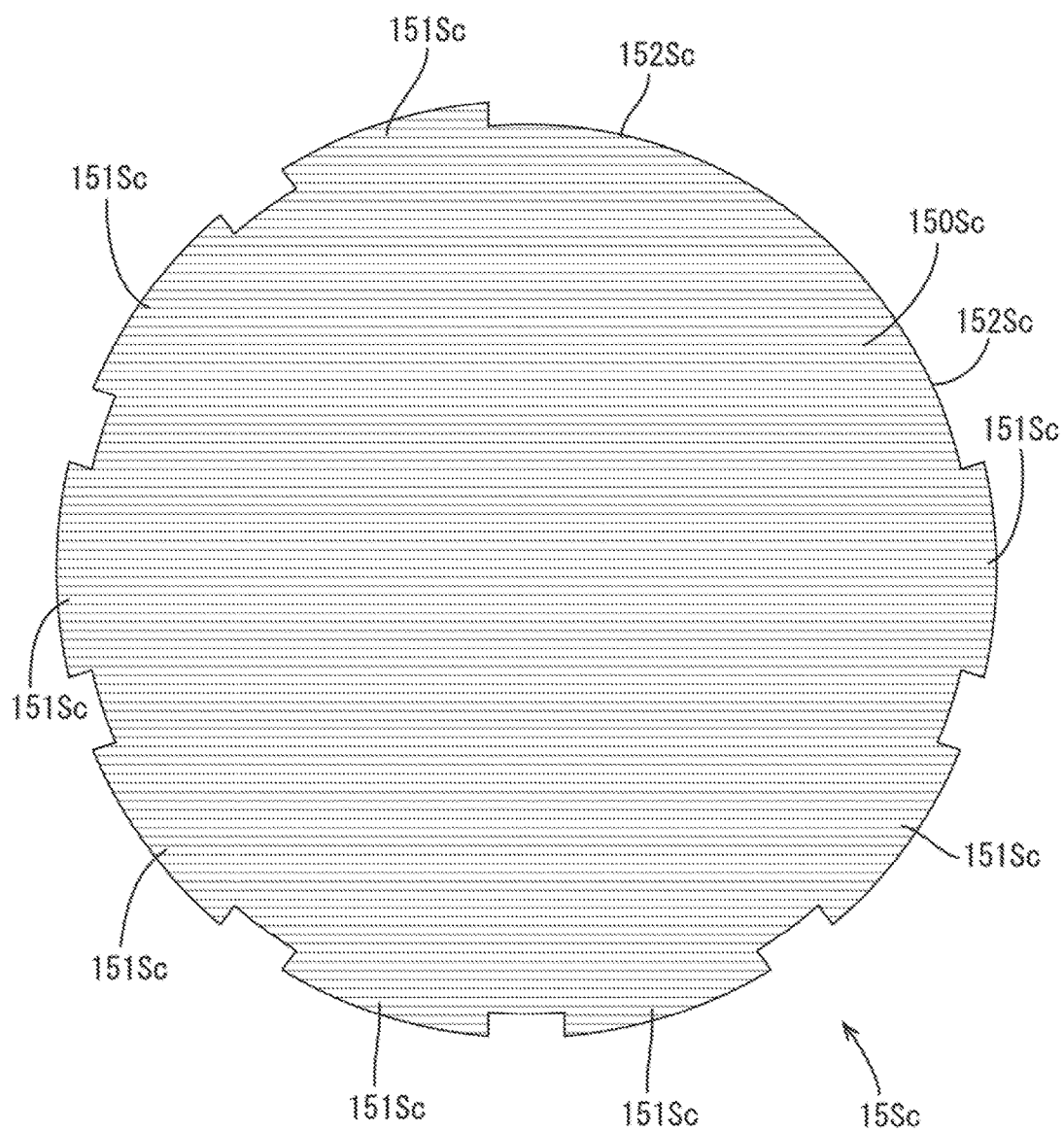
FIG. 38 is a plan view of a second prism sheet.

A fixing structure of an optical sheet 15S in a backlight unit 12S will be described with reference to FIGS. 35 to 38. FIG. 35 is a plan view of the backlight unit 12 according to the nineteenth embodiment. FIG. 36 is a plan view of a diffuser sheet 15Sa. FIG. 37 is a plan view of a first prism sheet 15Sb. FIG. 38 is a plan view of a second prism sheet 15Sc.

A basic configuration of the backlight unit 12S is similar to the first embodiment. A method of fixation of the optical sheet 15S is different in this embodiment.

The optical sheet 15S includes the diffuser sheet 15Sa, the first prism sheet 15Sb, and the second prism sheet 15Sc laid in this sequence from the back to the front. The optical sheet 15S is disposed to cover the light exiting portion 14a of the light guide plate 14. The optical sheet 15S is configured to add optical effects to light exiting from the light exiting portion 14a and direct the light toward the liquid crystal panel 11.

The sheets 15Sa, 15Sb, and 15Sc of the optical sheet 15S include base portions 150Sa, 150Sb, and 150Sc and extending portions 151Sa, 151Sb, and 151Sc. The base portions 150Sa, 150Sb, and 150Sc have round shapes in a plan view and cover the light exiting portion 14a of the light guide plate 14. The extending portions 151Sa, 151Sb, and 151Sc extend from the base portions 150Sa, 150Sb, and 150Sc and cover the circumferentially aligned portions 142 of the light guide plate 14. When the sheets 15Sa, 15Sb, and 15Sc are placed over the light guide plate 14, the extending portions 151Sa, 151Sb, and 151Sc are placed on top of each other. However, one of the extending portions 151Sa, one of the extending portions 151Sb, and one of the extending portions 151Sc are not on top of each other.

The extending portions 151Sa, 151Sb, and 151Sc of the sheet 15Sa, 15Sb, and 15Sc are annularly arranged at equal intervals along peripheral edges of the base portions 150Sa, 150Sb, and 150Sc. One of the extending portions 151Sa of the sheet 15Sa, one of the extending portions 151Sb of the sheet 15Sb, and one of the extending portions 151Sc of the sheet 15Sc do not overlap other extending portions of other sheets and directly cover the circumferentially aligned portions 142. Namely, the sheets 15Sa, 15Sb, and 15Sc include portions (non-extending portions) 152Sa, 152Sb, and 152Sc in which the extending portions 151Sa, 151Sb, and 151Sc do not extend from the peripheral edges of the base portions 150Sa, 150Sb, and 150Sc and thus do not overlap the extending portions of other sheets. The non-extending portions 152Sa, 152Sb, and 152Sc are portions of the peripheral edges of the base portions 150Sa, 150Sb, and 150Sc.

For example, the diffuser sheet 15Sa includes two non-extending portions 152Sa adjacently arranged along the peripheral edge of the base portion 150Sa. The first prism sheet 15Sb includes the non-extending portion 152Sb on either side of one extending portion 151Sb. The second prism sheet 15Sc includes two non-extending portions 152Sc adjacently arranged along the peripheral edge of the base portion 150Sc.

When such an optical sheet 15S is place over the light guide plate 14, as illustrated in FIG. 35, the extending portion 151Sa of the sheet 15Sa, the extending portion 151Sb of the sheet 15Sb, and the extending portion 151Sc of the sheet 15Sc do not overlap one another and directly cover the circumferentially aligned portions. Namely, the extending portion 151Sa of the sheet 15Sa, the extending portion 151Sb of the sheet 15Sb, and the extending portion 151Sc of the sheet 15Sc do not overlap one another and are exposed on the front side. The optical sheet 15S having such a configuration is fixed to the liquid crystal panel 11 (an example of a supporting member disposed on the front side) disposed on the light exiting side (the front side) relative to the optical sheet 15S with the double sided adhesive sheet fixing tape 20 (an optical sheet fixing tape).

The sheet fixing tape 20 is a double sided adhesive tape including surfaces, one of which (a front adhesive surface) is affixed to the front surface of the liquid crystal panel 11, which is a supporting member, and the other surface (a back adhesive surface) is affixed to the extending portions 151Sa, 151Sb, and 151Sc that are not on top of one another. The optical sheet 15S and the liquid crystal panel 11 are fixed together with the sheet fixing tape 20.

With the optical sheet 15S having such a configuration, the sheets 15Sa, 15Sb, and 15Sc of the optical sheet 15S can be directly fixed to the liquid crystal panel 11, which is the supporting member. In the backlight unit 12S according to this embodiment, interference patterns (moire patterns) produced when the sheets 15Sa, 15Sb, and 15Sc of the optical sheet 15S are rotated in the circumferential direction and displaced from one another can be effectively reduced.

Twentieth Embodiment

Figure 39:
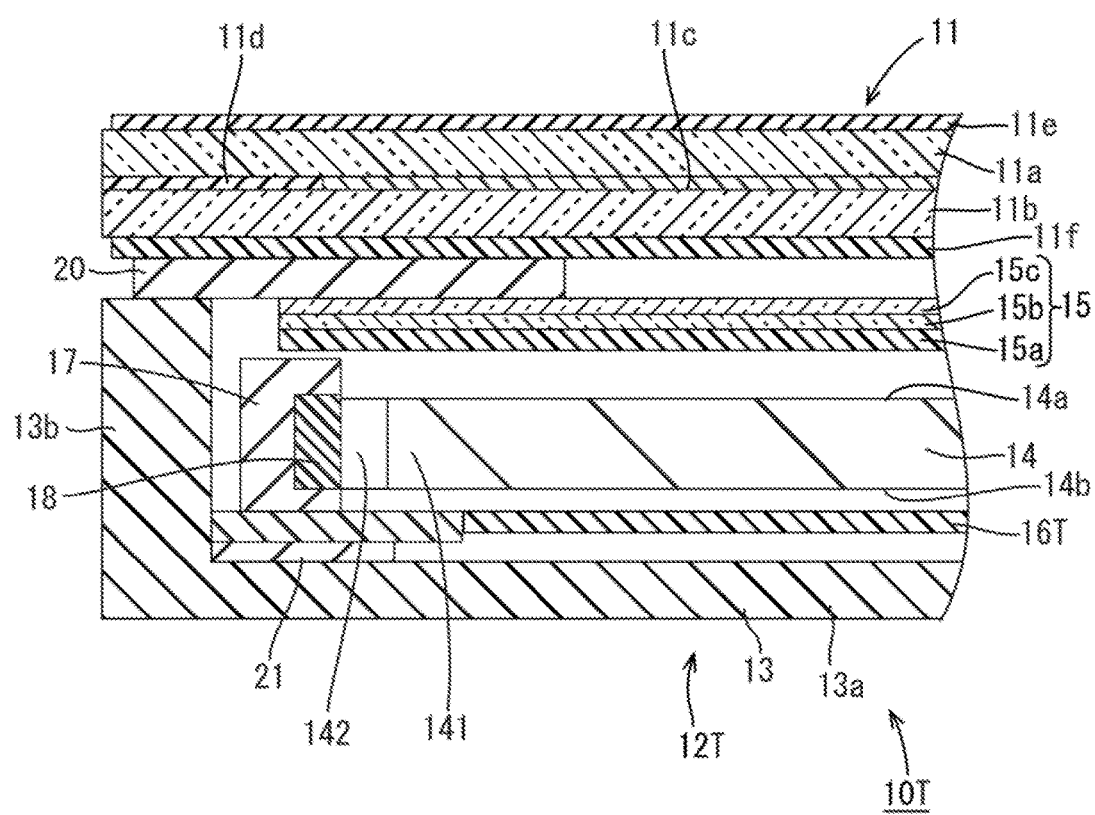
FIG. 39 is a cross-sectional view of a portion of a liquid crystal display device according to a twentieth embodiment including LEDs and therearound.

A liquid crystal display device 10T and a backlight unit 12T according to a twentieth embodiment of the present invention will be described with reference to FIG. 39. FIG. 39 is a cross-sectional view of a portion of the liquid crystal display device 10T according to the twentieth embodiment including the LEDs and therearound. Basic configurations of the liquid crystal display device 10T and the backlight unit 12T according to this embodiment are the same as the first embodiment. Only a reflection sheet 16T is held in the chassis 13 differently. Specifically, the reflection sheet 16T is sandwiched between the back surface 14b of the light guide plate 14 and the bottom wall 13a in the chassis 14. The reflection sheet 16T is smaller than that of the first embodiment so that an end portion of the reflection sheet 16T is placed on the LED board 18 more than necessary. According to the configuration, the reflection sheet 16T is held in the chassis 13 without using a fixing member such as a double sided adhesive tape.

Other Embodiment

The present invention is not limited to the above embodiments described with reference to the drawings. The following embodiments may be included in the technical scope of the present invention.

(1) In each of the above embodiments, the circumferentially arranged protruding portions or radially arranged protruding portions are formed on the peripheral wall 13b of the chassis 13. In the other embodiment, they may be formed on the bottom wall 13a.

(2) In each of the above embodiments, the LEDs are used as an example of the light source. However, organic ELs may be used for the light source.

(3) In each of the above embodiments, the transmissive-type liquid crystal display device is used as an example. However, the scope of the present invention may be applied to a semitransmissive-type liquid crystal display device.

(4) In each of the above embodiments, the TFTs are used for the switching components of the liquid crystal display device. However, the scope of the present invention may be applied to a liquid crystal display device including switching components other than the TFTs (e.g., thin film diodes (TFDs)) or a black-and-white liquid crystal display device other than a color liquid crystal display device.

(5) In each of the above embodiments, the liquid crystal panel with the FFS mode is used. However, a liquid crystal panel with other mode including in-plane switching (IPS) mode may be used in the other embodiment (6) In each of the above embodiments, the liquid crystal panel is used for the display panel. However, a micro electromechanical systems (MEMS) display panel configured to display an image using light from a backlight unit may be used. The MEMS display panel includes fine mechanical shutters two-dimensionally arranged in a matrix. The fine mechanical shutters form display pixels. By individually controlling opening and closing of the mechanical shutters to adjust amounts of transmitting light from the backlight unit for each display pixel, an image can be displayed with a predefined tone.

EXPLANATION OF SYMBOLS

10: Liquid crystal display device (Display device)
11: Liquid crystal display panel (Display panel)
12: Backlight unit (Lighting device)
13: Chassis (Case)
13a: Bottom wall
13b: Peripheral wall
14: Light guide plate
141: Light entering portion
142: Circumferentially aligning portion
15: Optical sheet
16: Reflection sheet
17: LED (light source)
170: Annular light source
18: LED board (Light source board)

The invention claimed is:
1. A lighting device comprising:
an annular light source comprising a plurality of light sources arranged at intervals in a circular pattern and configured to emit light toward a center of the annular light source;
a light guide plate being a plate having a round shape in a plan view and being disposed inside the annular light source with a center of the light guide plate aligned with the center of the annular light source, the light guide plate comprising:
a plurality of light entering portions being portions of a periphery of the plate opposed to the light sources and through which the light enters and annularly arranged at intervals;

a plurality of circumferentially aligned portions being portions of the periphery of the plate among the light entering portions, and a light exiting portion being a front plate surface of the plate through which the light entering through the light entering portions exits, wherein each of the circumferentially aligned portions is between the light entering portions that are adjacent to each other and has a dimension between the center of the plate and an edge of the each of the circumferentially aligned portions in a radial direction larger than a dimension between the center and an edge of each of the light entering portions in the radial direction, and the circumferentially aligned portions are aligned with the light sources in a circumferential direction to contact the light sources when the light guide plate is rotated in the circumferential direction; and a case holding the annular light source and the light guide plate with the light sources positioned, wherein the case includes a peripheral wall surrounding the periphery of the light guide plate.

2. The lighting device according to claim 1, wherein the circumferentially aligned portions include parallel contact surfaces substantially parallel to side surfaces of the light sources in the radial direction and aligned with the light sources in the circumferential direction.

3. The lighting device according to claim 1, wherein the circumferentially aligned portions include sloped contact surfaces angled to side surfaces of the light sources in the radial direction and aligned with the light sources in the circumferential direction.

4. The lighting device according to claim 1, wherein the light entering portions include light source opposed surfaces opposed to the light sources, and the circumferentially aligned portions include continuous contact surfaces continuing from the light source opposed surfaces to be flush with the light source opposed surfaces and being aligned with the light sources in the circumferential direction.

5. The lighting device according to claim 1, wherein the case includes circumferentially arranged protrusions protruding from the peripheral wall toward the light guide plate such that the circumferentially arranged protrusions and the light sources are aligned in the circumferential direction, and the circumferentially arranged protrusions are aligned with the circumferentially aligned portions in the circumferential direction and configured to contact the circumferentially aligned portions when the light guide plate is rotated.

6. The lighting device according to claim 1, wherein the case includes radially arranged protrusions protruding from the peripheral wall toward the light guide plate such that the radially arranged protrusions and the light sources are aligned in the radial direction, the radially arranged protrusions are aligned with the circumferentially aligned portions in the circumferential direction, and the radially arranged protrusions have dimensions in the circumferential direction equal to or larger than dimensions of the light sources in the circumferential direction and configured to contact the circumferentially aligned portions when the light guide plate is rotated.

7. The lighting device according to claim 1, further comprising:

a supporting member disposed on a front side or a rear side of the light guide plate, and a light guide plate fixing member including a plurality of first fixing portions that are double sided adhesive portions for fixing the circumferentially aligned portions and the supporting member together, wherein one of surfaces of each of the first fixing portions is affixed to a front surface or a back surface of corresponding one of the circumferentially aligned portions, and another one of the surfaces is affixed to the supporting member.

8. The lighting device according to claim 7, wherein the light guide plate fixing member includes connecting portions each connecting the first fixing portions that are adjacent to each other.

9. The lighting device according to claim 7, wherein the connecting portions are second fixing portions that are double sided adhesive portions for fixing the light entering portions and the supporting member together, one of surfaces of each of the connecting portions is affixed to a front surface or a back surface of corresponding one of the light entering portions, and another one of the surfaces is affixed to the supporting member.

10. The lighting device according to claim 7, wherein the light guide plate fixing member has a closed ring overall shape.

11. The lighting device according to claim 1, further comprising:

a plurality of optical sheets comprising base portions and extending portions, wherein the base portions have substantially round shapes and cover the light exiting portion, the extending portions extend outward from the base portions and cover the circumferentially aligned portions, the optical sheets are laid on top of each other such that the extending portions do not overlap each other and directly cover the circumferentially aligned portions, and the optical sheets are configured to pass light exiting from the light exiting portion;

a supporting member disposed on a light emitting side of the optical sheet; and an optical sheet fixing member being a double sided adhesive fixing member for fixing the optical sheets and the supporting member together, wherein one of surfaces of the optical sheet fixing member is affixed to the supporting member, and another one of the surfaces is affixed to the extending portions.

12. The lighting device according claim 1, wherein the annular light source includes the light sources that are opposed to each other in the radial direction.

13. The lighting device according to claim 1, wherein the circumferentially aligned portions are configured such that a distance from the peripheral wall is constant for an entire area.

14. A display device comprising:

the lighting device according to claim 1; and a display panel.

* * * * *